United States Patent
McNicholas

(10) Patent No.: US 11,703,186 B2
(45) Date of Patent: Jul. 18, 2023

(54) SAFE TRANSPORTATION SYSTEM OPERATIONS INCLUDING FUELING, TRANSFER AND CHARGING

(71) Applicant: Daniel McNicholas, Oak Lawn, IL (US)

(72) Inventor: Daniel McNicholas, Oak Lawn, IL (US)

( * ) Notice: Subject to any disclaimer, the term of this patent is extended or adjusted under 35 U.S.C. 154(b) by 0 days.

(21) Appl. No.: 17/335,127

(22) Filed: Jun. 1, 2021

(65) Prior Publication Data

US 2022/0282835 A1    Sep. 8, 2022

Related U.S. Application Data

(60) Provisional application No. 63/033,090, filed on Jun. 1, 2020.

(51) Int. Cl.
*F17C 5/06*   (2006.01)
*B60K 15/04*   (2006.01)
(Continued)

(52) U.S. Cl.
CPC ............... *F17C 5/06* (2013.01); *B60K 15/04* (2013.01); *B60K 15/07* (2013.01); *B67D 7/32* (2013.01);
(Continued)

(58) Field of Classification Search
CPC ........... F17C 5/06; B60K 15/04; B60K 15/07; B67D 7/32
(Continued)

(56) References Cited

U.S. PATENT DOCUMENTS

2008/0318098 A1* 12/2008 Matsunaga ....... H01M 8/04089
                                                                429/415
2012/0060935 A1*  3/2012 Carter ................... F02D 19/023
                                                                137/511

FOREIGN PATENT DOCUMENTS

CN          101946114 A   *   1/2011    ............. F16K 17/00
CN          206191628 U   *   5/2017
(Continued)

*Primary Examiner* — Mahmoud Gimie
(74) *Attorney, Agent, or Firm* — Clifford H. Kraft

(57) ABSTRACT

Multiply redundant safety system(s) that protects humans and assets while fueling vehicles, and/or transferring/fueling/tank exchanging of on road/off road, marine, aircraft, spacecraft, rockets, and all other vehicles/vessels utilizing Compressed and/or Liquefied Gas Fuels/compound(s), utilizing Hydrogen and/or Natural Gas Chemical Family of Natural Gas/Propane/Butane/ethane/ammonia/and/or any/all compound(s)/mixtures along with and/or without, oxidizer(s), such as Liquefied Oxygen, Oxygen Triplet (O3)/ozone/hydrogen peroxide/peroxide/solid oxidizer(s). One or more processors in combination with one or more system(s)/one or more sensor(s); in combination with one or more micro switches/one or more outputs/actuator(s) which combine to detect any leaks/fire(s)/explosion/voltage(s)/hazards/vehicle position/motion/vessel motion(s)/reusable tank/exchange tank/position(s)/arc's, spark(s)/and/or other hazards for rapid mitigation by locking out/stopping fueling/gas transfers/vehicle releasing/transfer line releasing. For different levels of safety, multiple combination(s) of various sensor(s)/detector(s)/input(s)/output(s)/device(s)/system(s)/action(s)/actuators, all may be standing alone and/or in any combination can be utilized.

16 Claims, 21 Drawing Sheets

(51) Int. Cl.
*F17C 13/02* (2006.01)
*B67D 7/32* (2010.01)
*B60K 15/07* (2006.01)

(52) U.S. Cl.
CPC ...... *F17C 13/02* (2013.01); *F17C 2270/0168* (2013.01)

(58) Field of Classification Search
USPC ......................................................... 180/271
See application file for complete search history.

(56) References Cited

FOREIGN PATENT DOCUMENTS

| | | | | |
|---|---|---|---|---|
| CN | 107420208 A | * | 12/2017 | |
| CN | 209411766 U | * | 9/2019 | |
| EP | 2615278 A2 | * | 7/2013 | ........... F02D 19/022 |
| WO | WO-2013169972 A1 | * | 11/2013 | ............. C10B 41/00 |

* cited by examiner

Process Control Safety Emergency Stop/Shut-down INPUTS

To Fig. 2B

Process Control System Emergency Stop or Shut-down Power and Processor

To Fig. 3B

Safety Instrumented System (SIS) Emergency Stop/Shut-down

POWER AND SIS PROCESSOR INPUTS AND OUTPUTS

Safety Instrumentation System (SIS) Emergency Stop/Shut-down Outputs

OR Process Control Safety Instrumented Emergency Stop/Shut-down

A To Fig. 4B

Safety Instrumentated System Emergency Stop/Shut-down OUTPUTS or Process Control Safety Emergency Stop/Shut-down OUTPUTS

Process Control Safety Instrumentated Emergency Stop/Shut-down

POWER: Process Control PROCESSOR INPUTS/OUTPUTS

SAFE TRANSPORTATION SYSTEM OPERATIONS INCLUDING FUELING, TRANSFER AND CHARGING

DESCRIPTION OF THE PROBLEM SOLVED

Application 63/033,090 is incorporated by reference in its entirety.

The planet earths' population keeps increasing, along with this Increase, is the fact that our global Transportation/Work vehicles needs will also increase. Utilizing Clean, Safe, Natural Gas and/or Hydrogen/Propane/Ethane/Butane/Ammonia and/or any of its derivatives/compounds, will benefit all. The use of Bio-methane/Bio-gas alone or mixed with methane/Hydrogen mixed with methane (Hythane) has positive carbon reduction results. Landfills, farms, and municipal waste plants are all sources of Bio-gas. All of these fuel(s)/mixtures are an abundant source of Bio-energy/Bio-Fuels.

The Natural Gas Chemical Family/Hydrogen/propane/ethane/butane/Ammonia (NGHPETBA/O) contains a great value for a diverse Group of Transportation Vehicles; From Launching Rockets and/or satellites to Air/Spacecraft, to Ships, Tugs, Barges, Railroad Locomotives/light commuter rail, Construction Equipment, and any/all land based wheeled/tracked vehicle(s). Every-Day Goods, specialty goods, and/or Human Transits are transported thru Ship/Rail yards/stations, airport/bus terminals, docks, and Space-ports daily.

$21^{st}$ Century transportation systems shall include clean fuel(s), and improved/more efficient vehicle(s) with intelligent, safe, transportation methods. Multiple vehicle(s) and/or drive/propulsion/propel methods are included in this patent application. Human/package/cargo transits can utilize rockets/capsules for global/space transits), cruise/cargo ships/rail and/or personal/multiple individual aircraft/hovercraft transported by pod(s)/drone(s)/aircraft/vehicle/Aircars/any combination(s). Many will contain Hy-Brid power source/supply system(s) utilizing compressed/liquefied gas fuel system(s), plus the safety system(s) of each. The benefit of these aircraft-car/vehicles is that they will ease intercity traffic congestion, plus improve emissions/package/parcel delivery/provide recreational/scenic tours. Some may utilize exchangeable fuel tanks, as disclosed in U.S. Pat. No. 8,662,235. These exchangeable fuel tanks may be small and lightweight for personal aircraft and/or they may contain large volumes of fuel/oxidizer, for global/space transits. The pod/capsule/cockpit may be set onto/attached to the filled exchangeable/re-usable tank(s) to complete the rocket/vehicle, readying for next transit. Central location(s) to serve multiple vehicle(s)/types is best for efficiency of fuelling/transfer(s)/exchanging (or filling of exchangeable)/tank(s) of compressed/liquefied gas.

There are also multiple different systems/paths for fuel consumption. The combustion engine has been vastly improved to increase efficiency and reduce emissions, now achieving near zero emissions. The vehicle emission reductions, when quantified, are substantial, and clean fuels are a key component of the reductions. There are also turbines/micro-turbines, rotary engines, and various types of fuel cells. Fuel cell efficiency as well as internal combustion, may also be improved with increased oxygen % percentage(s) of system intake. Oxygen/Natural Gas/Hydrogen/Propane/ethane/ammonia (NGHPETA/O) may be separated, and or produced onboard or it may be supplied as a compressed/liquefied gas; also, any onboard reformer/gas cleaving cleaving/separation/concentration process onboard is also with-in the scope of this invention; such as stripping H2 out from CH-4, by high temp./steam cracking/reformer on the vehicle, for use as fuel/fuel-compound/oxidizer, or pressure swing adsorption systems, or O2 concentrators/generators.

The amount of curbed air pollution in just last several years is proof positive, and vast volumes/many more tons of particulate matter/other pollutants can be greatly reduced, and every human on the planet earth will benefit. Although, Natural Gas/Hydrogen/Propane/Ethane/butane/Ammonia/Oxygen as compressed gas/liquefied gas fuels, (NASA refers to filling of Oxygen as "Fuelling") absolutely must be respected, the fuel transfers, the fuel tank(s)s, the filling/supply/exchanging system(s)/apparatus'/equipment/tank(s)/handling, and the overall safety culture to prevent accidents and/or accidental grounding/releases is crucial. The battery/compressed/liquefied gas(s), require enhanced diligence, and/or proper handling/education for wide spread use and acceptance. The rewards for compressed/liquefied gas utilization is cleaner air for our planet earth.

SUMMARY OF THE INVENTION

The present invention relates to a multiple redundant safety system for compressed/liquified gas vehicle fuelling/transfers containing two (2) independent operational Isolated control systems with separate power sources for safety back-up. This includes multiple, at least two (2), separate complete computerized control system(s); each system including processor(s)/GPU's, controller(s), network(s), sensor(s), instrument(s), actuator(s), Human interface(s), and all perphipal(s) for (2) independent operating systems, with separate power sources (separate isolation transformer(s), U.P.S./battery banks) for redundant control of fuelling/transfer safety system. It also includes a multiple redundant fuelling/transfer safety system for compressed/liquified oxygen vehicle fuelling/transfers containing two (2) independent operational isolated control systems with separate power sources for safety back-up. There is also a multiple redundant fuelling/transfer safety system for compressed/liqufed gas vehicle utilizing an internal combustion engine, and/or fuel cell, standing alone and/or combined to produce out-put power (direct and/or Hybrid) for vehicle power/propulsion/motive/motion/movement/power generation.

One object of the invention is also a multiple redundant fuelling/transfer safety system for compressed/liqufed gas vehicle utilizing an internal combustion engine, and/or fuel cell, standing alone and/or combined to produce out-put power (direct and/or Hybrid) for vehicle motion/movement, utilizing any compressed/liquified gas, such as Natural gas, Hydrogen, Propane, Ethane, Butane, Ammonia, syn-gas, Bio-Gas, and any mixture and/or compound thereof, plus any cleaved/seperated/reformed gas/liquified/vapor gas, onboard.

A further object of the invention is a multiple redundant fuelling/transfer safety system for compressed/liqufed gas vehicle utilizing an internal combustion engine, and/or fuel cell, standing alone and/or combined to produce out-put power (direct and/or Hybrid) for vehicle motion/movement, utilizing any oxidizer, be it compressed/liquified gas and or solid, including any oxygen/hydrogen and/or compound thereof, (O2/O3/H2O2/ozone), plus any onboard oxygen concentrator/swing absorption system.

A further object of the invention is multiple redundant vehicle motion(s)/movement(s) detection methods/device(s), standing alone and/or combined, utilizing any of a pleathera of mechanical tether/chord/cable, switch/microswitch, magnetic, optical, ultrasonic, accelerometer(s), tri-axial accelerometer(s), inertial motion units, gyro(s), gyroscopic effect instrument(s)/device(s) to detect omni-direction vehicular motion/movement(s), during fuelling/transfer event(s) and signal output(s) if motion exceeds first and or second predetermined level of detected motion/movement.

A further object of the invention is multiple redundant vehicle motion(s)/movement(s) detection methods/device(s), standing alone and or combined, utilizing any of a pleathera of mechanical tether/chord/cable, switch/microswitch, magnetic, optical, ultrasonic, accelerometer(s), tri-axial accelerometer(s), inertial motion units, gyro(s), gyroscopic effect instrument(s)/device(s) to detect omni-direction vehicular motion/movement(s), during compressed/liquified gas fuelling/transfer(s) event(s), and signal output(s) if motion exceeds first and or second predetermined level of detected motion/movement

DESCRIPTION OF THE PREFERRED EMBODIMENTS

Figure 1A:
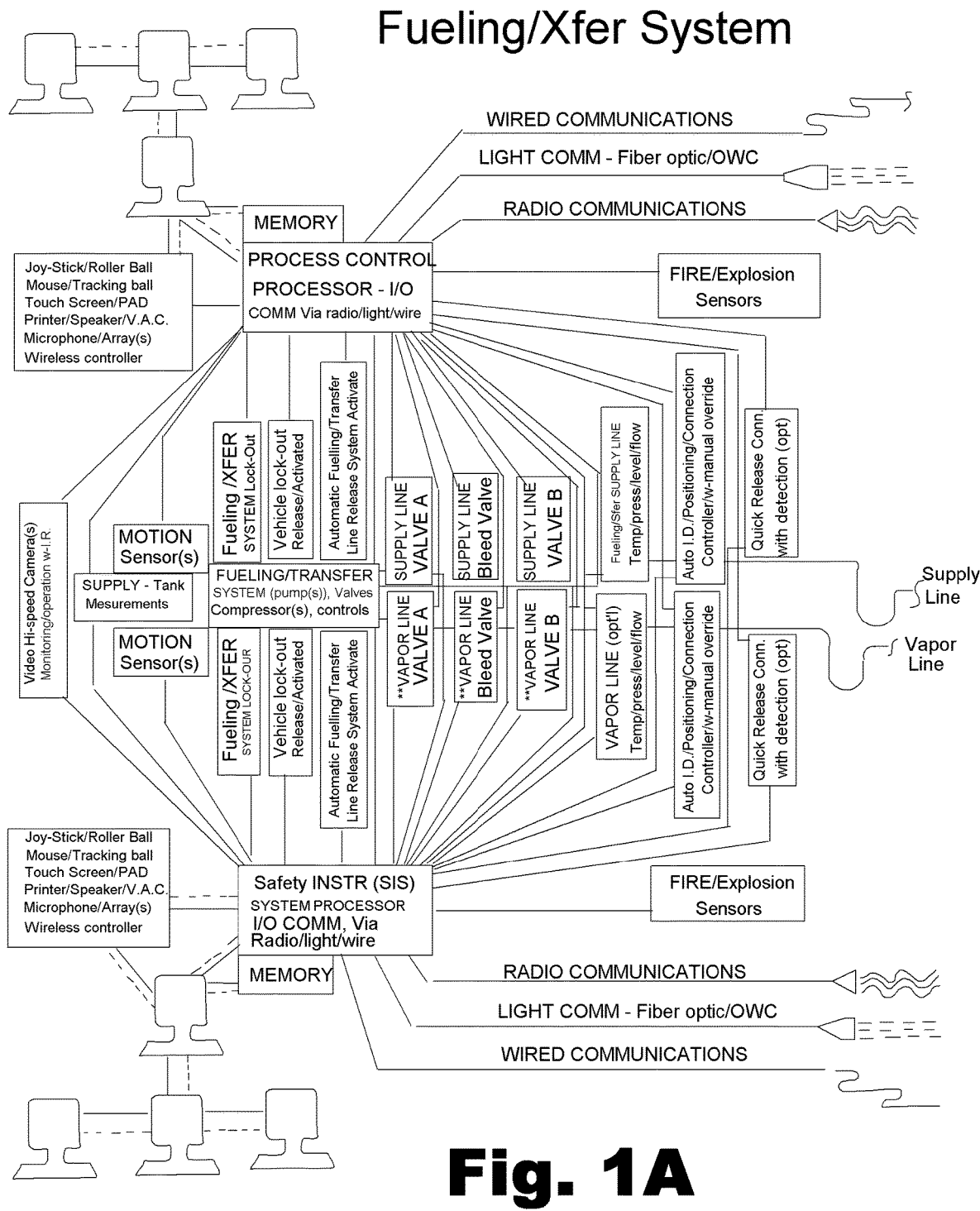
FIGS. 1A-1B show an embodiment of two redundant control systems of the present invention.

The systems may utilize state of the art sensors/processor(s)/system(s) for S.I.L.-3 compliance. Ensuring all compressed gas/liquefied gas fuelling/transfer/exchange(s) are performed safely and efficiently, by mitigating the Hazards associated with Natural Gas/Hydrogen/propane/ethane/Butane/Ammonia/Oxygen/Fuelling/transfer/exchange(s) event(s), regardless of its Physical State (Gaseous/Liquefied).

Algae growth and processing has offered clean renewable fuel benefits. Algae cultivation is a green process to provide yet another clean fuel supply source for vehicle utilization. Cleaner fuels, allow all to achieve global goals such as cleaner vehicle/vessel/rocket/aircraft/plant emissions, with improved air quality. Algae cultivation/processing has positive future potential developments, which will aid in reaching clean air goals.

State of the art transfers will include the use of Artificial Intelligence/Machine learning/Deep learning utilizing high speed imaging/the use of digital high speed camera(s); photodiode/array sensors that include both the visual and non-visual spectrum (such as I.R.) to input photo imaging into processors for deep processor learning or "Machine learning". Repetitive motions/Steps/processes are "Learned" by processor(s), and repetitive actions and/or responses are then learned and acted upon as learned. Other input(s)/outputs, such as Optical, magnetic, and ultrasonic inputs/outputs are also included in the body of this invention. Deep learning utilizes one or more inputs, repeatable, for algorithms to process information inputs, then learns (deep learning) the inputs and produces acceptable outputs, utilizing optical, magnetic, and ultrasonic devices, required to perform the task, thereby creating its own step by step "code/coding and/or Flowcharting". Deep learning and/or machine learning may also utilize Quantum computing on a Quantum bus or network. Quantum logic gates and networks are safer due to validation process capabilities within the system. Quantum networks may be LAN (local area networks) or they may be WAN (wide area networks) wirelessly connected to multiple different networking systems via satellite by Radio and/or fiber optic links/optical wireless networks/and/or any combination of radio and/or light. Analog and/or digital signals are both conditioned and fed, which are processed in complex algorithms, which decipher input(s) signals and determine precise output signal(s) for repetitive/motions and/or actions, and quantum computing enhances optical computing with high bandwidth on the bus/network, computing at speeds in which these sophisticated algorithms compute in real time, therefore allowing the artificial intelligence to function at high real time speed. Having an array of Quantum processors (including linear array) is also with-in the scope of this invention, or any standard binary processor(s)/linear array of binary processor(s). Also, any computer system that may communicate with the processor(s) such as graphics processors (GPU) plus GPUPU-graphics processing unit(s) with processing unit(s). Sensor(s) such as accelerometer (optical/ultrasonic/magnetic) with three-dimension (tri-axial accelerometer(s)) motion, or multiple accelerometers coupled to a processor(s)/inertial motion unit(s) to compute three dimensional omni-vector/motion/movements/distances, plus photodiodes/arrays and/or Infrared photodiodes/arrays with high speed photo capabilities, and or optical filtered high speed imaging with Infrared capabilities, which utilizes analog and/or digital imaging as an input. Cellular Visual Micro processing/Digital image processing/camera image processing standing alone and/or combined with other inputs devices, may also be utilized for inputs. Global Positioning Satellite/Cellular Positioning standing alone and/or combined, may be combined with other motion sensor(s)/system(s), to perform vehicular motion/positioning for fuelling/transfer/exchange event(s).

The use of Artificial Intelligence for repetitive motions performed for a Natural Gas Chemical Family/Hydrogen/Propane/butane/ethane/ammonia/oxygen Vessel/Vehicle fueling/transfer/exchanging/events/exchange(s); plus utilization with-in Hy-Brid battery electric vehicle(s), is within the scope of this invention, which includes location (3-D), mooring, tether line,/tethering, anchoring, docking, parking, grounding, positioning, elevation, depth, distances, movements, motions, of vehicle (weather wheeled, tracked, Rail, Barge (mechanized), ship, marine, spacecraft, aircraft, aircraft-car, Drones, rocket/capsule(s)). Also, included are repetitive motions for fuelling connections, weather it be the coupler, rotating coupler, coupler locking mechanism, articulating arm, rotating arm, extension, rotating extension, connector, rotating connector, sliding arm/connector, clamp (ing) connection, rotating sliding arm/connection, bridge, articulating bridge with sliding and/or rotating base. Artificial Intelligence capabilities will insure safe Natural Gas chemical family operation(s)/positions/retractions; and/or hydrogen/propane/butane/ethane/ammonia/oxygen, connections to repeat, with safe, accurate, transfers/exchange(s) each and every fuelling/transfer(s)/exchanging event. Sensors such as magnetic, optical, and ultrasonic (MOU) will provide inputs, outputs, and/or feedback signals for the processor/s to compute operation(s)/location(s)/positions/of vehicle safe power operation(s)/tank/fueling connectors via networked data transmission(s). Signal(s)/sensor(s) such as power supply/circuit-breakers(s)/contactor(s)/Motor control centers/Motor overloads/automatic transfer switch(s)/tiebreaker(s)/Torque, strain gage, (LVDT), force, pressure, location/position, optical target(s), detection of weather mechanic part is/is not in particular position, by light (visible/non-visible/I.R./U.V.)/ultrasonic/magnetic, may communicate by (OWC-Optical wireless communications; and communicate these inputs by wire, bus duct, wirelessly, via radio and/or light/fiber optic/coax cable/coax R.F. cable to/from processor/s/system network. The processor(s) will respond intelligently, and outputs will automatically react as programmed/learned to provide safe vehicle fuelling/transfer connection(s) with vehicle/vessel/tank; or not, and provide feedback signals for further information/processing; "Proper Connection Successfully Made"/ . . . "Failure due to A, B, or C error" of which further action will be necessary, such as human manual assist with joystick/controller/handheld controller, this may include fuelling/transfer/tank connection(s).

/=and/or virgule; plus, fuel+oxidizer is considered fuel/fuelling, utilizing separate storage tank(s), Magnetic/optical/ultrasonic sensor(s)/device(s)=(MOU) standing alone and/or combined each application.

The Natural Gas Chemical Family, compressed/liquefied gas(s), and derivatives are an abundant clean energy source, which are, of the cleanest fuel option(s) available today. By mixing with Hydrogen and or/Bio-Methane, which is derived from Land fills, farm/municipal digesters, thus, enables all to lower their carbon foot-print. The mixtures, as Compressed and/or Liquefied Gas (LNG/BIO-LNG/Syn-LNG) allow all to store, transport, and utilize this abundant, clean, renewable energy resource in many different composition(s)/vehicle/tank/transportation applications. Many different (%) of compressed/liquefied gas fuels/mixture(s) are possible, all are included in this patent application, including but not limited to Hydrogen, Natural Gas, Natural gas derivatives, Natural Gas Chemical family, Propane, ethane, butane, ammonia, bio-methane, synthetic gas,/any combinations/mixtures/compound(s), and/or any percentage of mixture (for example Hythane/SynGas); plus any oxidizer combinations of (solid/liquid/gas) of oxygen, triplet oxygen (O-3) ozone, peroxide, hydrogen peroxide, hydrazine. Algae growth and processing has proven fuel benefits, any/all fuel gas/liquefied gas derived from algae/mixture/compound of algae is also with-in the scope of this invention. Algae cultivation is a clean process, which may provide another green/blue fuel supply source for $21^{st}$ century transportation utilization. Cleaner fuels allow all to achieve global goals such as cleaner vehicle/vessel/rocket/plant emissions for improved air quality.

Although, Natural Gas/Hydrogen/Propane/Ethane/butane/Ammonia/oxygen (NGHPETBA/O) as compressed gas/liquefied-gas fuels absolutely must be respected, so too must electrical system(s), higher voltage system(s) shall command equally high levels of respect. Also, the power combination, such as Hybrids, leads to an even higher level of risk/safety, due to the fact that close(r) proximity of electrical and gas/liquefied gas components elevates risk factors. The fuel/battery transfers, the fuel tanks/exchanging/charging, the filling/supply system(s)/apparatus/equipment, and the overall safety culture to prevent accidents and/or accidental releases/grounding is crucial. These compressed/liquefied gas(s)/battery electric system(s), require enhanced safety technology, diligence, and proper safety sensor(s)/detector(s)/processor(s); plus proper handling/education for wide spread use and acceptance. The rewards for utilization is cleaner air for planet earth.

However, to ensure a high level of safety, regulators and/or insurance bodies over-site, will aid in applying proper safety protocol(s). Thus, by layering safety systems, and by ensuring each fueling/charging, event/transfer/battery/exchange/tank(s) is completed safety and efficiently.

Many different transport and work vehicles exist;
Marine: ship, tug, barge, dredge . . . to name a few
Road (off): construction, mining, farming, airport support . . . to name a few
Road (on): Semi-tractors, Busses, delivery trucks . . . to name a few
Aircraft: Jets, Planes, cargo . . . to name a few
Rail Road: Freight, Passenger, Commuter . . . to name a few
Rockets and Spacecraft; Exploration, mining, transport, to name a few There are also multiple different drive/propulsion systems/paths for power/fuel consumption. The combustion engine has been vastly improved to increase efficiency and reduce emissions, some are presently achieving near zero emissions. The vehicle emission reductions, when quantified, are substantial, and clean fuels are a key component of the emission/carbon reductions. There are also turbines/micro-turbines, rotary engines, and various types of fuel cells. Fuel cell efficiency, as well as, internal combustion, may also be improved with increased oxygen % percentage(s) of system intake. Hybrids, which can be any combination(s) of fuel cell/internal combustion engines, utilized to propel vehicle drive/generate electrical power for motor shaft out-put power and/or battery charging is with-in the scope of this invention. Plus, Battery electric vehicles, depending upon the specific battery; often require range extender(s), and thus the need for Hy-Brid(s)/battery electric vehicle(s) and their associated clean fuel/fuelling/transfer(s)/delivery/operating/power safety system(s).

Liquified/compressed gas energy can also be utilized to produce oxygen, on-board the vehicle and/or processed Natural/Gas/Hydrogen/Propane/Butane/ethane/ammonia (NGHPETBA/O) may be separated, and or produced onboard and/or it may be supplied as a compressed/liquefied gas; also, any/all onboard reformer/gas cleaving/separation process onboard is also with-in the scope of this invention; such as; stripping H2 out from water/CH-4, by high temp./steam cracking/reformer on the vehicle, for use as fuel/fuel-compound/oxidizer to increase/concentrate O2 levels for enhanced fuel cell/I.C.E. performance.

Our air quality will improve greatly with a shift to the Natural Gas Chemical Family of fuels plus battery Electric Hy-Brid technology. However, Safety must be paramount, and safe operations of fuelling//transfers/tank exchanging of Natural Gas Chemical Family (NGHPETBA/O) requires carful planning and execution, aided by state of the art sensors, actuators, controller(s), and systems (processing/processor(s).

Multiple layers of controls and safety devices must be included in the plan. The International Electrical Commission (IEC) has established standard guidelines to be utilized for elevated Risk application levels. The IEC has modeled Safety Integrity Levels (SIL) numbered #1 thru #4; with #4 being the greatest risk level. A nuclear power plant for example; is a SIL-4 level.

In this patent application, Compressed/Liquefied Gas Chemical Family (NGHPETBA/O)/Safe fuelling/transfer(s)/exchange(s) is utilizing standard guidelines set forth in IEC-SIL-3; Safety Integrity Level SIL-3.

It is at this safety Level, SIL-3, that all parties involved; (Owners, Shareholders, Regulators (Gov't), general public, Insurance, Investors) will receive the benefit of a high degree of safety system protocols. SIL-3 clearly differentiates/separates the Safety Instrumentation System(s), and the Control System(s)/System(s). SIL-3 requires independence, diversity, and physical separation for each level of protection. The safety system architecture shall be designed in such a way that none of the components/instrument(s)/processor(s) of the process/control system layer and the safety instrumentation control system layer can be combined, they must be independent of each other, as robust layers of safety/controls, but the system(s) may be "Paralleling"/"Layering", thus, compounding safety factors by Orders of Magnitude.

In this invention, layers of risk reduction/system(s); including Processor(s)/Control System (CS)/Safety Instrumented System (SIS); operating independently, but simultaneously, this lowers over-all safety risks to manageable levels. SIL-3 equates to a Risk Reduction Factor of 1000. This valuable combination of layering safety features, yields an exceptional safety system, to achieve near zero discharge/accident ratings. Providing all, governmental, regulatory, insurance, stake-holders, owners, and public; assurance that each operation/transfer/fuelling/tank/exchange event is protected by layers of technology, for robust/very high degree/level of redundant safety.

Mitigation systems are generally, different parts of process/control, due to the fact that they are activated after the occurrence of an event (that should have been prevented by normal CS operations), SIS mitigations, such as; Emergency STOP/SHUTDOWN/vehicle lock-out release system(s)/device(s), de-activate/activate/-/vessel/vehicle/exchange/motion/movement detection system(s)/Fuel and or transfer system shut-down/fuel and or transfer line(s) release/Fire detection system/Explosion detection system/High-High tank level(s)-(either/any tank with-in system)/Hi-Hi Oxygen content (transfer system and/or tanks)/High-High transfer system flow rate/High-High Level Gas detection system(s)/High-High transfer(s) system(s) pressure(s)/Low Hydraulic pressure (either Hyd. Source)/Electric power Loss (either source)/High-High tank(s) pressure (either tank-all tank(s)/Low-Low transfer line pressure(s)(either line)/Temperature/differential highly abnormal range/High-High Seismic system(s) detection/weather abnormal/lighting-arcing-static/detection/SIS-CS/Network-communications-signal loss/all monitored by a dedicated Safety Instrumented System (SIS). This SIS will passively operate for extended periods (monitoring closely for an abnormality), and in the unlikely event, the SIS system shall rapidly function and save lives and assets, by it's A.I./preprogramed Input(s)/out-put(s) and related actions.

All control system (CS) input(s)/system(s) and Safety Instrumentation System (SIS) input(s)/outputs/systems will be isolated/separate/parallel instrument(s)/system(s). The processor(s), both CS and SIS will act indepententanly, but may act simultaneously, and both may have output signal(s), which may be identical, but separate; which may utilizing signal diode(s) to maintain individuality of signal to common output device(s), and/or logic gates/circuits at common output device(s). The input(s)/output(s)/system(s) will be stand alone signal(s)/instrument(s)/system(s); the output(s)/system(s) may utilize combined signal(s), thus from both the CS/SIS to activate device(s) for safety operation(s). They may be PLC's or part of plc systems; they may be DCS/part of DCS systems, module(s), Node(s), or and Input/output system that communicates. It may also include switch/switches (multiple style/functions; ie two-pole, multiple pole, rotary, encapsulated, etc.) these switches may also act as a by-pass/override to any system, for/from switch activation, instead of program activated/activation/operation(s).

The Process Control System (PCS) and the Safety Instrumentation System (SIS), in many ways are virtually identical, but in many settings the PCS may be set to lower set-points, so as to act first, then if proper action is not achieved (or PCS failure) then the SIS system will activate/provide appropriated course of action. An example would be: As depicted on FIG. 1-A, Supply tank measurements (temp., pressure, level) has a rising internal pressure reading, and the PCS supply tank transmitter has a failure with an improper reading; the in this situation the PCS will allow a fuelling/transfer to occur; BUT the SIS supply tank pressure transmitter is reading the ABNORMALLY HIGH or HIGH-HIGH reading the SIS will not allow the fuelling/transfer to occur until situation is corrected (usually by internally re-circulating spray pump to bring internal tank pressure down); and have the PCS supply tank pressure transmitter repaired/replaced. As one can appreciate the levels of redundant safety has prevented over-pressurized supply tank, and possible PRV releasing (possibly to atmosphere).

The same redundancy is provided for critical instrumentation and safety systems; from temperatures, pressures, levels, flows, valve(s), fire detection, explosion detection, motion (land and sea) detection, automatic vehicle release systems, vehicle lock-out systems, fuelling/transfer lock-out systems, automatic vehicle identification systems (utilizing A.I. features), and controllers such as joy-stick, roller ball, track-ball, mouse, touch-screen, I-Pad, voice activated controller, wireless controller(s). All systems will have capabilities of primary control, and secondary back-up control (in case of primary control failure).

In the present invention, many different sensor(s), device(s), systems, processor(s), and components make redundant safe, compressed/liquefied gas/fuelling/transfer(s). The system(s) all participate/communicate in an intelligent control system/network. The following items are included; input(s), devices, output(s), smart/intelligent device(s), temperature/differential/transmitter(s)/(xmtr(s), pressure (absolute/compound) xmtr(s), level xmtr(s), level controller(s)/computer(s), flow meter(s) xmtr(s), flow/computer/controller(s), valves (multiple style, design and applications), positioner(s)/xmtr(s)/PPFB (positive position Feed Back), analyzer(s), piezo electric device(s), nitrogen system(s), hydraulic system(s), accelerometer(s)(MOU)/coupled to processor(s) to compute motion, tri-axial accelerometer(s) (MOU) coupled to processor(s) to compute motion, magnetometer(s), Inertial motion unit(s) (MOU), gyro(s)-(MOU), mems device(s), mechanical gyro(s), multiple gas detector(s)/detection/density (MOU) system(s), oxygen detection/(MO) paramagnetic/electrochemical detection system(s), Speed/R.P.M. detection, analyzer system(s) inerting system, combining I.R. and U.V. optical for fire detection (comparing/computing multiple viewing wavelengths/multiple different fueled fire wavelengths/ flicker/speed), high speed camera, photodiodes/arrays, phototransistors/arrays, fiber optic imaging, infrared imaging/ camera(s)/Hybrids of imaging devices, artificial vision system(s)/combined imaging/GPS system(s) systems with artificial intelligence for vehicle/vessel detection/motion/ positioning, Artificial intelligence (A.I.), Synthetic Intelligence (S.I.), Narrow A.I. (A.N.I.), Machine Learning (M.L.), Artificial general intelligence (A.G.I.), virtual assistants, Neural networks, Hybrid Neural networks, recurrent Neural networks, Evolutionary algorithms, algorithms, differential evolution, automated planning and scheduling, automated reasoning, automation, speech recognition, speaker recognition, image processing, intelligent word recognition, head set(s), ear-phone-pieces/micro-phone(s)/(array-of), object recognition, gesture identification, gesture recognition, optical mark recognition, silent speech interface, Hybrid intelligence system(s), intelligent agent, intelligent control data mining, process mining, information extraction, image recognition, image retrieval, deep learning, Neural model fields, language identification, natural language user interface, machine translation/languages, nonlinear control, pattern recognition, optical character recognition, speech recognition, facial recognition, iris scanning, finger print scanning, bio-recognition, bio-scanning utilizing (optical/ultrasonic), robotics, behavior based robotics, cognitive robotics, development robotics, robot navigation, cyber metrics, evolutionary robotics, speech generating device, vehicle infrastructure integration, virtual intelligence (V.I./A.I.), distributed Artificial intelligence (D.A.I.), Open A.I. (O.A.I.), system integration, automatic reasoning, automatic computing, automatic network, description logic, means-end analysis, performance-environment-actuators-sensors (PEAS), ordered weighted averaging, aggregation operation, perceptual computing, soft computing, software agent, comparative program(s), autonomous agent, hierarchical control system, networked control system, distributed artificial intelligence, multi-agent system, monitoring and surveillance agents, embodied agent, situated A.I., automated reasoning, reactive machines, limited memory, theory of mind, artificial neural network, and logic, or logic, and/or logic, if logic, if then logic, pre-training, nano-devices, MEMS devices, recurrent neural networks, deep feed-forward neural networks, developmental networks, where what networks, learning rule, learning, learning paradigms, reinforcement learning, learning algorithms, convergent recursive learning, supervised learning, unsupervised learning, cerebellar model articulation controller (CMAC), CMAC neural network, computational complexity, group method of data handling (GMDH), convolutional neural networks (CNN), long short-term memory (LSTM), large memory storage and retrieval neural networks (LAMSTAR), stacked auto-encoders, deep stacking networks, (DSN), deep coding networks, deep predictive coding networks, compound hierarchical deep models, distributed memory, hierarchical temporal memory, neural Turing machines, differentiable neural computers (DNC) deep reservoir computing, artificial neural networks, multilayer perceptron, back-propagation algorithm, automatic differentiation, encoder-decoder networks, machine translation, multi-layer kernel machine (MKM), kernel principal component analysis (KPCA), principal component (CP), reactive machines, limited memory, theory of mind, differentiable functions, automatic image annotation, Variable Frequency Drive(s), triac speed drive(s), sensor/signal diode(s), electrical starters, contactor(s), transfer switches, transformer(s), inverter(s), UPS systems(s)-w/bypass, batteries (stacks/bank(s)), battery monitoring/temperature control system(s), fuses, circuit breakers, M.C.C., M.O.L., cross tie(s), relay(s) (multiple design, style, contacts, voltages, poles, coils) auxiliary relays/contact(s), reversing relays, optical relays, optical switching, ampere(s) detector, voltage detection, current detection, actuator(s), processor(s), micro-controller(s), remote terminal unit(s), computers, computer peripherals (mouse, touch screen, monitor(s), keyboard/keypad (magnetic/optical) magnetic reader, optical reader, mouse (optical/magnetic), Personal digital assistants (PDA's), tablets, handhelds, i-phones, i-pads, track/roller ball (mouse), joy-stick, controller, microphone, printer(s), Ink cartridges, monitor(s), display(s), speaker(s)), power supply, central processing unit (CPU), sequencer/micro-sequencer, hard drives, power supplies, main boards, optical/magnetic drives, optical/magnetic readers, graphics processing unit (GPU), general purpose graphics processing unit—(GPGPU), external GPU (EGPU), integrated graphics processing unit(s) (IGPU), memory, hard drive, flash drive, cd/dvd drive, modem, router(s), software, firmware, application software, App's, operating system(s), cloud storage, cloud computing, application programming interface (A.P.I.), web servers, cloud distributed network, remote terminal unit, remote telemetry unit, remote tele-control unit, distributed control system (D.C.S.), nodes, module(s), bandwidth, network bandwidth, data bandwidth, digital bandwidth, Supervisory control and data acquisition (SCADA), master system, master data base, information system(s), Bridging (network, computer networks/interface(s), computer cluster, grid computer, super computer, quantum computing, "quant" computer, VIOP/telephone(s), servers, crossover cable, antennae (line of site and/or omnidirectional), radio transceiver(s), optical wireless communications (OWC), OWC Ultra-short range, OWC short range, OWC medium range, OWC Long range, OWC Ultra-long range, Radio waves to mechanical vibration/oscillations to optical conversions/vise-versa/radio over fiber (RFoF) light modulated by a radio frequency signal and transmitter over fiber optic link/cable, Intermediate frequency (IF-over fiber) (lower radio freq.), Fiber to the antenna (FTTA) an optical to electrical (O/E) converter, Satellite Communications on L-Band frequency range, Satellite Communications on Ka band, fiber optic amplifier(s), sectorized antenna, omnidirectional antenna/system(s)/processor(s)/automatic dependent surveillance broadcast ADBS/controller(s)/networks// data transmission network(s), internet, either-net, extranet, wide area networks, local area networks, wired/cable networks, wireless network(s), optical networks, coaxial networks, buss network, network cable(s), fiber optic cable(s), satellite (radio & optical/combined) network(s), radio network, radio/optical networks combined, cellular network(s) (2G, 3G, 4G, 5G, 6G, CMDA), TCP/IP protocol networks, diode(s)/signal diode(s).

Wi-Fi network(s), Automatic dependent surveillance-broadcast (ADS-B), Universal Access Transceiver (UAT), computer system interface(s), cloud computing, operating system(s), Module(s), distributed control system(s), remote terminal unit(s), fire detection system(s), vehicle/vessel motion system(s), gas detection system(s), explosion detection system(s), tank exchange system(s), batteries/vehicle lock-out(s), compressed/liquefied gas fuelling/transfer system(s)/apparatus: (pumps, exchangers, evaporators, compressors, valves (various styles/specifications), controllers, Gas Combustion units, flares, knock-out/surge drum, vacuum pump(s), instrumentation, power supplies, tank(s), pipe, fittings, hoses, connectors, flow-meter(s), insulation (vacuum jacket) system(s), vehicle release system(s), fuelling/transfer line(s) release system(s), seismic detection system(s)/sensor(s), temperature, pressure, level, flow instrumentation/system(s). Optical, ultrasonic, magnetic sensor(s) detection of weather a mechanical part is/is not in a particular position/electrical control/power system(s).

A fire detection system that combines (views certain wavelengths) infrared and ultraviolet fire detection for all compressed/liquefied gas fuels; including the following: Natural gas (many different mixtures/compositions/percentages of contents), propane, butane, ethane, hydrogen, ammonia, also including compositions/mixtures such as Bio-gas/bio-methane (land-fill/digester gas) synthetic gas, bio-hydrogen, hythane/hythene (mixtures of ethane/hydrogen/with natural gas (various percentages of mixtures)). Multiple mixtures/compositions can be utilized to lower carbon emission levels. This detection system can be filtered/adjusted/limited to view of certain wavelengths (both I.R. and U.V. combined) to detect/selective fire signature to improve fire detection(s). This system can selectively view each different fuel's mixture/composition's fire signature, and relay/transmit signal/alarm, by wire/wirelessly by radio/light, and/or any combination of communication signal(s) to both C.S and S.I.S. system(s) to stop/mitigate fuelling/transfer systems, and/or activate automatic fuel/transfer line release system, and/or the vehicle lock-out release.

Multiple devices/sensor(s)/processor(s) and/or fuelling/transfer system(s)/vehicle(s) will be redundant; and have two parallel (2)/separate electrical/source(s)/feeds; and shall be two-(2) independent control/operating/instrumentation system(s), operating/controlling compressed gas/liquefied gas fuelling/transfer(s)/systems; plus vehicle(s) fuelling/transfer/system(s) for safe redundant control(s). The electrical feeds/batteries shall be separate, as can be the power supply sources, electrical generation sources can be local and/or remote power system(s); monitoring to include separate/individual voltage monitor(s), frequency monitor(s), ampere(s) monitor(s), and Kilowatt monitor(s), with individual isolation transformers, individual inverters and individual (UPS) Uninterrupted Power supplies/batteries, (with bypass), plus UPS capacity to power all computer(s)/processor(s)/controller(s)/remote terminal unit(s)/modules/device(s) for duration of a shutdown/controlled stopping/and/or inerting of system(s), plus extra reserve battery power for safety time factor. This added layer of operational protection will reduce accident potential by orders of magnitude. Redundant, parallel, power feeds/batteries will provide duplication of safety control(s) CS/SIS system(s), enhanced by back-up UPS/battery system(s). Human/hand-held controller(s)/interface(s)/touch-screen(s)/monitors/joy-stick(s) shall be Independent and duplicated/and may contain split screen/side by side/multiple screen operations, for diverse operational awareness and system control(s). The above listed device(s) and system(s) may be on the vehicle/battery electric vehicle/vessel/tank and/or the fuelling/transfer supply system/apparatus and/or in parallel/duel on any/all system(s), controls, monitor(s)/remote controlled.

All compressed/liquefied gas vehicles will benefit from utilization of ADSB/AIT. These systems will broadcast and receive wireless satellite signals to/from vehicles with-in range of station (often fuelling/transfer station) to send and receive data/information updated every few seconds. It provides weather, situational awareness, (other vehicles in area) it can also be enhanced to provide object recognition (plus A.I. evolutionary algorithm) also additional data, such as tank levels, temperatures, pressures for operational awareness; and to prepare vehicle tanks for volumes, and pressures to enhance operations in preparation to transfer fuel(s). This feature will be useful to identify vehicles, as files stored in memory will recall the identity (equipment type, sizes) of each vehicle, and type/volume/flow rates of fuel to transfer. This system will also inform vehicles if fuelling/transfer location is available or not; which may assist in timing of movements to/from fuelling/transfer area; and give vehicle operator awareness of other traffic in area, for assistance of maneuvers, as well as for collision avoidance. The ADBS/AIT, with enhancements for compressed/liquefied gas fuelling/transfers, will improve fuelling/transfer safety, vehicle maneuvers, and preparations of tank(s) conditions, pre=transfer check-list, all prior to arrival, for over-all improving safety and efficiency of fuelling/transfer event.

Figure 1B:
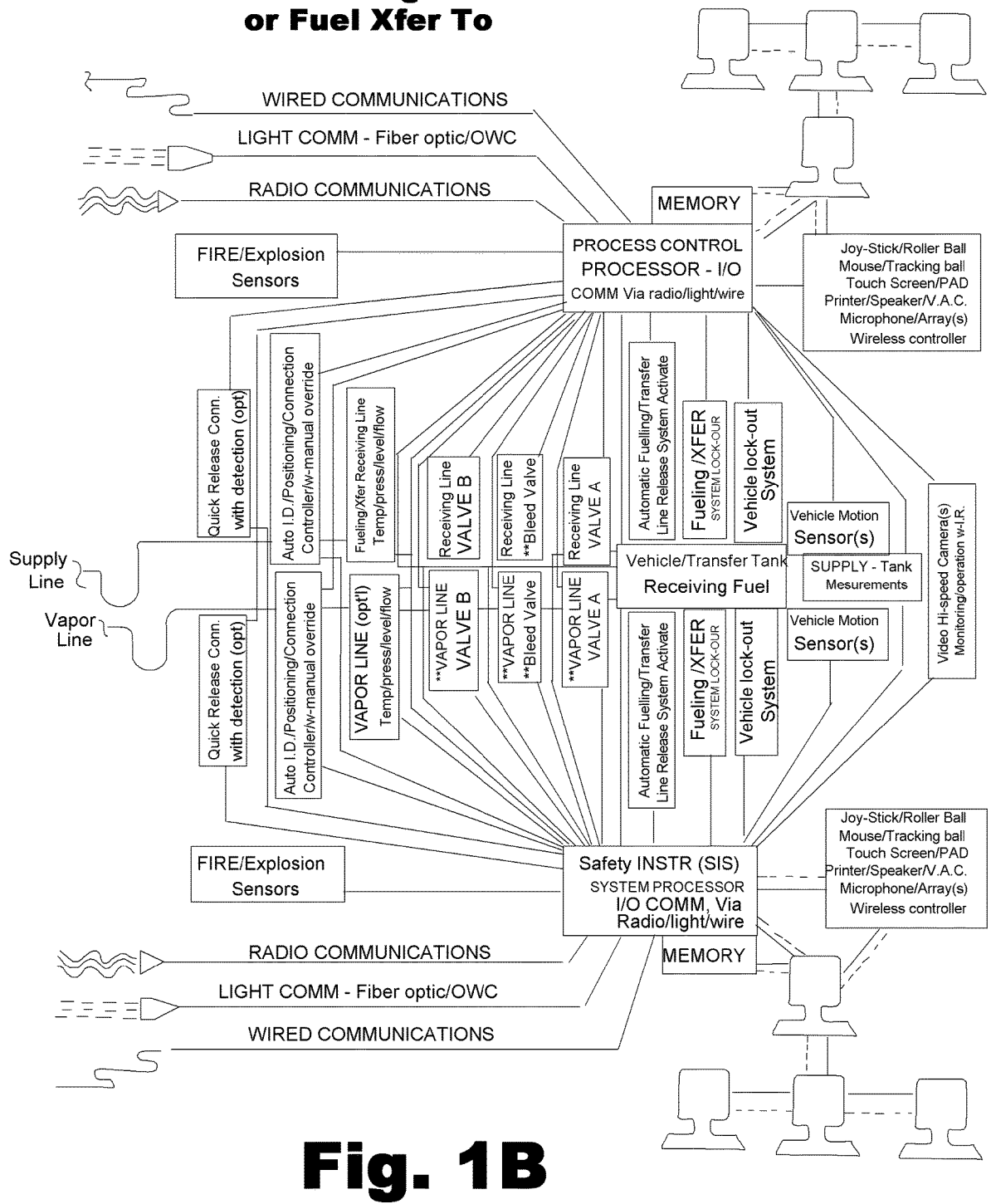

Detailed descriptions of FIGS. 1-8 are as Follows:

FIGS. 1A-1B show an embodiment of safety shutdown systems of the present invention. FIG. 1A is the fueling or fuel transfer system, while FIG. 1B is the vehicle being fueled or receiving a fuel transfer.

Figure 2A:
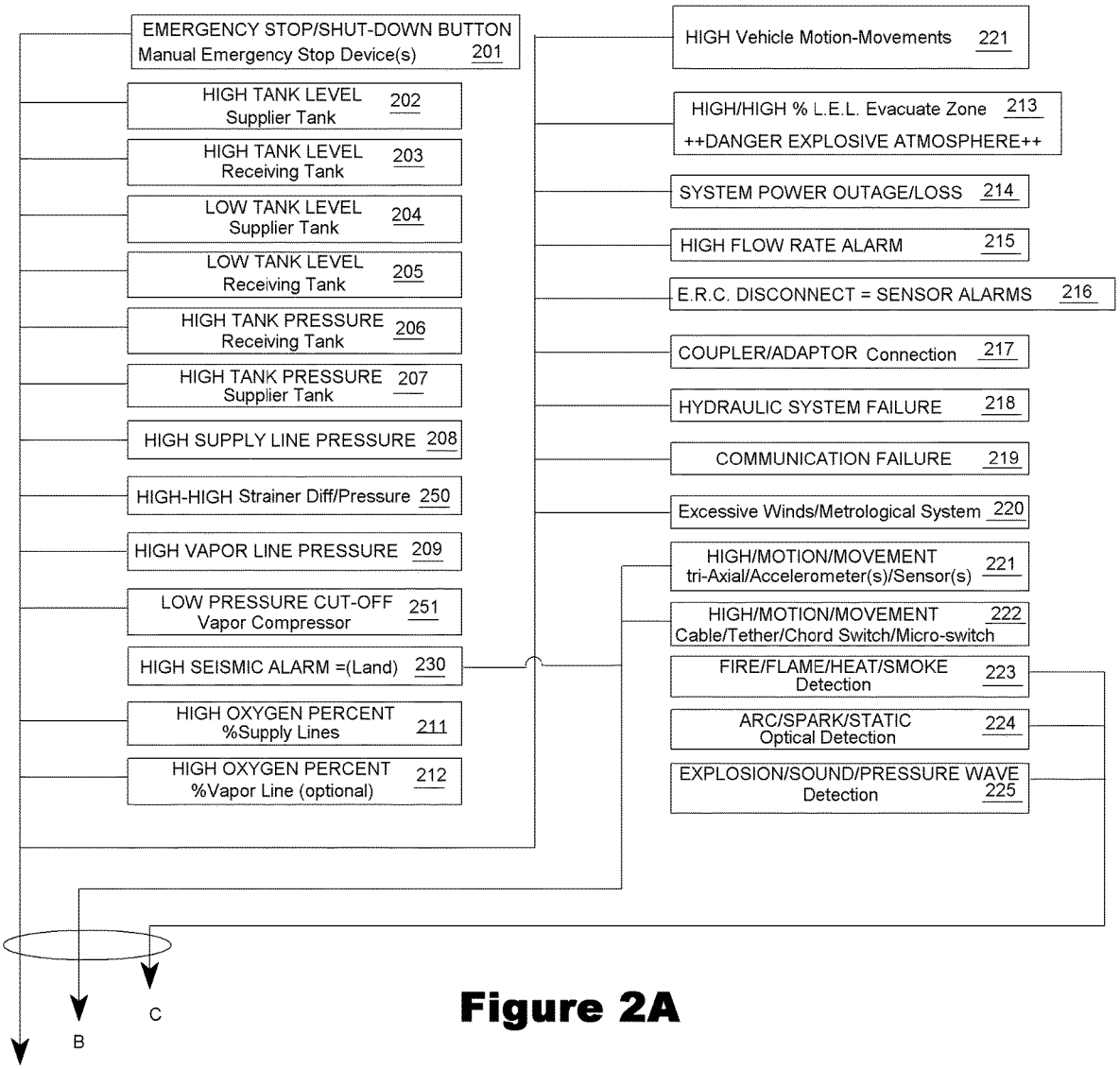
FIG. 2A is a chart of inputs to a process control emergency shutdown sequence.
Figure 2B:
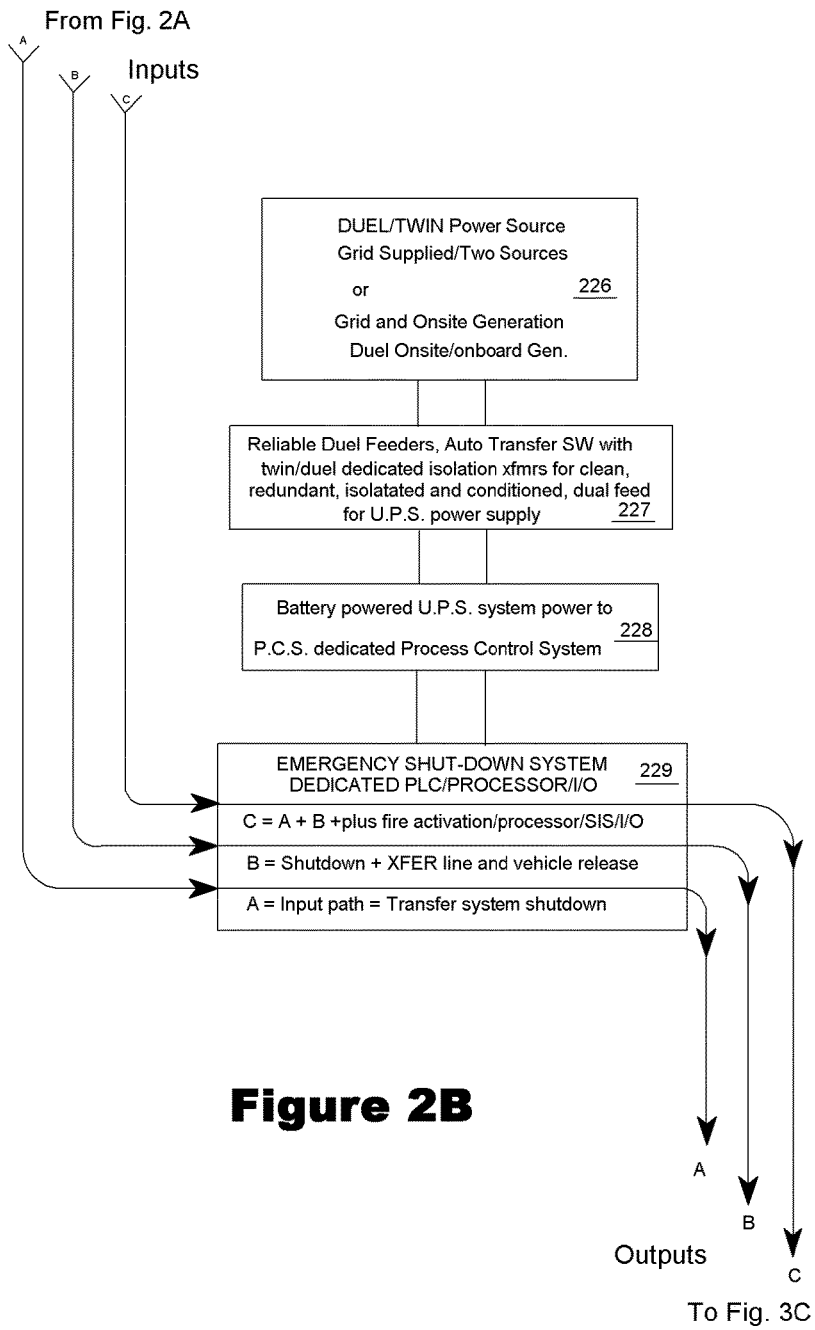
FIG. 2B is a chart of processors related to FIG. 2A.

FIG. 2A is a chart of inputs to a process control emergency stop or shutdown system. The inputs shown on the left in FIG. 2A are: emergency shut down devices (201), high tank level at supplier tank (202), high tank level at receiving tank (203), low tank level suppler tank (204), low tank level receiving tank (205), high tank pressure receiving tank (206), high tank pressure supplier tank (207), high supply line pressure(208), high-high strainer differential pressure (250), high vapor line pressure (209), low pressure cut-off on vapor compressor (251), high seismic alarm (on land location) (230), high oxygen percentage in supply lines (211), high oxygen percentage in vapor line (this is optional) (212). The inputs shown on the right in FIG. 2A are: high vehicle motion movements (221), Dangerous explosive atmosphere - the zone, vehicle or transfer area must be immediately evacuated (213), system power outage (214), high flow rate (215), fueling line disconnect sensor alarms (216), coupler or adapter problem (217), hydraulic system failure (218), communication failure (219), excessive wind or other weather related conditions (220), high-high motion on accelerometer(s) (221), high-high motion on cables, tethers, cords or microswitches (222), fire, flame heat or smoke detection (223), arc or spark or static electric buildup (224), explosion or sound pressure wave detection (225). All of these inputs are fed to the duel redundant processors FIG. 2B is a chart of processors showing inputs and outputs to and from the processors in the process control emergency stop or shutdown system showing inputs A, B and C from FIG. 2A) and outputs A, B, C to FIG. 4C. FIG. 2B shows the emergency shut-down system dedicated processor (229) with inputs on the left and outputs on the right. The processor (229) i powered from a duel redundant power source (226) (or from two Isolated grid sources), duel feeders (with auto transfer switch and duel Isolation transformers) (227) that feed a battery powered uninterruptable power supply (228) that powers the processor (229). The combinations of inputs to the processor are the A input to output path to the transfer or fueling shutdown system (C=A+B), the B input to output path is shut-down fueling, transfer line and vehicle release. Here the vehicle may need to get away from the fueling or transfer facility. The C input to output path is C=A+B+ for activation. As noted above, the outputs A, B and C are routed to FIG. 3C that will be described below.

Figure 3A:
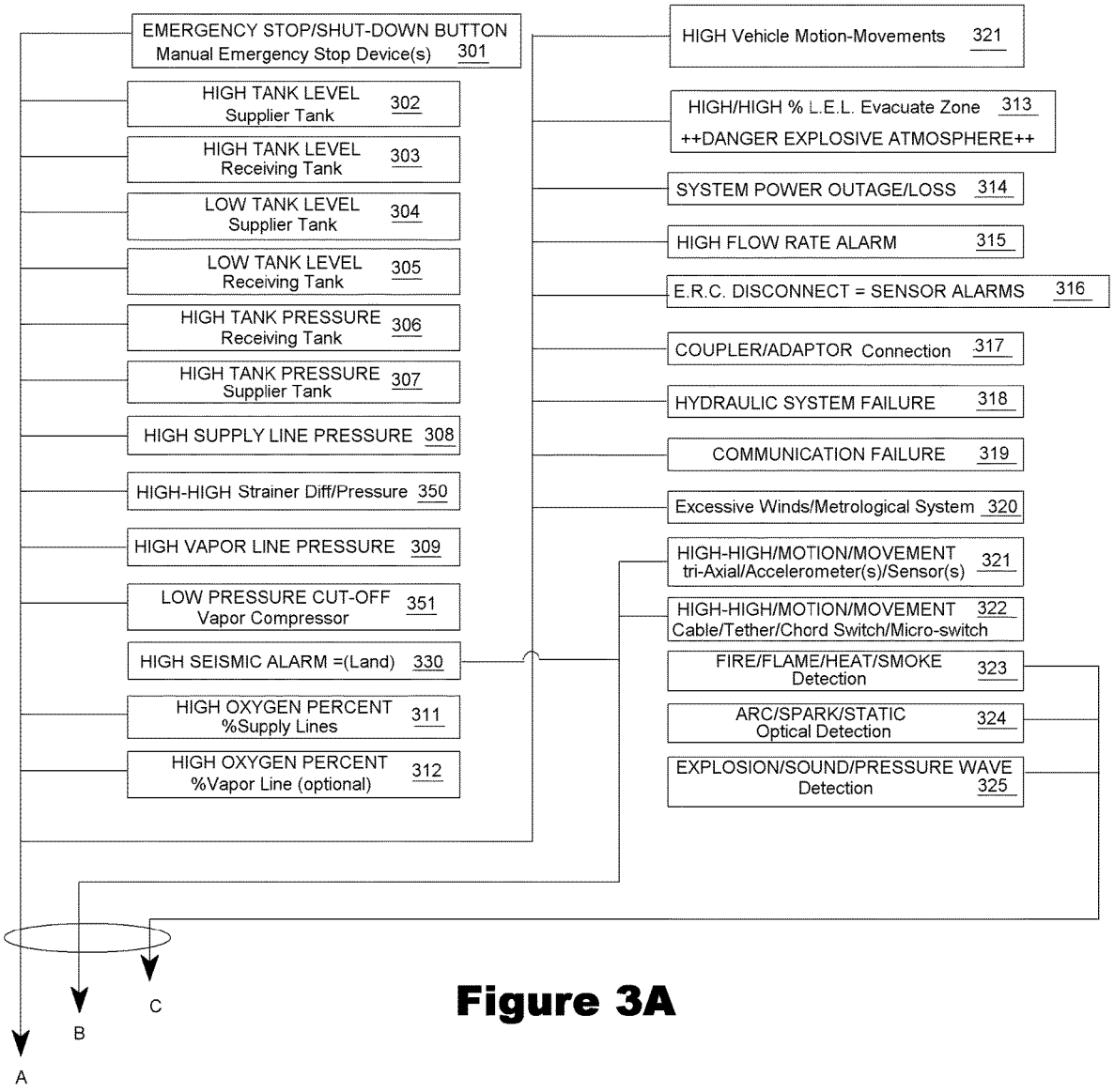
FIG. 3A is a chart of inputs to a second redundant emergency shutdown system running in parallel to the system shown in FIGS. 2A-2B.
Figure 3B:
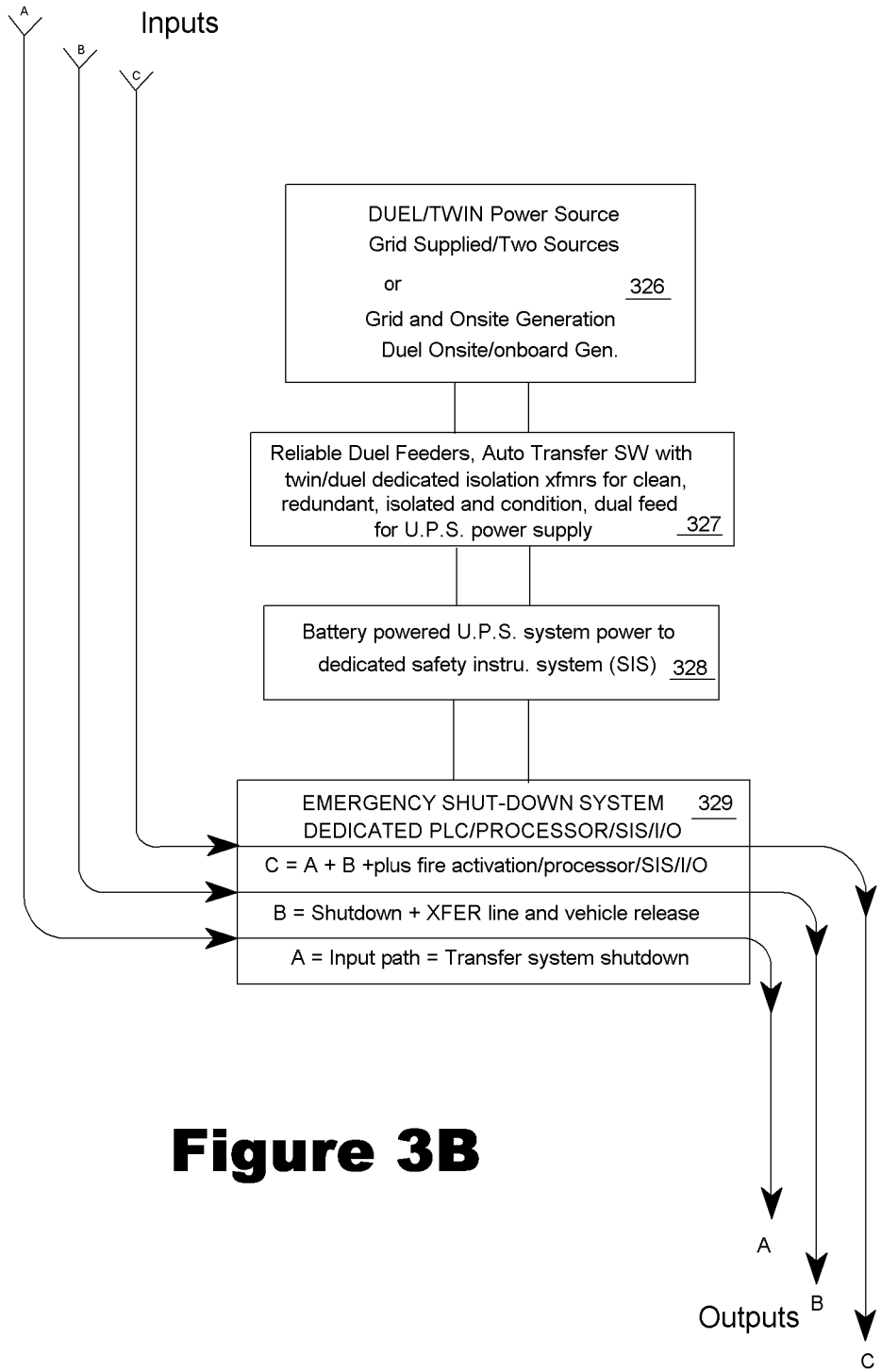
FIG. 3B is a chart of processors related to FIG. 3A.
Figure 3C:
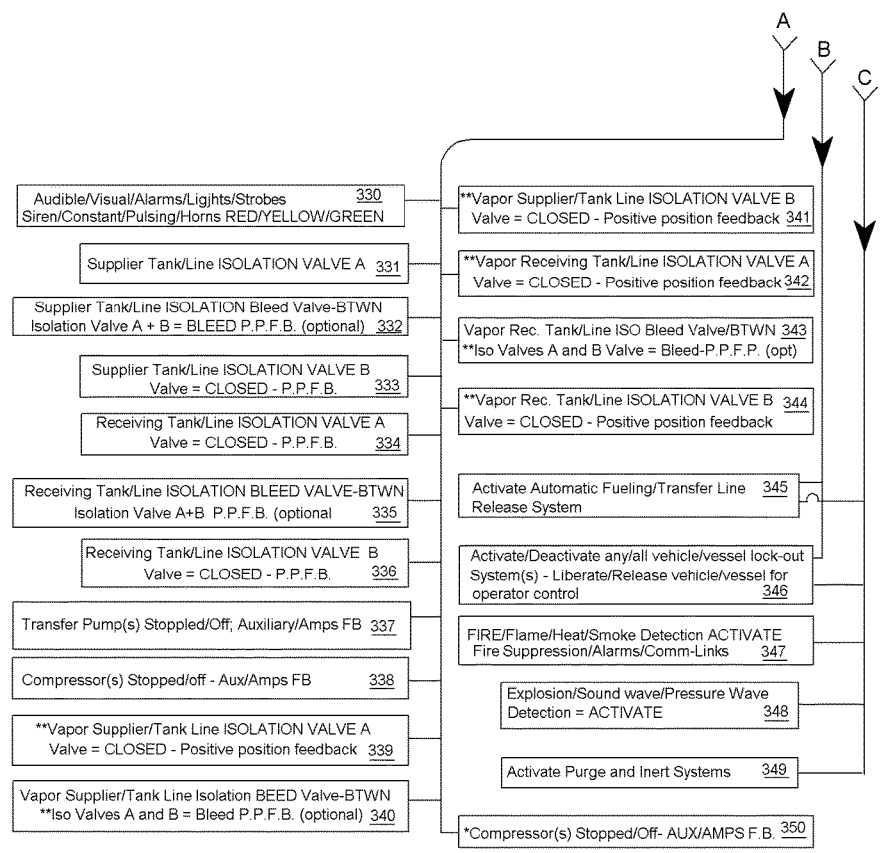
FIG. 3C is a chart of outputs related to FIGS. 3A-3B.

FIGS. 3A, 3B and 3C are almost identical to FIGS. 2A and 2B routed to FIG. 3C. However FIGS. 3A-3C show a safety instrumented backup for process control, which is a second redundant emergency shutdown system running in parallel to the system shown in FIGS. 2A-2B routed to FIG. 4C. The systems themselves are identical, but the inputs, processor(s) and outputs are entirely separate. The reference numerals in FIGS. 3A-3C start at 301 et seq., where the reference numerals in FIGS. 2A-2B start at 201 et seq.

FIG. 3A is a chart of inputs to a safety instrumented system (SIS) emergency stop or shutdown system. The inputs shown on the left in FIG. 3A are: emergency shut down devices (301), high tank level at supplier tank (302), high tank level at receiving tank (303), low tank level suppler tank (304), low tank level receiving tank (305), high tank pressure receiving tank (306), high tank pressure supplier tank (307), high supply line pressure(308), high-high strainer differential pressure (350), high vapor line pressure (309), low pressure cut-off on vapor compressor (351), high seismic alarm (on land location) (330), high oxygen percentage in supply lines (311), high oxygen percentage in vapor line (this is optional) (312). The inputs shown on the right in FIG. 3A are: high vehicle motion movements (321), Dangerous explosive atmosphere - the zone, vehicle or transfer area must be immediately evacuated (313), system power outage (314), high flow rate (315), fueling line disconnect sensor alarms (316), coupler or adapter problem (317), hydraulic system failure (318), communication failure (319), excessive wind or other weather related conditions (320), high-high motion on accelerometer(s) (321), high-high motion on cables, tethers, cords or microswitches (322), fire, flame heat or smoke detection (323), arc or spark or static electric buildup (324), explosion or sound pressure wave detection (325). All of these inputs are fed to the duel redundant processors.

Figure 4A:
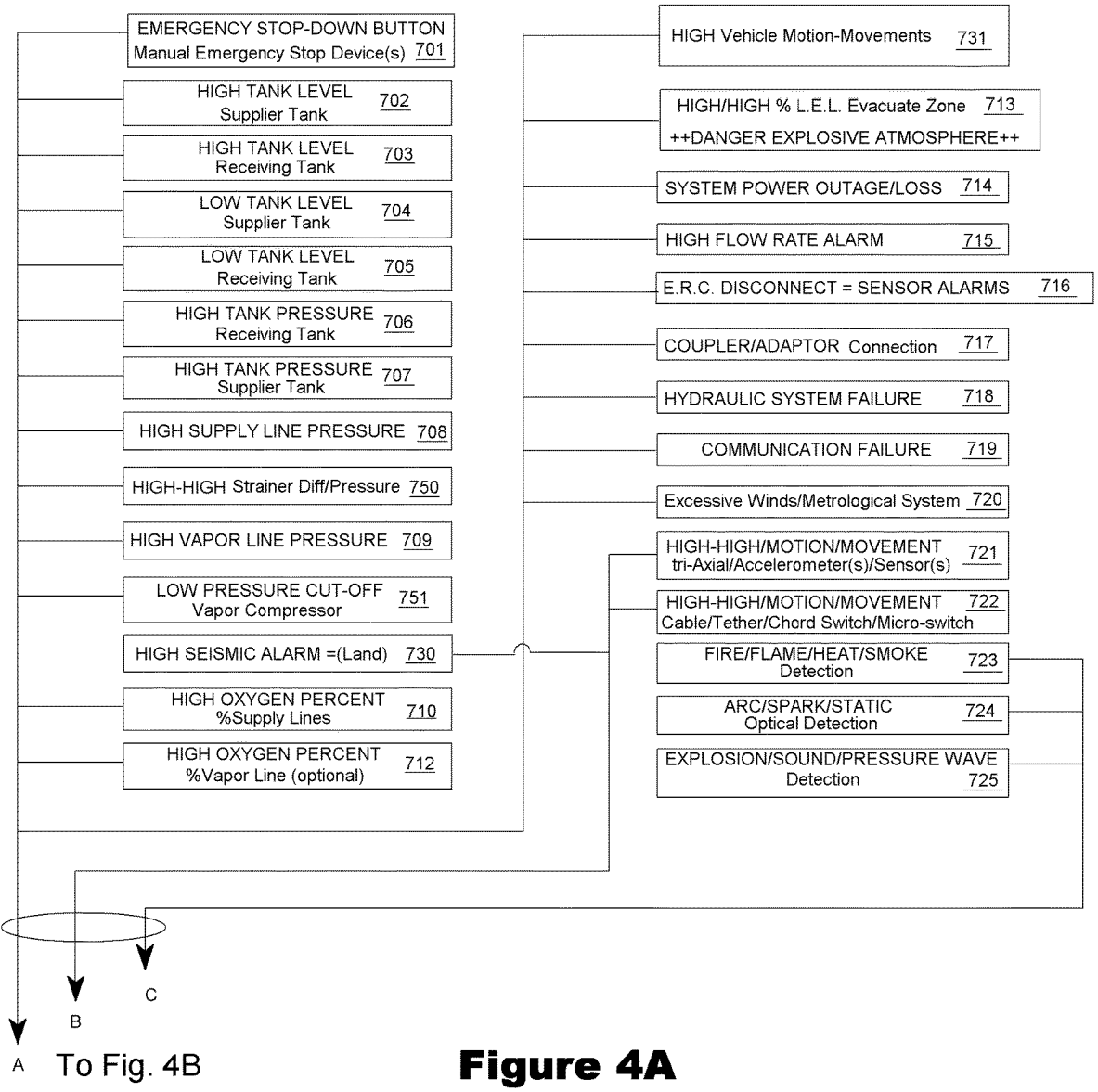
FIG. 4A is a chart of inputs to an instrumented emergency shut down system.
Figure 4B:
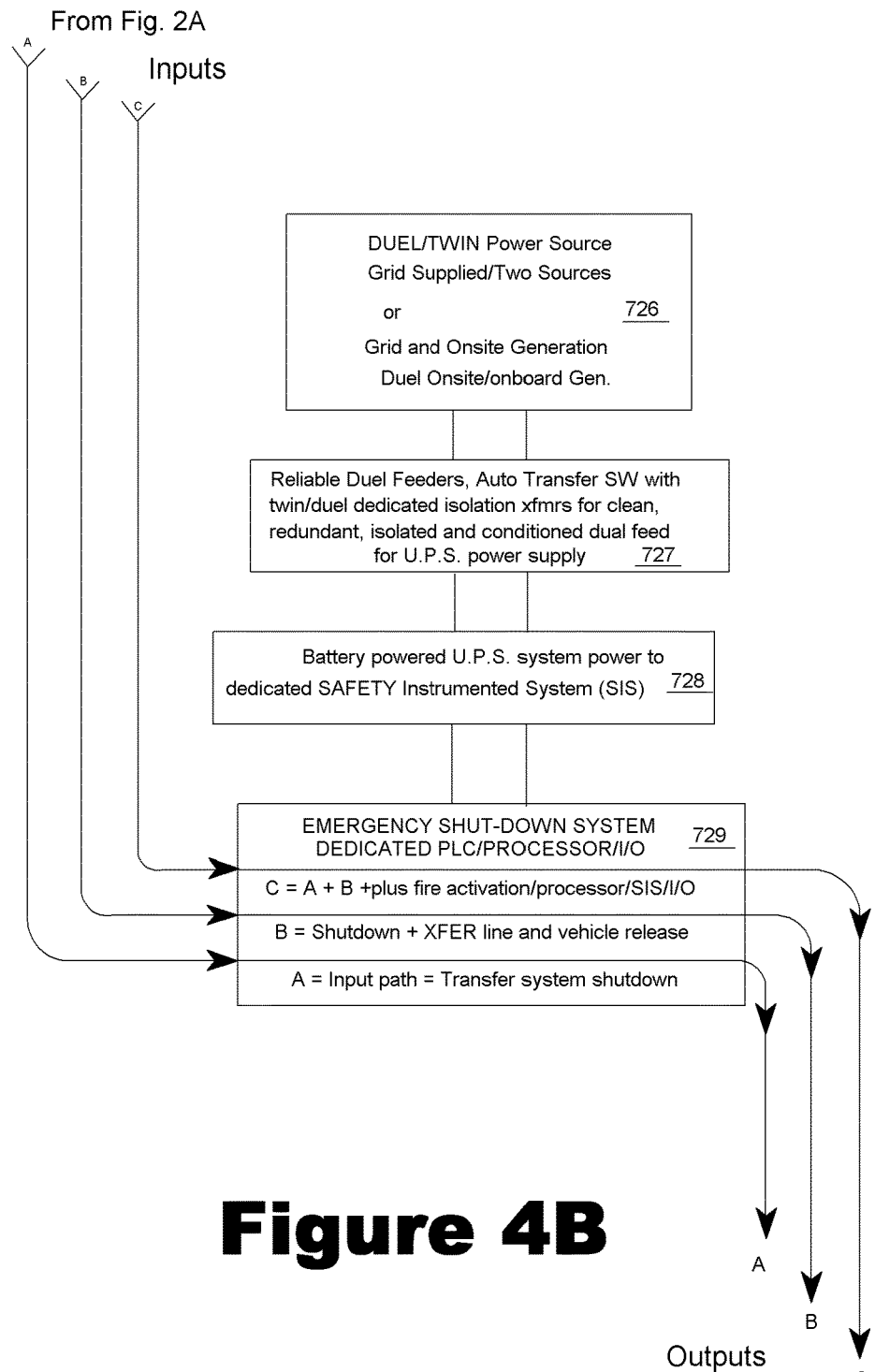
FIG. 4B is a chart of processors related to FIG. 4A.
Figure 4C:
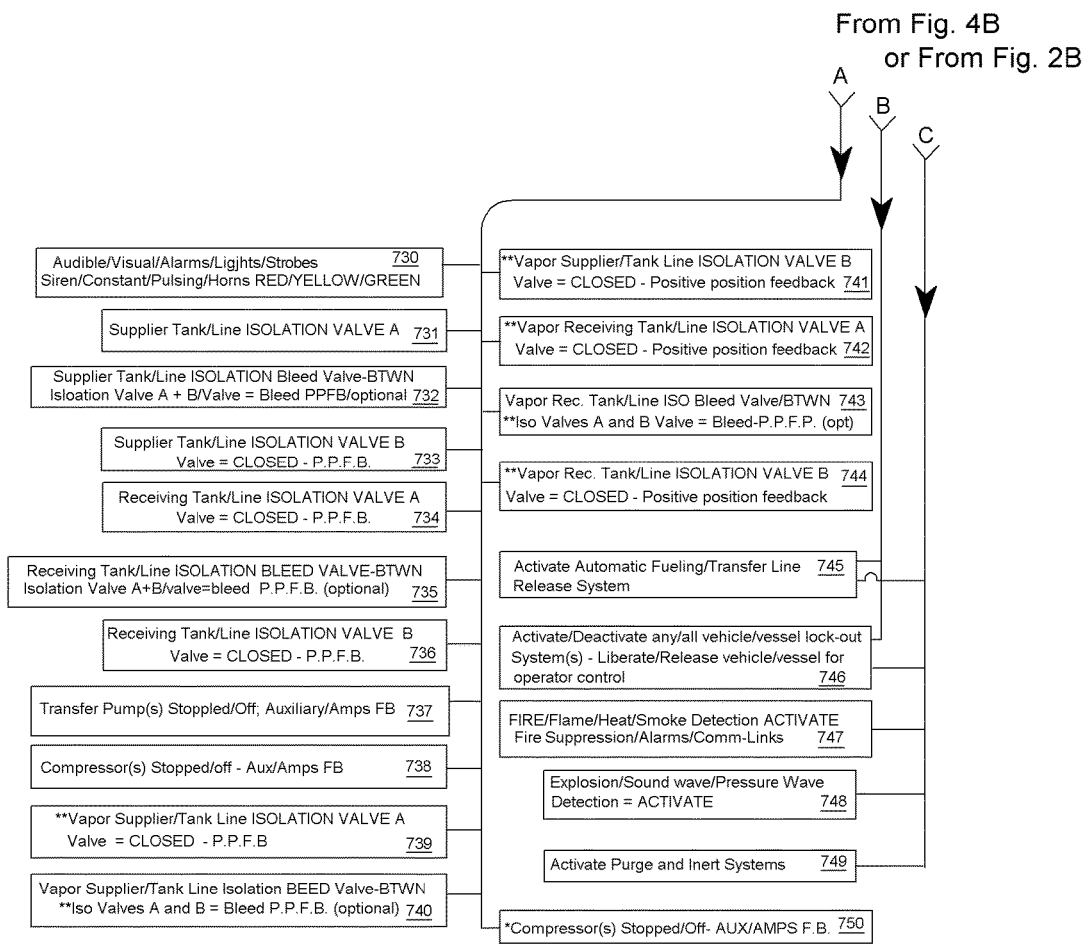
FIG. 4C is a chart of outputs related to FIGS. 4A-4B.

FIG. 3B is a chart of processors showing inputs and outputs to and from the processors in the process control emergency stop or shutdown system showing inputs A, B and C from FIG. 3A) and outputs A, B, C to FIG. 4C. FIG. 3B shows the emergency shut-down system dedicated processor (329) with inputs on the left and outputs on the right. The processor (329) i powered from a duel redundant power source (326) (or from two Isolated grid sources), duel feeders (with auto transfer switch and duel Isolation transformers) (327) that feed a battery powered uninterruptable power supply (328) that powers the processor (329). The combinations of inputs to the processor are the A input to output path to the transfer or fueling shutdown system (C=A+B), the B input to output path is shut-down fueling, transfer line and vehicle release. Here the vehicle may need to get away from the fueling or transfer facility. The C input to output path is C=A+B+ for activation. The outputs A, B and C are routed to FIG. 3C.

FIG. 3C is a chart of outputs routed from FIG. 3B. These outputs are actions caused by the processor(s) in FIG. 3B. On the left side of FIG. 3C the following outputs or actions are shown: Audible or visible alarms can be lights, strobes, sirens, constant or pulsing horns; colors can be red, yellow or green (330), the supplier tank or line Isolation valve A can be placed in the closed position (331), the supplier tank or line Isolation bleed valve with positive position feedback (PPFB) (332), the supplier tank or Isolation valve B is closed (333), the receiving tank Isolation valve A is closed (334), the receiving tank Isolation bleed valve is between Isolation valves A and B is closed or opened (335), the receiving tank Isolation valve B is closed (336), the transfer pumps are stopped (337), the compressors are stopped (338), the vapor supplier or tank line Isolation valve A is closed (339), the vapor supplier or tank line Isolation bleed valve is closed (340).

The right side of FIG. 3C shows the outputs: vapor supplier or tank line Isolation valve B is closed (341), the vapor receiving tank or line Isolation valve A is closed (342), the vapor receiving tank or line Isolation bleed valve (343), the vapor receiving tank or line Isolation valve B is closed (344), the fueling or transfer line is released (345), all vehicle or vessel lock out systems are activated or deactivated to liberate or release the vehicle or vessel to operator control (346), fire or flame or heat or smoke detection activates fire suppression systems, alarms and communication links (347), explosion or sound wave or pressure wave detection is activated (348), purge and inert systems are activated (349), and compressors are stopped (350).

FIGS. 4A-4C are charts of inputs to a safety emergency stop/ shut down system (SIS). FIGS. 4A, 4B and 4C are almost identical to FIGS. 3A, 3B and 3C However FIGS. 4A-4C show an Isolated emergency shutdown system running in parallel to the systems shown in FIGS. 2A-2B or 3A-3C The systems themselves are identical, but the inputs, processor(s) and outputs are entirely separate. The reference numerals in FIGS. 4A-4C start at 701 et seq.

FIG. 4A is a chart of inputs to a safety instrumented system (SIS) emergency stop or shutdown system. The inputs shown on the left in FIG. 4A are: emergency shut down devices (701), high tank level at supplier tank (702), high tank level at receiving tank (703), low tank level suppler tank (704), low tank level receiving tank (705), high tank pressure receiving tank (706), high tank pressure supplier tank (707), high supply line pressure(708), high-high strainer differential pressure (750), high vapor line pressure (709), low pressure cut-off on vapor compressor (751), high seismic alarm (on land location) (730), high oxygen percentage in supply lines (711), high oxygen percentage in vapor line (this is optional) (712). The inputs shown on the right in FIG. 4A are: high vehicle motion movements (721), Dangerous explosive atmosphere - the zone, vehicle or transfer area must be immediately evacuated (713), system power outage (714), high flow rate (715), fueling line disconnect sensor alarms (716), coupler or adapter problem (717), hydraulic system failure (718), communication failure (719), excessive wind or other weather related conditions (720), high-high motion on accelerometer(s) (721), high-high motion on cables, tethers, cords or microswitches (722), fire, flame heat or smoke detection (723), arc or spark or static electric buildup (724), explosion or sound pressure wave detection (725). All of these inputs are fed to the duel redundant processors.

FIG. 4B is a chart of processors showing inputs and outputs to and from the processors in the process control emergency stop or shutdown system showing inputs A, B and C from FIG. 4A) and outputs A, B, C to FIG. 4C. FIG. 4B shows the emergency shut-down system dedicated processor (729) with inputs on the left and outputs on the right. The processor (729) i powered from a duel redundant power source (726) (or from two Isolated grid sources), duel feeders (with auto transfer switch and duel Isolation transformers) (727) that feed a battery powered uninterruptable power supply (728) that powers the processor (729). The combinations of inputs to the processor are the A input to output path to the transfer or fueling shutdown system (C=A+B), the B input to output path is shut-down fueling, transfer line and vehicle release. Here the vehicle may need to get away from the fueling or transfer facility. The C input to output path is C=A+B+ foreactivation. The outputs A, B and C are routed to FIG. 3C.

FIG. 4C is a chart of outputs routed from FIG. 4B and FIG. 2B. These outputs are actions caused by the processor(s) in FIG. 4B and 2B. On the left side of FIG. 4C the following outputs or actions are shown: Audible or visible alarms can be lights, strobes, sirens, constant or pulsing horns; colors can be red, yellow or green (730), the supplier tank or line Isolation valve A can be placed in the closed position (731), the supplier tank or line Isolation bleed valve with positive position feedback (PPFB) (732), the supplier tank or Isolation valve B is closed (733), the receiving tank Isolation valve A is closed (734), the receiving tank Isolation bleed valve is between Isolation valves A and B is closed or opened (735), the receiving tank Isolation valve B is closed (736), the transfer pumps are stopped (737), the compressors are stopped (738), the vapor supplier or tank line Isolation valve A is closed (739), the vapor supplier or tank line Isolation bleed valve is closed (740).

The right side of FIG. 4C shows the outputs: vapor supplier or tank line Isolation valve B is closed (741), the vapor receiving tank or line Isolation valve A is closed (742), the vapor receiving tank or line Isolation bleed valve (743), the vapor receiving tank or line Isolation valve B is closed (744), the fueling or transfer line is released (745), all vehicle or vessel lock out systems are activated or deactivated to liberate or release the vehicle or vessel to operator control (746), fire or flame or heat or smoke detection activates fire suppression systems, alarms and communication links (747), explosion or sound wave or pressure wave detection is activated (748), purge and inert systems are activated (749), and compressors are stopped (750).

Figure 5A:
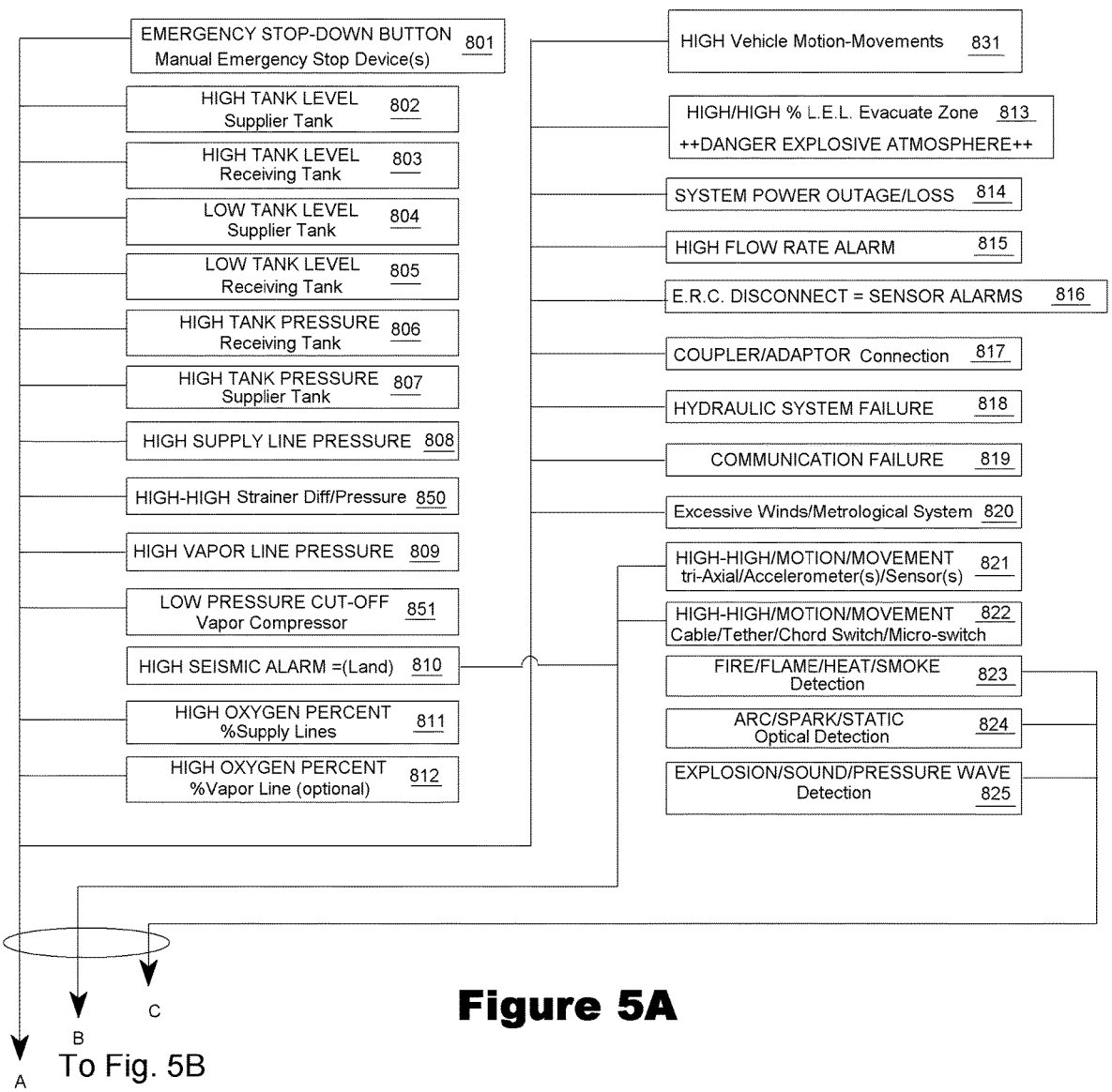
FIG. 5A is a chart of inputs to a process control shut down system.
Figure 5B:
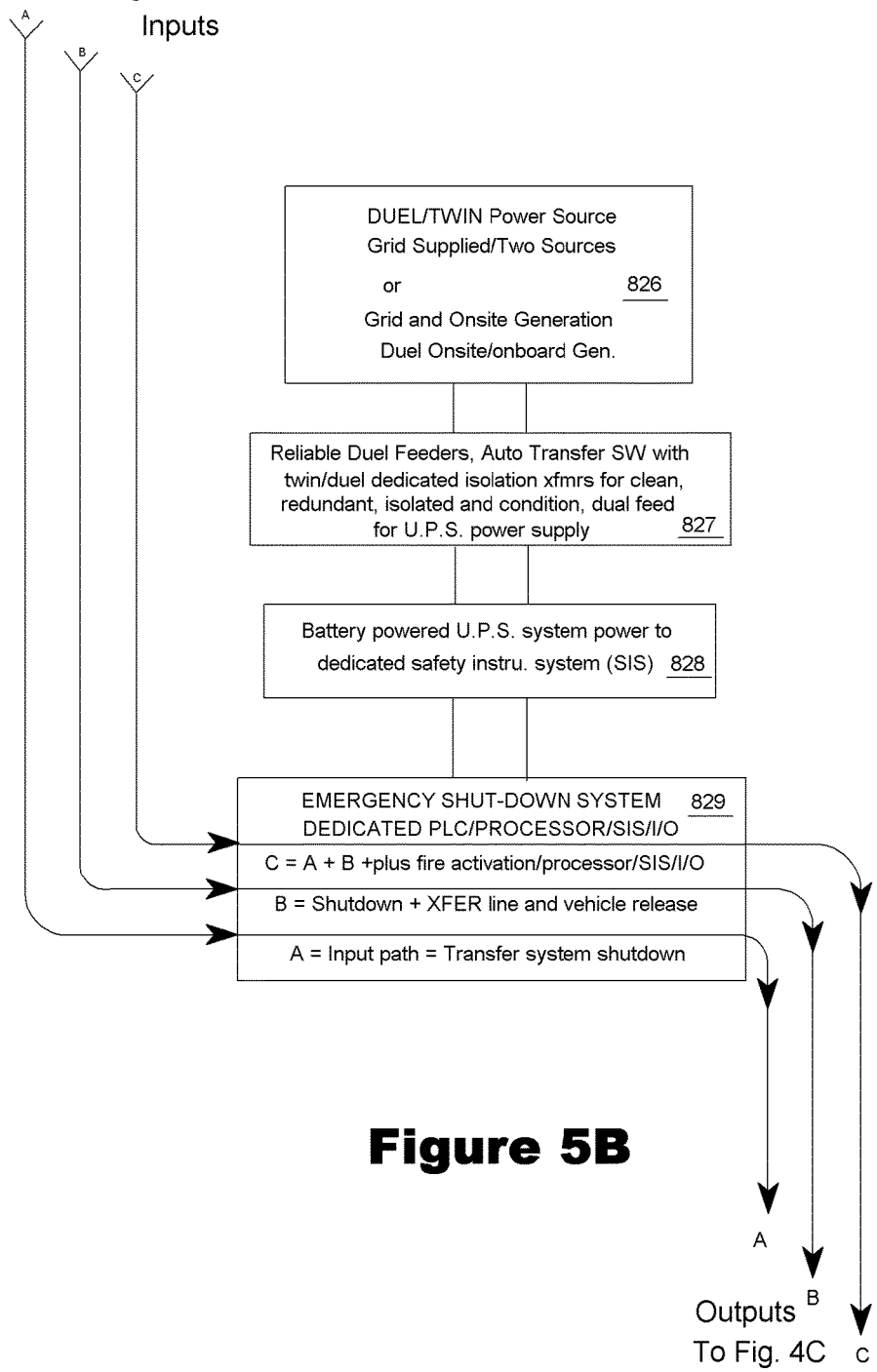
FIG. 5B is a chart of processors related to FIG. 5A.
Figure 6A:
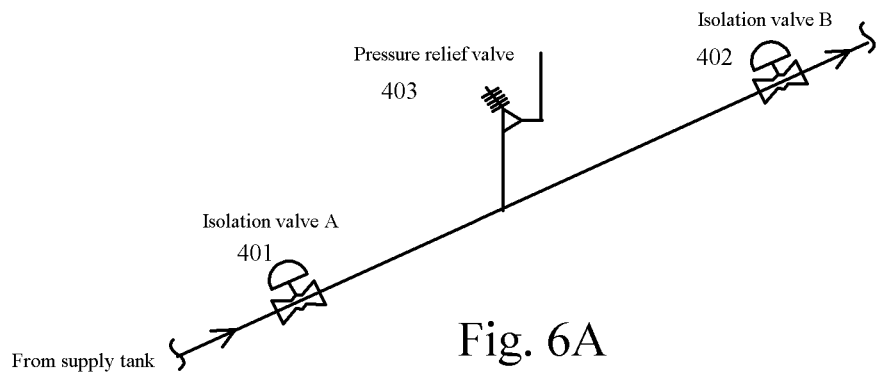
FIGS. 6A-6F show shutdown valve configurations.
Figure 6B:
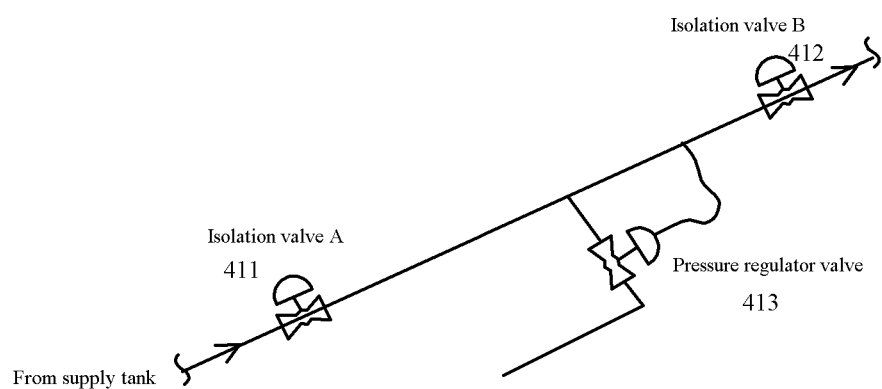
Figure 6C:
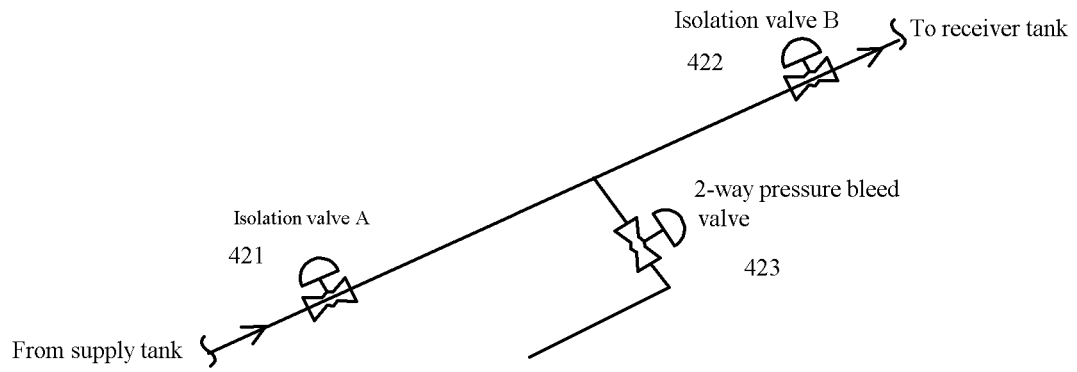
Figure 6D:
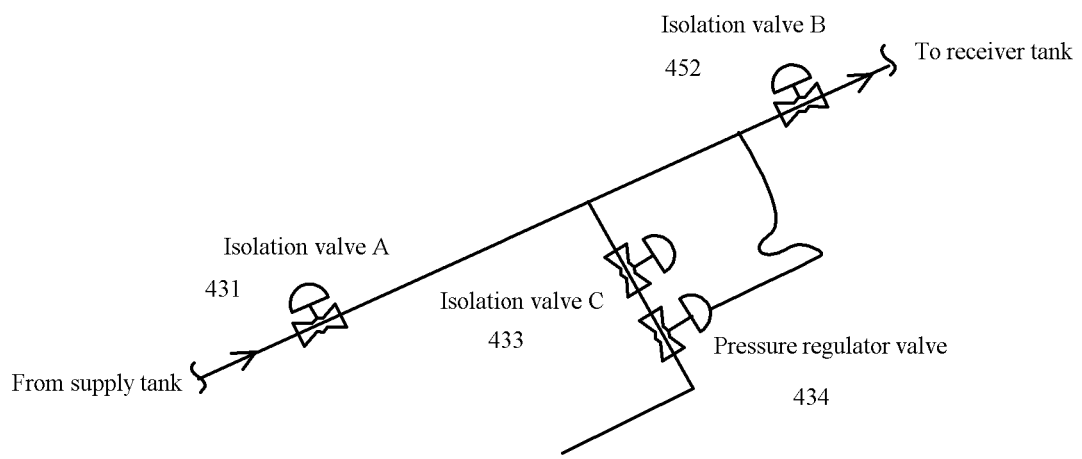
Figure 6E:
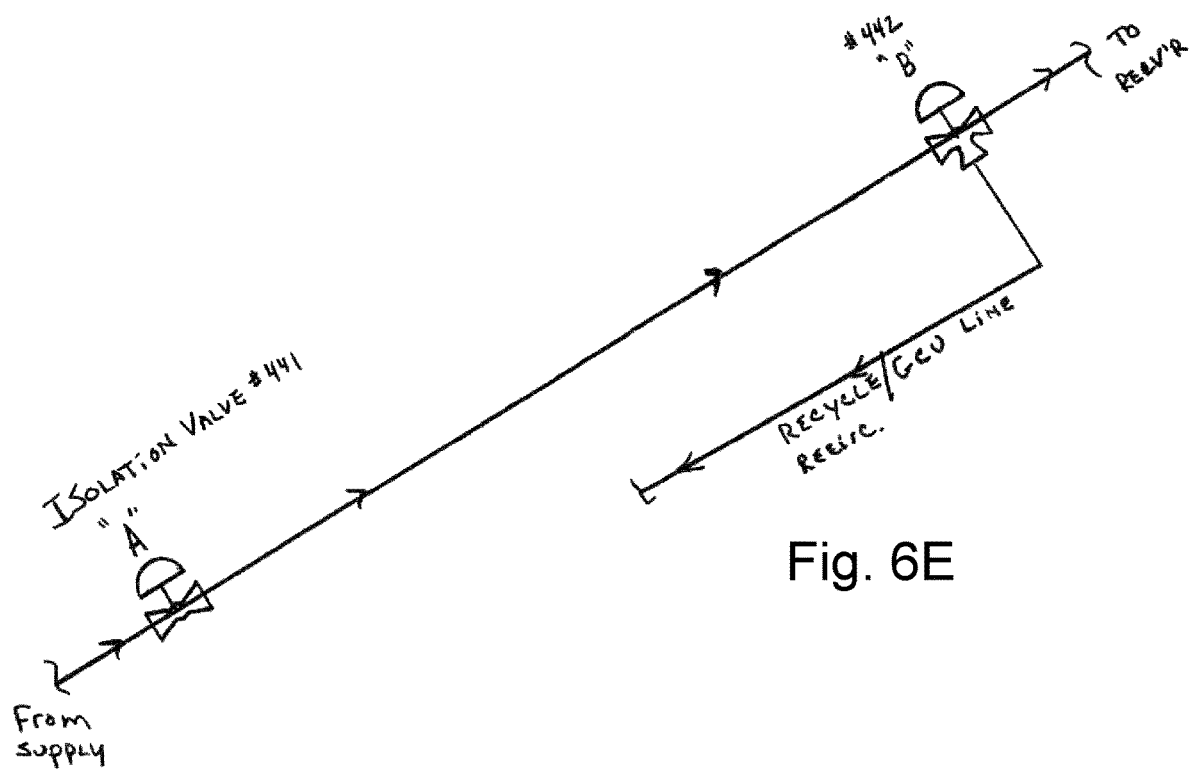
Figure 6F:
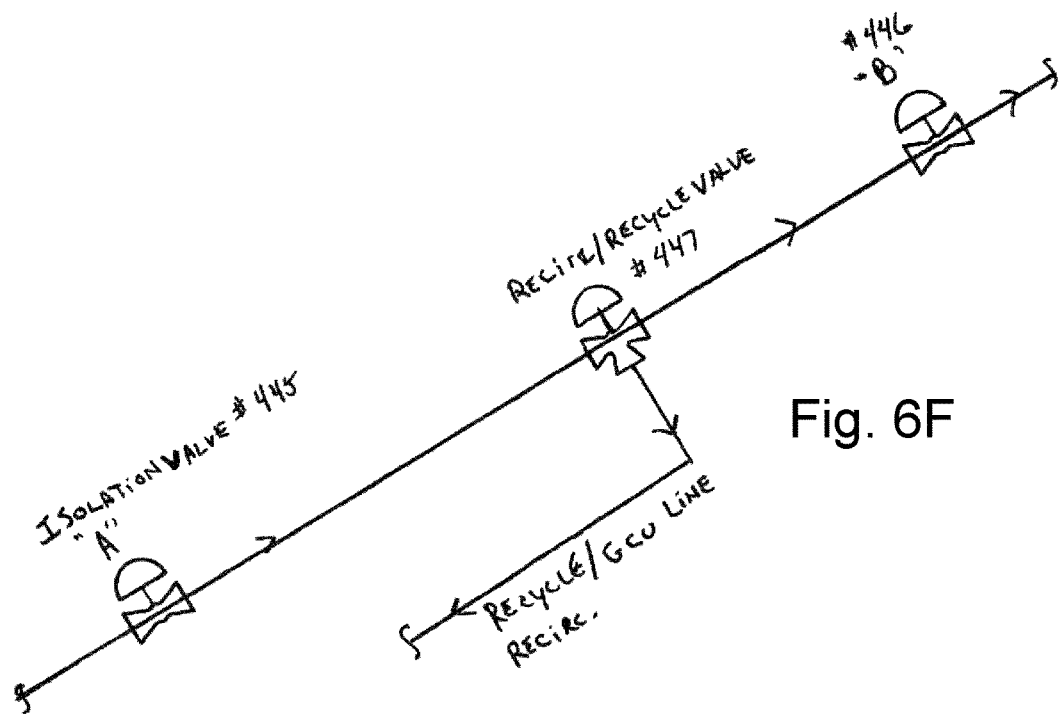
Figure 7A:
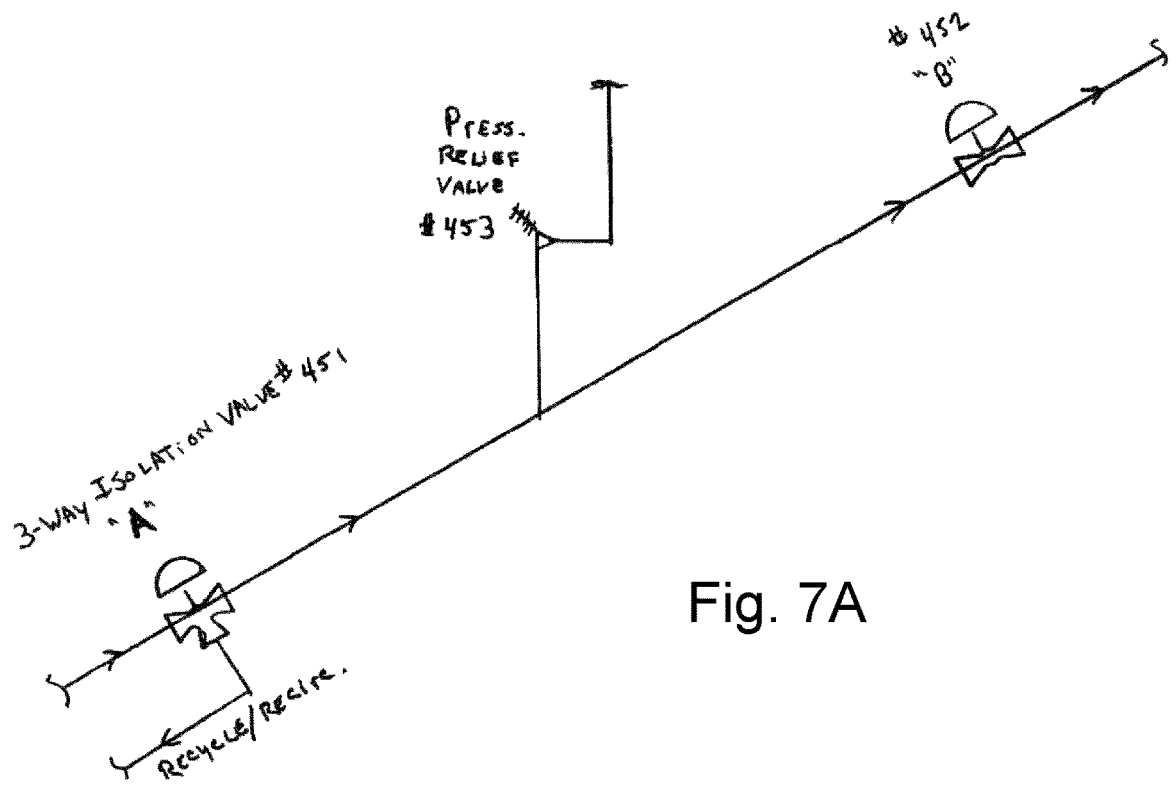
FIGS. 7A-7H show alternate shutdown valve configurations.
Figure 7B:
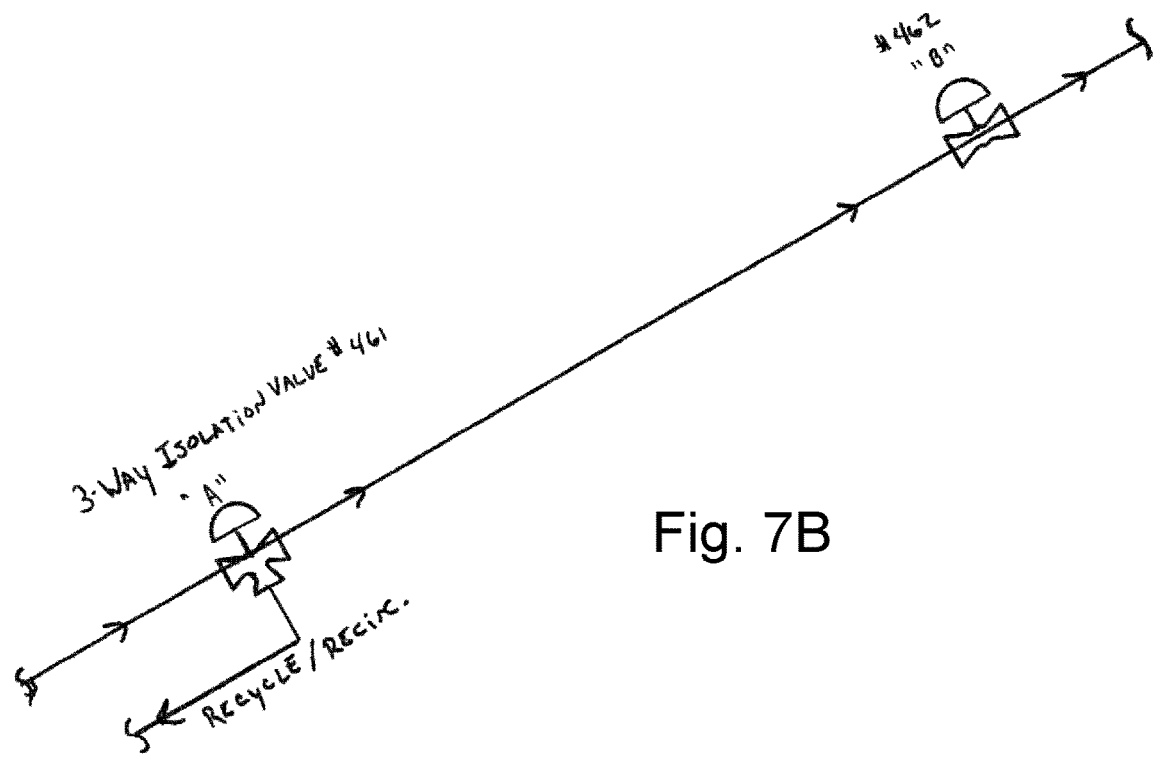
Figure 7C:
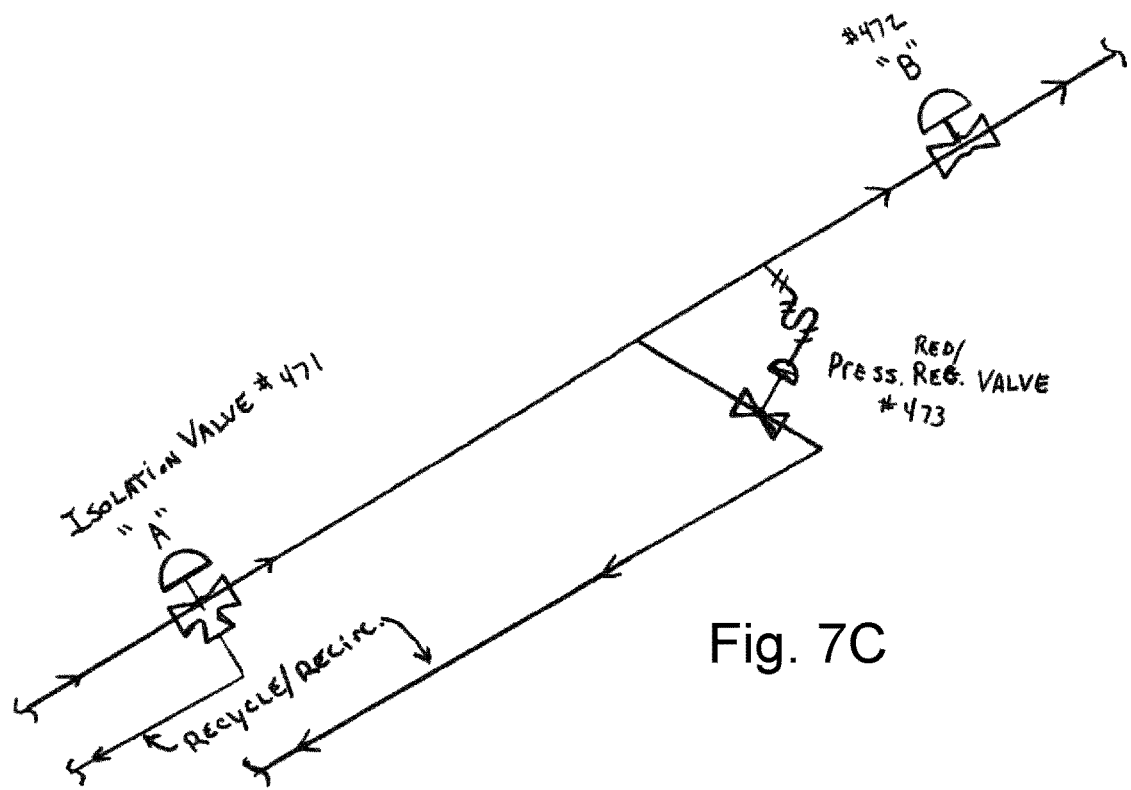
Figure 7D:
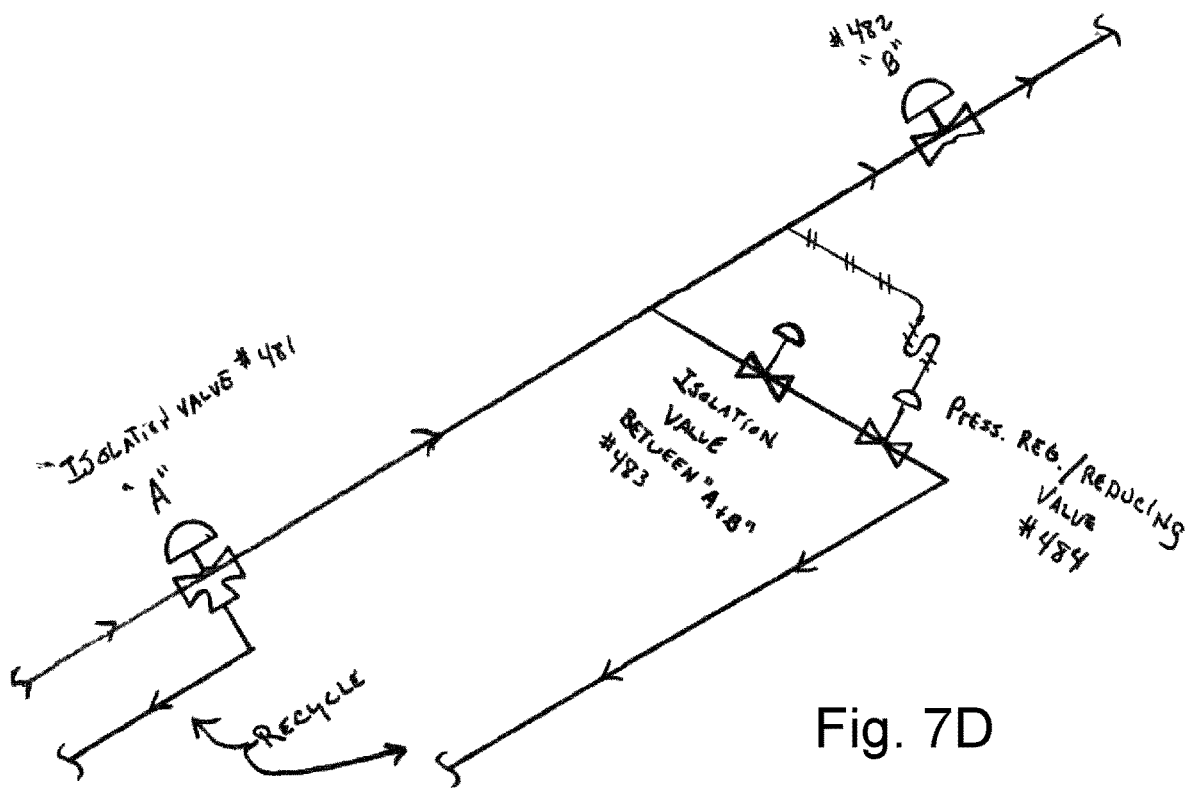
Figure 7E:
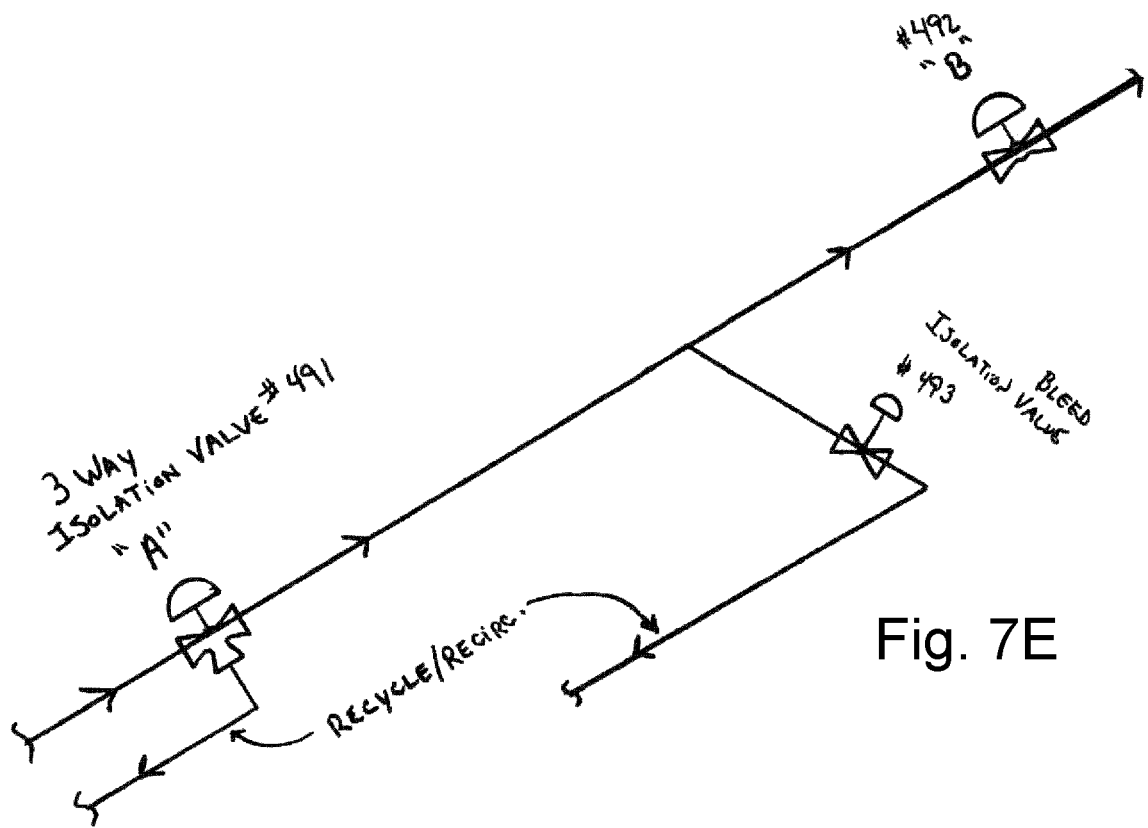
Figure 7F:
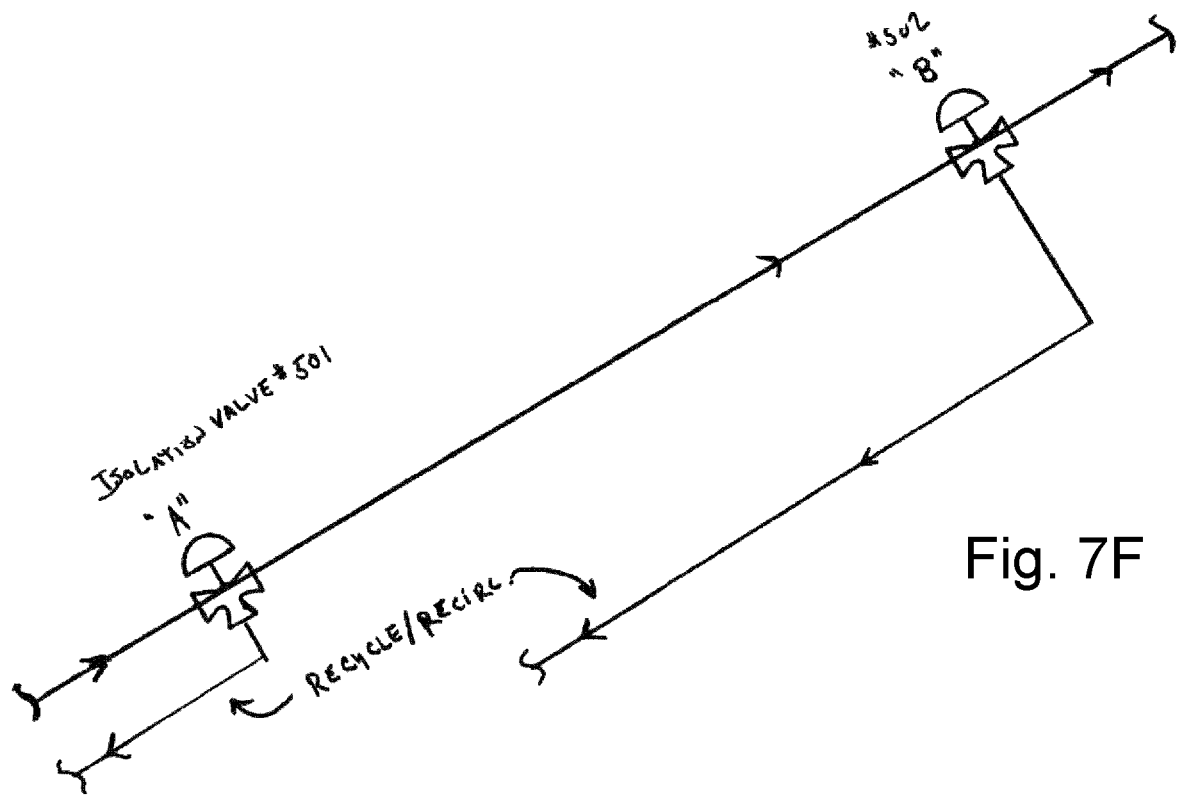
Figure 7G:
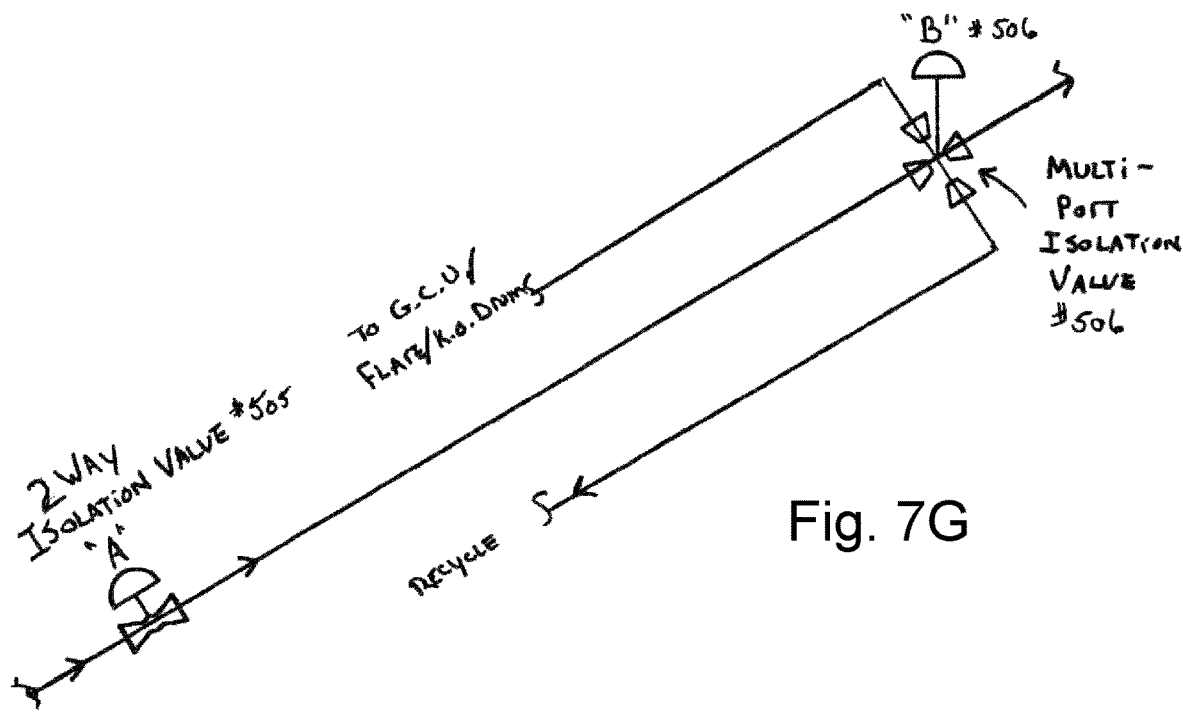
Figure 7H:
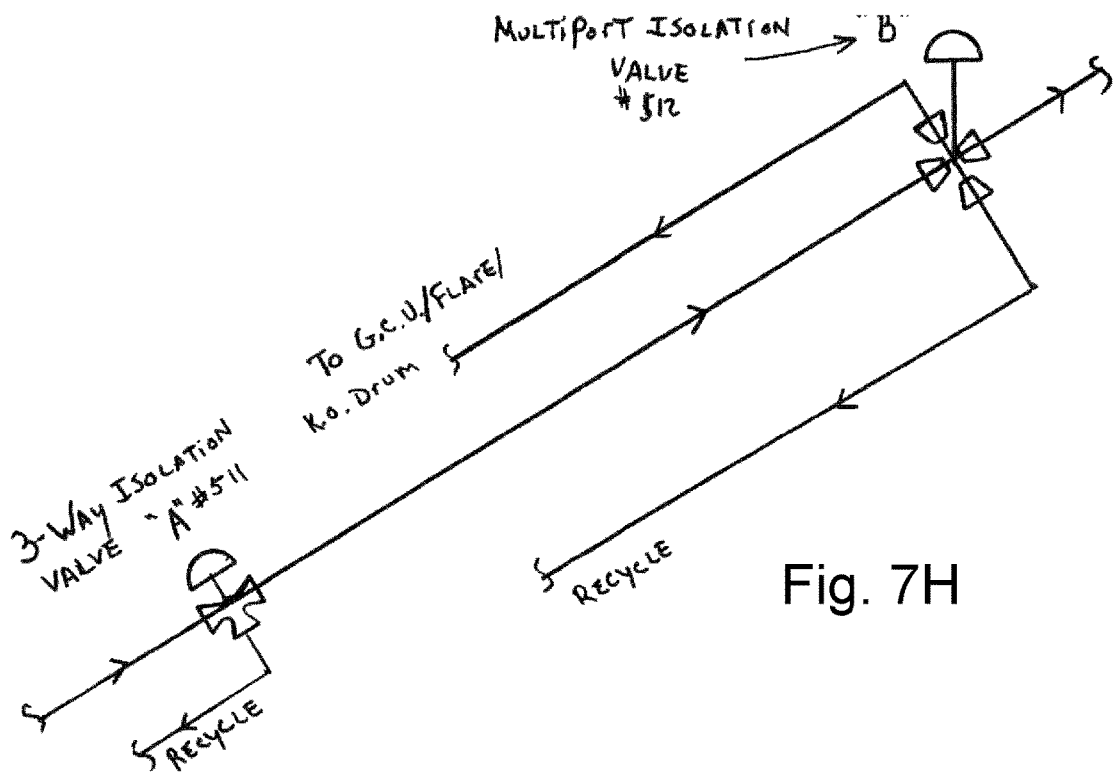

FIGS. 5A, 5B with FIG. 5B routed to FIG. 3C are almost identical to FIGS. 3A, 3B and 3C. However FIGS. 3A-3C show a safety instrumented backup for process control, which is a second redundant emergency shutdown system running in parallel with the are identical, but the inputs, processor(s) and outputs of the Isolated SIS are entirely separate. The reference numerals in FIGS. 5A-5C start at 801 et seq.

FIG. 5A is a chart of inputs to a safety instrumented system (SIS) emergency stop or shutdown system. The inputs shown on the left in FIG. 5A are: emergency shut down devices (801), high tank level at supplier tank (802), high tank level at receiving tank (803), low tank level supplier tank (804), low tank level receiving tank (805), high tank pressure receiving tank (806), high tank pressure supplier tank (807), high supply line pressure(808), high-high strainer differential pressure (850), high vapor line pressure (809), low pressure cut-off on vapor compressor (851), high seismic alarm (on land location) (830), high oxygen percentage in supply lines (811), high oxygen percentage in vapor line (this is optional) (812). The inputs shown on the right in FIG. 5A are: high vehicle motion movements (821), Dangerous explosive atmosphere - the zone, vehicle or transfer area must be immediately evacuated (813), system power outage (814), high flow rate (815), fueling line disconnect sensor alarms (816), coupler or adapter problem (817), hydraulic system failure (818), communication failure (819), excessive wind or other weather related conditions (820), high-high motion on accelerometer(s) (821), high-high motion on cables, tethers, cords or microswitches (822), fire, flame heat or smoke detection (823), arc or spark or static electric buildup (824), explosion or sound pressure wave detection (825). All of these inputs are fed to the duel redundant processors.

FIG. 5B is a chart of processors showing inputs and outputs to and from the processors in the process control emergency stop or shutdown system showing inputs A, B and C from FIG. 4A) and outputs A, B, C to FIG. 3C. FIG. 5B shows the emergency shut-down system dedicated processor (829) with inputs on the left and outputs on the right. The processor (829) i powered from a duel redundant power source (826) (or from two Isolated grid sources), duel feeders (with auto transfer switch and duel Isolation transformers) (827) that feed a battery powered uninterruptable power supply (828) that powers the processor (829). The combinations of inputs to the processor are the A input to output path to the transfer or fueling shutdown system (C=A+B), the B input to output path is shut-down fueling, transfer line and vehicle release. Here the vehicle may need to get away from the fueling or transfer facility. The C input to output path is C=A+B+ for activation. The outputs A, B and C are routed to FIG. 4C.

process control system, while FIGS. 5A-5B routed to FIG. 4C represent a SIS (FIG. 4C is a safety instrumented system, however the graphs are identical). The systems themselves In reference to FIGS. 3C and 4C, the following sub-notes are relevant:

*System specific; Vapor Mgmt./Headspace push uses compressor/suction/pressure, with/with-out pump.

**For use on Systems with Vapor Mgmt; necessary equipment to install, but application specific.

Isolation Bleed Valve(s) may be pressure/self-actuated; and or optional/CS/PLC controlled w/PPFB, /

Pressure Relief Valve/ PRV

All actions are individually/identifiable and all inputs/outputs are permanently recorded with time and date stamp for future review.

Optional=DUEL Optional/PPFB-Positive Position Feedback!FB-Feedback/AUX.=Auxiliary contactor/Amp's=Auxiliary contactor/Amp's=ampere's Draw.

The duel redundant system of the present invention includes the following:

Two parallel Vehicle/vessel ignition/transmission/parking/Mooring/positioning/siting system(s), vessel/vehicle(s) shall be locked-out with separate power source(s), including magnetic, optical, ultrasonic, (MOU) and/or mechanical detection device(s)/system(s); plus any rotary encoder(s) is with-in the scope of this invention, In the present invention, a vehicle(s)/vessel motion/movement lock out is any method, means, or technique to prevent a vehicle/vessel from moving while fuelling/transferring/exchanging (tank(s)/capsule(s)//(supply/receiving) compressed gas/liquefied gas including any circuit/module/relay/mechanical device(s) that can disable the fueling/transfer system, ignition, transmission/monitoring of the mooring/positioning system(s), and/or to disable the vehicle/vessel movement/motion in any other way, the vehicle(s)/vessel movement/motion sensor(s)/devices/system(s)/detection system/microcontroller(s) of the ignition/transmission/mechanical device(s)/parking//mooring/positioning sensor(s)/system(s); for example, noted in FIGS. 6-46/7-46/8-46/9-46 outputs, they may communicate signal(s) by wire/wirelessly by radio/light/and/or any combination of wire (coax/coax R.F/RFoF/wirelessly by radio/light/OWC, for network communications//signal(s) with central detection system/microcontroller/processor/locally and or remotely.

Two parallel, override(s) is any means or technique to release/allow the vehicle to move in spite of the vehicle lock-out, any way or means of over-riding the vehicle lock-out, the over-rides/system(s) will have separate power sources, may communicate signal(s) by wire/wirelessly by radio/light/and/or any combination of wire (coax/coax R.F/RFoF/wirelessly by radio/light/OWC, for network communications/signal(s) with central detection system/microcontroller/processor/locally and or remotely.

Two parallel optional abuse preventer is any method, means, or technique to prevent abuse of the over-ride by limiting the number of times (especially successive times) it can be used, it may be reset by qualified a individual, this feature is optional, but when used, the abuse preventer/system(s) will have separate power sources and may communicate signal(s) by wire/wirelessly by radio/light/and/or any combination of wire (coax/coax R.F/RFoF/wirelessly by radio/light/OWC, for network communications/signal(s) with central detection system/microcontroller//processor/locally and or remotely.

Two parallel, fuelling/transfer(s) system lock-out(s), is any means or techniques to prevent/stop/mitigate a fuelling/transfer event. Several sensor(s) (MOU)/system(s) have the ability/input/output and capability to stop fuelling/transfer(s). As well as SIS and CS systems, with separate power sources, to mitigate fuelling/transfer(s) by Control system Shut-down/Stop Button device(s)/remotely by operations which have authority/observing by video/camera monitoring system; the stop devise inputs displayed on FIG. 6-1/; 7-1;/8-1;/9/1; can be either button/H.M.I./A.I. inputs; Human Interface(s) will inform who/which device triggered control system/emergency shut-down; (optional color yellow/red mushroom button) device(s), to close the flow path isolation valve(s)/stop pump(s)/compressor(s)/and/or in some systems designed to isolate and to re-direct flow by (3-way; 4-way, or multi-port valve(s), to one of ordinary skill in the art will realize other input(s)/output(s) to create a safe fueling/transfer lock-out, which will be indicated by audible and or visual, both on the Human Interface(s) and in transfer zone to alert all, of a fueling/transfer lock-out, which may, in certain situations, be re-established by an operator (re-set/re-start) after situation is corrected. Visual alerts, include, Human Interface screen(s), (computer monitor(s) or touch screen(s) banners of (flashing) yellow, red, xenon; or intrinsically safe light/strobe of yellow, red, or xenon. The fuelling/transfer system lock-out(s) sensor(s)/system(s) may communicate signal(s) by wire/wirelessly by radio/light/and/or any combination of wire (coax/coax R.F/RFoF/wirelessly by radio/light/OWC, for network communications/signal(s) with central detection system/microcontroller/processor/locally and or remotely.

Two parallel, Exchangeable tank system lock-out(s) (optional), is any means or techniques to prevent vehicle motion/movement/ignition during vehicle tank exchange. This can be activated manually/automatically, utilizing optical, magnetic, ultrasonic, radio frequency I.D./detection device(s). Pressure/valve/tank-positioning/clamping/connection(s) sensor(s) can detect if exchanging event has begun, or simply a micro-switch manually activated/by clamp/tank presence, thus disabling the vehicle. Any sensor(s)/micro-switch(s) standing alone/combined shall produce a signal/relay/in communication with vehicle fuelling/transfer systems to indicate a tank transfer is occurring/and when transfer/connections are completed, this sensor(s)/system may communicate signal(s) by wire/wirelessly by radio/light/and/or any combination of wire (coax/coax R.F/RFoF/wirelessly by radio/light/OWC, for network communications/signal(s) with central detection system/microcontroller/processor/locally and or remotely.

Two parallel, isolated/separate instruments with separate power sources, Tank High level indication(s) from supply tank(s); High level and or any other tank that may be connected with-in the supply system. As depicted on FIG. 7-02/9-02, these inputs will trigger/signal a C.S./S.I.S. System emergency stop/shutdown, alerting all interfaces of High supply tank level event, and can be reset upon corrective action to remove alarm. The level sensor(s) (MOU)/system(s) may communicate signal(s) by wire/wirelessly by radio/light/and/or any combination of wire (coax/coax R.F/RFoF/wirelessly by radio/light/OWC, for network communications/signal(s) with central detection system/microcontroller/processor/locally and or remotely.

Two parallel, isolated/separate instruments with separate power sources, Tank High-High/(Hi-HI) level indication(s) from supply tank(s); High-High/(Hi-Hi) level and or any other tank that may be connected with-in the supply system. As depicted on FIG. 6-02/8-02, these inputs will trigger/signal a C.S./S.I.S. system emergency stop/shutdown, alerting all interfaces of HIGH-HIGH Supply tank level event, and can be reset upon corrective action to remove alarm. The level sensor(s) (MOU)/system(s) may communicate signal(s) by wire/wirelessly by radio/light/and/or any combination of wire (coax/coax R.F/RFoF/wirelessly by radio/light/OWC, for network communications/signal(s) with central detection system/microcontroller/processor/locally and or remotely.

Two parallel, isolated/separate instruments with separate power sources, Tank High level indication(s) from receiving tank(s); High level signal, and or any other tank that may be connected with-in the receiving system. As depicted on FIG. 7-03/9-03, these inputs will trigger/signal a C.S./S.I.S. System emergency stop/shutdown, alerting all interfaces of High supply tank level event, and can be reset upon corrective action to remove alarm. The level sensor(s) (MOU)/system(s) may communicate signal(s) by wire/wirelessly by radio/light/and/or any combination of wire (coax/coax R.F/RFoF/wirelessly by radio/light/OWC, for network communications/signal(s) with central detection system/microcontroller/processor/locally and or remotely.

Two parallel, isolated/separate instruments with separate power sources, Tank High-High/(Hi-HI) level indication(s) from receiving tank(s); High-High/(Hi-Hi) level and or any other tank that may be connected within the receiving system. As depicted on FIG. 6-03/8-03, these inputs will trigger/signal a C.S./S.I.S. system emergency stop/shutdown, alerting all interfaces of HIGH-HIGH Supply tank level event, and can be reset upon corrective action to remove alarm. The level sensor(s)(MOU)/system(s) may communicate signal(s) by wire/wirelessly by radio/light/and/or any combination of wire (coax/coax R.F/RFoF/wirelessly by radio/light/OWC, for network communications/signal(s) with central detection system/microcontroller/processor/locally and or remotely.

Two parallel, isolated/separate Gas leak detection system(s) with separate power sources, both shall ignal/alarm multiple tier gas detection level(s); a percentage % indication such as: Normal Level; first stage High % percentage gas detected, percentage reading/alarm-output relay/signal (optional fuelling/transfer//exchange system lock-out); and second High-High % reading/alarm and shall enable/relay/signal fuelling//transfer/exchange system shutdown on Both C.S. and S.I.S.; as depicted on FIG. 6-13/7-13/8-13/9-13. Gas detection system may be optical, magnetic (heated wire), electro-chemical, fiber-optic sensor devices/analyzers(s); the sensor(s) may be point (local and/or remote sample by pump) and/or open path optical detectors and/or any combination there-of. The gas sensor(s)/system(s) may communicate signal(s) by wire/wirelessly by radio/light/and/or any combination of wire (coax/coax R.F/RFoF/wirelessly by radio/light/OWC, for network communications/signal(s) with central detection system/microcontroller/processor/locally and or remotely.

Two parallel, Isolated/separate Heating/Ventilation/Air Conditioning (HVAC) system(s), with separate power sources, per conditioned space. The system(s) fan(s) (both supply and exhaust) shall maintain area(s) positive pressure; therefore keeping control of any conditioned space, by selected location of fresh air intakes to prevent infiltration of any combustible gas mixtures. The strategically located fresh air intake(s) can be monitored for combustible gases, and system shut-down to occur if intakes are above predetermined levels/concentrations of combustible gases. The controllers will regulate air temperature, pressure, flow, humidity, to maintain proper environment in controlled environments, the controller(s) will inter-act with other system(s) such as gas detection to prevent infiltration of hazardous combustible gases into ventilation system(s). The HVAC controller(s) may communicate signal(s) by wire/wirelessly by radio/light/and/or any combination of wire (coax/coax R.F/RFoF/wirelessly by radio/light/OWC, for network communications/signal(s) with central detection system/microcontroller/processor/locally and or remotely.

Parallel, (2), isolated/separate Oxygen content detection system(s) with separate power sources, High O2 level in gas fuel supply tank(s)/(any/all) sensor(s) (MOU) can be electro-chemical detector/paramagnetic with magnetic/optical detection sensor(s), system(s) shall enable/trigger/relay/signal fuelling/transfers/exchanging shutdown, these oxygen sensor(s)/system(s) may communicate signal(s) by wire/wirelessly by radio/light/and/or any combination of wire (coax/coax R.F/RFoF/wirelessly by radio/light/OWC, for network communications/signal(s) with central detection system/microcontroller/processor/locally and or remotely.

Two parallel, isolated/separate Oxygen content detection system(s) with separate power sources, High-High O2 level in gas fuel supply tank(s)/(any/all) sensor(s) (MOU) can be electro-chemical detector/paramagnetic with magnetic/optical detection sensor(s), system(s) shall enable/trigger/relay/signal fuelling/transfers/exchanging shutdown, these oxygen sensor(s)/system(s) may communicate signal(s) by wire/wirelessly by radio/light/and/or any combination of wire (coax/coax R.F/RFoF/wirelessly by radio/light/OWC, for network communications/signal(s) with central detection system/microcontroller/processor/locally or remote.

Two parallel, isolated/separate Oxygen content detection system(s) with separate power sources, High O2 level in gas fuel receiving tank(s)/(any/all) sensor(s) (MOU) can be electro-chemical detector/paramagnetic with magnetic/optical detection sensor(s), system(s) shall enable/trigger/relay/signal fuelling/transfers/exchanging shutdown, these oxygen sensor(s)/system(s) may communicate signal(s) by wire/wirelessly by radio/light/and/or any combination of wire (coax/coax R.F/RFoF/wirelessly by radio/light/OWC, for network communications/signal(s) with central detection system/microcontroller/processor/locally and or remotely.

Two parallel, isolated/separate Oxygen content detection system(s) with separate power sources, High-High O2 level in gas fuel receiving tank(s)/(any/all) sensor(s) (MOU) can be electro-chemical detector/paramagnetic with magnetic/optical detection sensor(s), system(s) shall enable/trigger/relay/signal fuelling/transfers/exchanging shutdown, these oxygen sensor(s)/system(s) may communicate signal(s) by wire/wirelessly by radio/light/and/or any combination of wire (coax/coax R.F/RFoF/wirelessly by radio/light/OWC, for network communications/signal(s) with central detection system/microcontroller/processor/locally and or remotely.

Two parallel, isolated/separate Oxygen content detection system(s) with separate power sources, High O2 level in gas fuel transfer line(s) (Post cool-down/inerting/evacuating system)/(any/all) sensor(s) (MOU) can be electro-chemical detector/paramagnetic with magnetic/optical detection sensor(s), system(s). As depicted in FIG. 7-11/9-11, High O2 in transfer line shall enable/trigger/relay/signal fuelling/transfers/exchanging C.S./S.I.S. system(s) shutdown, these oxygen sensor(s)/system(s) may communicate signal(s) by wire/wirelessly by radio/light/and/or any combination of wire (coax/coax R.F/RFoF/wirelessly by radio/light/OWC, for network communications/signal(s) with central detection system/microcontroller/processor/locally and or remotely.

Two parallel, isolated/separate Oxygen content detection system(s) with separate power sources, High-High O2 level in gas fuel transfer line(s)(Post cool-down/inerting/evacuating system)/(any/all) sensor(s) (MOU) can be electro-chemical detector/paramagnetic with magnetic/optical detection sensor(s), system(s). As depicted in FIG. 6-11/8-11, High O2 in transfer line shall enable/trigger/relay/signal fuelling/transfers/exchanging C.S./S.I.S. system(s) shutdown, these oxygen sensor(s)/system(s) may communicate signal(s) by wire/wirelessly by radio/light/and/or any combination of wire (coax/coax R.F/RFoF/wirelessly by radio/light/OWC, for network communications/signal(s) with central detection system/microcontroller/processor/locally and or remotely.

Two parallel, isolated/separate Bi-directional flow meters (Coriolis/ultrasonic/vortex/d/p)/flow computer/controller(s) (MOU); with separate power sources, High Flow Rate signal(s) (higher than predetermined set point) as depicted in FIG. 7-15/9-15, shall enable/trigger/relay/signal fuelling/transfer/O2/exchange C.S./S.I.S. system lock-out(s); the flow meter(s)/system(s) may communicate signal(s) by wire/wirelessly by radio/light/and/or any combination of wire (coax/coax R.F/RFoF/wirelessly by radio/light/OWC, for network communications/signal(s) with central detection system/microcontroller/processor/locally and or remotely.

Two parallel, isolated/separate Bi-directional flow meters (Coriolis/ultrasonic/vortex/d/p)/flow computer to calculate flow/mass flow/controller(s) (MOU); with separate power sources, High-High Flow Rate signal(s) (higher than predetermined set point) as depicted in FIG. 6-15/8-15, shall enable/trigger/relay/signal fuelling/transfer/O2/exchange C.S./S.I.S. system(s) lock-outs; the flow meter(s)/system(s) may communicate signal(s) by wire/wirelessly by radio/light/and/or any combination of wire (coax/coax R.F/RFoF/wirelessly by radio/light/OWC, for network communications/signal(s) with central detection system/microcontroller/processor/locally and or remotely.

Two parallel, isolated/separated Vehicle/Vessel Motion detection system(s) (MOU) with separate power sources, set at a predetermined set point (motion/distance/movements) first $1^{st}$ stage set-point(s) as depicted in FIG. 7-18/7-19/9-19/9-19, shall enable/trigger/relay/signal fuelling/transfer/exchange C.S./S.I.S. system(s) lock-out; the motion/movement sensor(s)/system(s) may communicate signal(s) by wire/wirelessly by radio/light/and/or any combination of wire (coax/coax R.F/RFoF/wirelessly by radio/light/OWC, for network communications/signal(s) with central detection system/microcontroller/processor/locally and or remotely.

Two parallel, isolated/separated Vehicle/Vessel Motion detection system(s) (MOU) with separate power sources, set at a predetermined set point (motion/distance/movements) second $2^{nd}$ stage set-point(s) as depicted in FIG. 6-18/6-19/

8-18/8-19, shall enable/trigger/relay/signal fuelling/transfer/exchange C.S./S.I.S. system lock-out(s), plus the fuel line release system(s) (activation/de-activation), plus the vehicle(s) release system, (activation/de-activation), may communicate signal(s) by wire/wirelessly by radio/light/and/or any combination of wire (coax/coax R.F/RFoF/wirelessly by radio/light/OWC, for network communications/signal(s) with central detection system/microcontroller/processor/locally and or remotely.

Two parallel, isolated/separate supply tank High tank pressure detection, with separate power source, as depicted in FIG. 7-07/9-07, shall enable the fuelling/transfer/exchange C.S./S.I.S. system lock-out system(s), the pressure sensor(s) (MOU)/system(s) may communicate signal(s) by wire/wirelessly by radio/light/and/or any combination of wire (coax/coax R.F/RFoF/wirelessly by radio/light/OWC, for network communications/signal(s) with central detection system/microcontroller/processor/locally and or remotely.

Two parallel, isolated/separate supply tank High-High tank pressure detection, with separate power source, as depicted in FIG. 6-07/8-07, shall enable the fuelling/transfer/exchange C.S./S.I.S. system lock-out system(s), the pressure sensor(s)(MOU)/system(s) may communicate signal(s) by wire/wirelessly by radio/light/and/or any combination of wire (coax/coax R.F/RFoF/wirelessly by radio/light/OWC, for network communications/signal(s) with central detection system/microcontroller/processor/locally and or remotely.

Two parallel, isolated/separate receiving tank High tank pressure detection, with separate power source, as depicted in FIG. 7-06/9-06, shall enable the fuelling/transfer/exchange C.S./S.I.S. system lock-out system(s), the pressure sensor(s)(MOU)/system(s) may communicate signal(s) by wire/wirelessly by radio/light/and/or any combination of wire (coax/coax R.F/RFoF/wirelessly by radio/light/OWC, for network communications/signal(s) with central detection system/microcontroller/processor/locally and or remotely.

Two parallel, isolated/separate receiving tank High-High tank pressure detection, with separate power source, as depicted in FIG. 6-06/8-06, shall enable/trigger/relay/signal the fuelling/transfer/exchange C.S./S.I.S. system lock-out system(s), the pressure sensor(s)(MOU)/system(s) may communicate signal(s) by wire/wirelessly by radio/light/and/or any combination of wire (coax/coax R.F/RFoF/wirelessly by radio/light/OWC, for network communications/signal(s) with central detection system/microcontroller/processor/locally and or remotely.

Figure 8A:
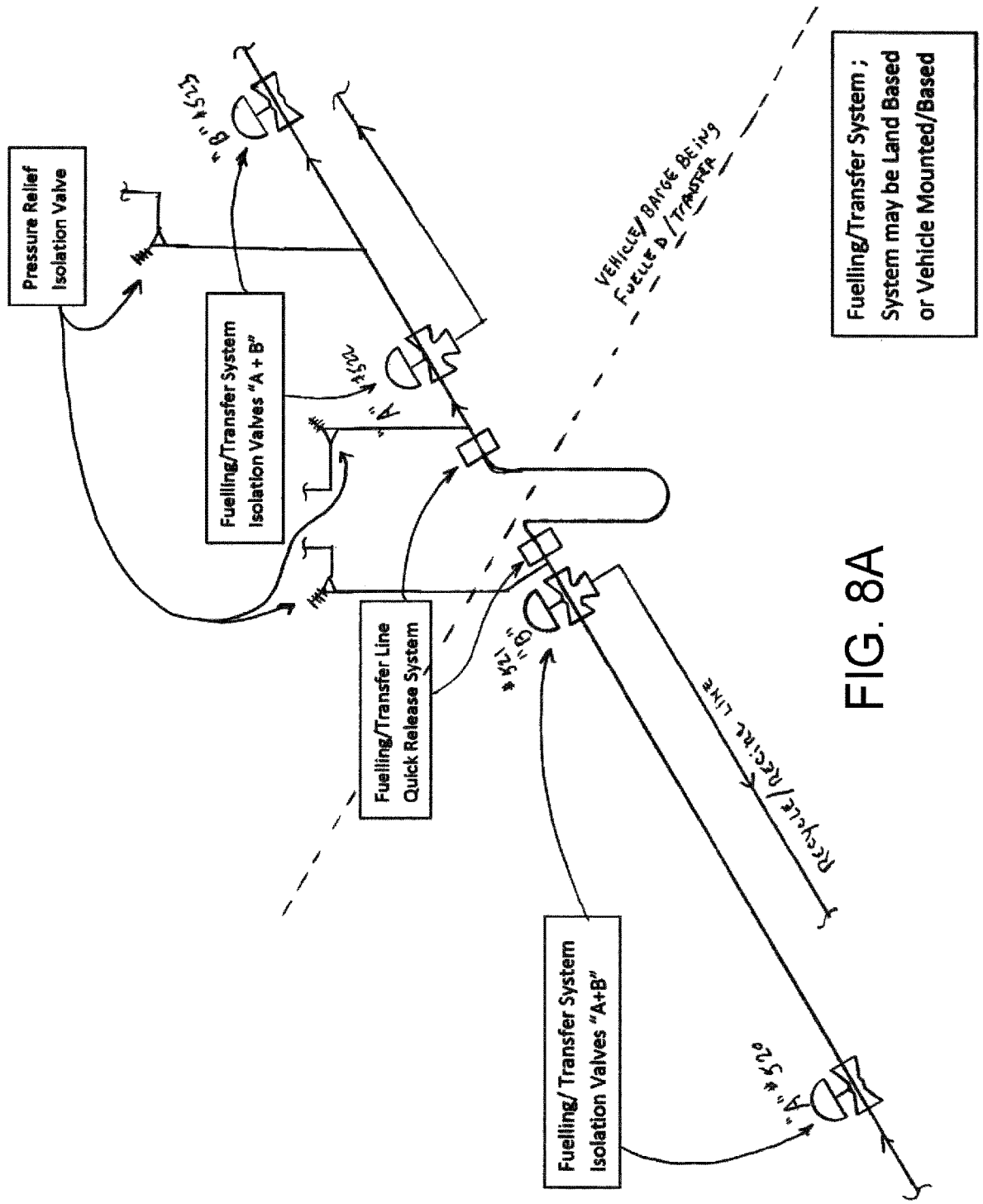
FIG. 8A shows a fueling transfer system.
Figure 8B:
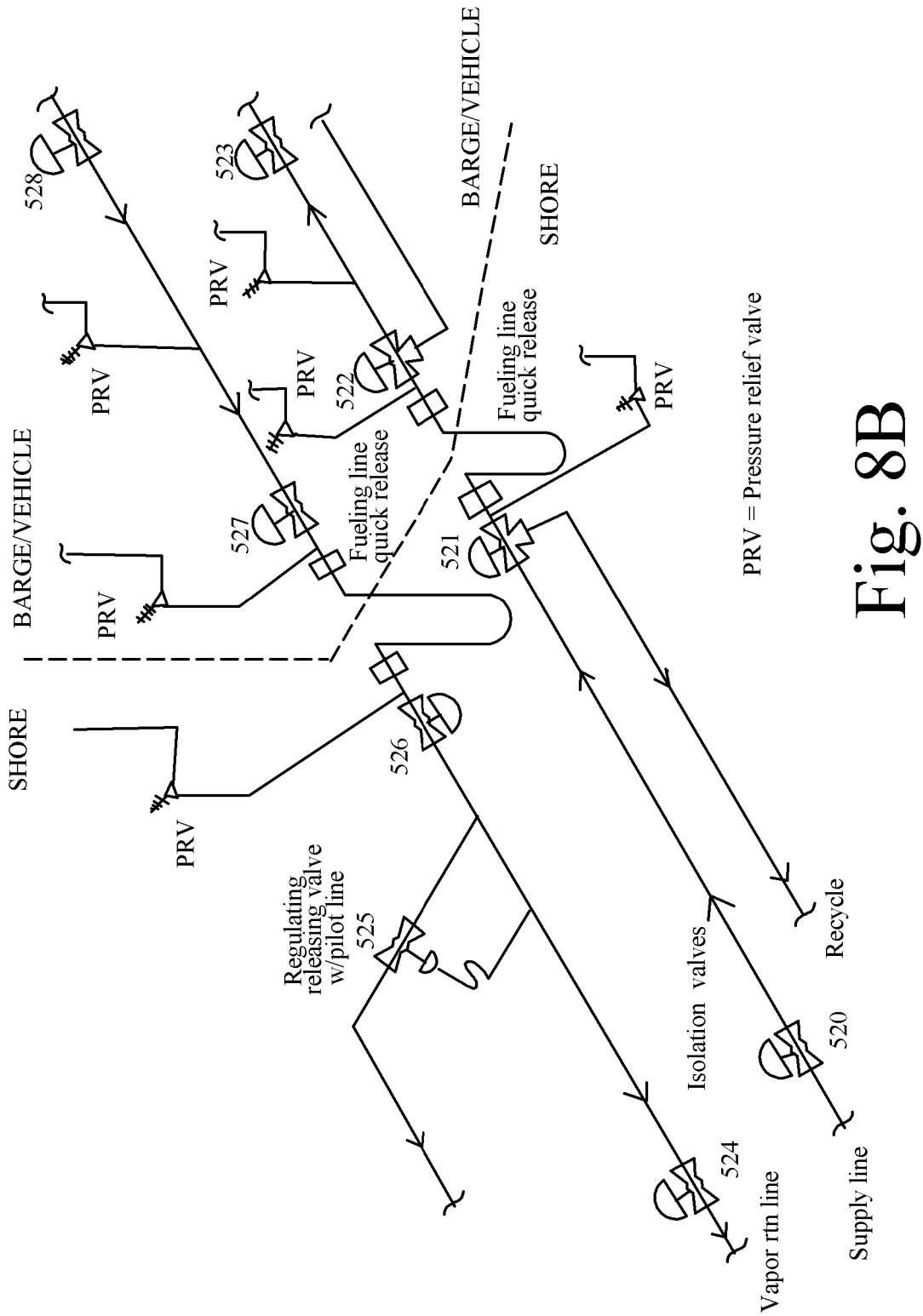
FIG. 8B shows a fueling transfer system with a vapor management system.

Two parallel, isolated/separate transfer system High pressure detection, with separate power source, as depicted in FIG. 7-08/9-08, shall enable/trigger/relay/signal the fuelling/transfer/exchange C.S./S.I.S. system lock-out system(s). The pressure sensor(s)(MOU)/system(s) may communicate signal(s) by wire/wirelessly by radio/light/and/or any combination of wire (coax/coax R.F/RFoF/wirelessly by radio/light/OWC, for network communications/signal(s) with central detection system/microcontroller/processor/locally and or remotely.

Two parallel, isolated/separate transfer system High-High pressure detection, with separate power source, as depicted in FIG. 6-08/8-08, shall enable/trigger/relay/signal the fuelling/transfer/exchange C.S./S.I.S. system lock-out system(s). The pressure sensor(s)(MOU)/system(s) may communicate signal(s) by wire/wirelessly by radio/light/and/or any combination of wire (coax/coax R.F/RFoF/wirelessly by radio/light/OWC, for network communications/signal(s) with central detection system/microcontroller/processor/locally and or remotely.

Two parallel, isolated/separate supply transfer line(s) positive connection sensor(s) (MOU), with separate power source, as depicted in FIG. 6-17/7-17/8-17/9-17, such as on fill adaptor; non-detection/withdrawal will trigger/relay/signal a fuelling/transfer/exchange C.S/S.I.S. lock-out, the connection sensor(s)/system(s) may communicate signal(s) by wire/wirelessly by radio/light/and/or any combination of wire (coax/coax R.F/RFoF/wirelessly by radio/light/OWC, for network communications/signal(s) with central detection system/microcontroller/processor/locally and or remotely.

Two parallel, isolated/separate supply/return transfer line(s) positive connection sensor(s) (MOU) and/or mechanical tether/chord/cable with switch/micro-switch, sensor(s) may be standing alone or combined with separate power source(s), as depicted on FIG. 6-16/7-16/8-16/9-16, such as on Emergency Release Coupler (ERC); non-detection/withdrawal will trigger/relay/signal a fuelling/transfer/exchange C.S/S.I.S. non-permissive or lock-out, the connection sensor(s)/system(s) may communicate signal(s) by wire/wirelessly by radio/light/and/or any combination of wire (coax/coax R.F/RFoF/wirelessly by radio/light/OWC, for network communications/signal(s) with central detection system/microcontroller/processor/locally and or remotely.

Two parallel, isolated/separate Weather/meteorology system(s) (MOU), with separate power sources, such as lightening/high-winds/sieche/tsunami alarm(s), as depicted on FIG. 6-22/7-22/8-22/9-22, may trigger/relay/signal a fuelling/transfer/exchange C.S./S.I.S. system lock-out, the weather sensor(s)/system(s) may communicate signal(s) by wire/wirelessly by radio/light/and/or any combination of wire (coax/coax R.F/RFoF/wirelessly by radio/light/OWC, for network communications/signal(s) with central detection system/microcontroller/processor/locally and or remotely.

Two parallel, isolated/separate (optional/for land based fuelling/transfer system(s) Seismic/High Seismic-activity sensor(s) (MOU), with separate power sources, as depicted on FIG. 7-10/9-10, will also trigger/relay/signal a fuelling/transfer/exchange C.S./S.I.S. system lock-out, these Seismic sensor(s)/system(s) may communicate signal(s) by wire/wirelessly by radio/light/and/or any combination of wire (coax/coax R.F/RFoF/wirelessly by radio/light/OWC, for network communications/signal(s) with central detection system/microcontroller/processor/locally and or remotely.

Two parallel, isolated/separate (optional/for land based fuelling/transfer system(s) Seismic/High-High Seismic-activity sensor(s) (MOU), with separate power sources, as depicted on FIG. 6-10/8-10, will also trigger/relay/signal a fuelling/transfer/exchange C.S./S.I.S. system lock-out, these Seismic sensor(s)/system(s) may communicate signal(s) by wire/wirelessly by radio/light/and/or any combination of wire (coax/coax R.F/RFoF/wirelessly by radio/light/OWC, for network communications/signal(s) with central detection system/microcontroller/processor/locally and or remotely.

Two parallel, isolated/separate High-dp for supply line filter, differential pressure/(dirty filter/strainer), with separate power source, in transfer line(s) will enable fuelling/transfer system shut-down/lock-out, the pressure (differential/DP) sensor(s)(MOU)/system(s) may communicate signal(s) by wire/wirelessly by radio/light/and/or any combination of wire (coax/coax R.F/RFoF/wirelessly by radio/light/OWC, for network communications/signal(s) with central detection system/microcontroller/processor/locally and or remotely.

Parallel (2), isolated/separate High-High dp for supply line filter, differential pressure/(dirty filter/strainer), with separate power source, in transfer line(s) will enable/trigger/relay/signal fuelling/transfer system shut-down/lock-out, the pressure (differential/DP) sensor(s)(MOU)/system(s) may communicate signal(s) by wire/wirelessly by radio/light/and/or any combination of wire (coax/coax R.F/RFoF/wirelessly by radio/light/OWC, for network communications/signal(s) with central detection system/microcontroller/processor/locally and or remotely.

Two parallel, isolated/separate High-dp for return line filter, differential pressure/(dirty filter/strainer) with separate power source, in transfer line(s) will enable/trigger/relay/signal fuelling/transfer system shut down-lock-out, the pressure (differential/DP) sensor(s)(MOU)/system(s) may communicate signal(s) by wire/wirelessly by radio/light/and/or any combination of wire (coax/coax R.F/RFoF/wirelessly by radio/light/OWC, for network communications/signal(s) with central detection system/microcontroller/processor/locally and or remotely.

Two parallel, isolated/separate High-High dp for return line filter, differential pressure/(dirty filter/strainer) with separate power source, in transfer line(s) will enable/trigger/relay/signal fuelling/transfer system shut down-lock-out, the pressure (differential/DP) sensor(s)(MOU)/system(s) may communicate signal(s) by wire/wirelessly by radio/light/and/or any combination of wire (coax/coax R.F/RFoF/wirelessly by radio/light/OWC, for network communications/signal(s) with central detection system/microcontroller/processor/locally and or remotely.

Two parallel, isolated/separate system supply line(s) compressor(s) operation/non-operation and/or trip/failure, by ampere(s)/voltage/auxiliary contactor (MOU) for detection, with separate power source, as depicted on FIG. 6-14/7-14/8-14/9-14, on compressor side of electrical contactor will also signal/trigger/relay a fuelling/transfer C.S./S.I.S. system lock-out, the switch(s)/sensor(s)/system(s) may communicate signal(s) by wire/wirelessly by radio/light/and/or any combination of wire (coax/coax R.F/RFoF/wirelessly by radio/light/OWC, for network communications/signal(s) with central detection system/microcontroller/processor/locally and or remotely.

Two parallel, isolated/separate system supply line(s) pump(s) operation/non-operation and/or trip/failure, by ampere(s)/voltage/auxiliary contactor (MOU) for detection with separate power source, as depicted on FIG. 6-14/7-14/8-14/9-14, on pump side of electrical contactor will also signal/trigger/relay/signal a fuelling/transfer C.S/S.I.S. system lock-out, the switch(s)/sensor(s)/system(s) may communicate signal(s) by wire/wirelessly by radio/light/and/or any combination of wire (coax/coax R.F/RFoF/wirelessly by radio/light/OWC, for network communications/signal(s) with central detection system/microcontroller/processor/locally and or remotely.

Two parallel, isolated/separate hydraulic system(s) High pressure sensor(s)(MOU), with separate power source, as depicted in FIG. 6-24/7-24/8-24/9-24, failure shall trigger/relay/signal a fuelling/transfer/exchange C.S./S.I.S. system lock-out, the pressure sensor(s)/system(s) may communicate signal(s) by wire/wirelessly by radio/light/and/or any combination of wire (coax/coax R.F/RFoF/wirelessly by radio/light/OWC, for network communications/signal(s) with central detection system/microcontroller/processor/locally and or remotely.

Two parallel, isolated/separate hydraulic system(s) High-High pressure sensor(s) (MOU), with separate power source, as depicted on FIG. 6-24/7-24/8-24 9-24, failure shall trigger/relay/signal a fuelling/transfer/exchange C.S./S.I.S. system lock-out, the pressure sensor(s)/system(s) may communicate signal(s) by wire/wirelessly by radio/light/and/or any combination of wire (coax/coax R.F/RFoF/wirelessly by radio/light/OWC, for network communications/signal(s) with central detection system/microcontroller/processor/locally and or remotely.

Two parallel, isolated/separate hydraulic system(s) low level sensor(s) (MOU), with separate power source, as depicted on FIG. 6-24/7-24/8-24/9-24, failure shall trigger/relay/signal a fuelling/transfer/exchange C.S./S.I.S. system lock-out, the level sensor(s)(MOU)/system(s) may communicate signal(s) by wire/wirelessly by radio/light/and/or any combination of wire (coax/coax R.F/RFoF/wirelessly by radio/light/OWC, for network communications/signal(s) with central detection system/microcontroller/processor/locally and or remotely.

Two parallel, isolated/separate hydraulic system(s) low-low level sensor(s) (MOU), with separate power source, as depicted on FIG. 6-24/-24/8-24/9/-24, failure shall trigger/relay/signal a fuelling/transfer/exchange C.S./S.I.S. system lock-out, the level sensor(s)(MOU)/system(s) may communicate signal(s) by wire/wirelessly by radio/light/and/or any combination of wire (coax/coax R.F/RFoF/wirelessly by radio/light/OWC, for network communications/signal(s) with central detection system/microcontroller/processor/locally and or remotely.

Two parallel, isolated/separate hydraulic system(s) low pressure sensor(s) (MOU), with separate power source, as depicted on FIG. 6-24/7-24/8-24/9-24, failure shall trigger/relay/signal a fuelling/transfer/exchange C.S./S.I.S. system lock-out, the pressure sensor(s)(MOU)/system(s) may communicate signal(s) by wire/wirelessly by radio/light/and/or any combination of wire (coax/coax R.F/RFoF/wirelessly by radio/light/OWC, for network communications/signal(s) with central detection system/microcontroller/processor/locally and or remotely.

Two parallel, isolated/separate hydraulic system(s) low-low pressure sensor(s) (MOU), with separate power source, as depicted on FIG. 6-24/7-24/8-24/9-24, failure shall trigger/relay/signal a fuelling/transfer/exchange C.S./S.I.S. system lock-out, the pressure sensor(s)(MOU)/system(s) may communicate signal(s) by wire/wirelessly by radio/light/and/or any combination of wire (coax/coax R.F/RFoF/wirelessly by radio/light/OWC, for network communications/signal(s) with central detection system/microcontroller/processor/locally and or remotely.

Two parallel, isolated/separate hydraulic pump(s) system(s) of operation/non-operation and/or trip/failure, by auxiliary contactor(s)(MOU)/ampere(s)/voltage signal, with separate power source, as depicted on FIG. 6-24/7-24/8-24/9-24, on hydraulic pump side of contactor, which shall trigger/relay/signal a fuelling/transfer/exchange C.S./S.I.S. system lock-out, the switch(s)/sensor(s)/system(s) may communicate signal(s) by wire/wirelessly by radio/light/and/or any combination of wire (coax/coax R.F/RFoF/wirelessly by radio/light/OWC, for network communications/signal(s) with central detection system/microcontroller/processor/locally and or remotely.

Two parallel, isolated/separate battery/bank(s) power supply system(s) for fuelling/transfer system(s); supply power indicated by aux. contactor/breaker/voltage/amp/(MOU) monitoring/circuit power failure shall automatically activate transfer switch/cross tie breaker(s) to instantly switch/power circuit(s) to remaining "Live" (also monitored) battery/bank(s)/circuit, as depicted on FIGS. 6,7,8,& 9, and trigger/alarm/relay/signal of an electrical circuit malfunction, with separate/remaining "Parallel" power source, the power monitoring sensor(s)/system(s) may communicate signal(s) by wire/wirelessly by radio/light/and/or any combination of wire (coax/coax R.F/RFoF/wirelessly by radio/light/OWC, for network communications/signal(s) with central detection system/microcontroller/processor/locally and or remotely.

Two or more parallel, redundant, isolated/separate battery/bank/power supply system(s), for Hybrid battery/electric vehicle(s), that may be charged/powered by one and/or more compressed/liquefied gas range extenders. Such as one and/or more fuel cell(s)/Internal combustion engine generators (both may be micro) for power generation. These may be designed to feed either and/or both/multiple battery/banks and/or drive motors. All drive motor(s) shall be protected by fused/circuit breakers/contactor(s)/Aux. contactor(s)/(MOU)/and/or monitored individually, for isolation (manually/automatically) from power feed/source if abnormality occurs, thus protecting feed/source for other motor(s) on same feed/source/circuit. All monitoring sensor(s)/processor(s)/system(s) may communicate signal(s) by wire/wirelessly by radio/light/and/or any combination of wire (coax/coax R.F/RFoF/wirelessly by radio/light/OWC, for network communications/signal(s) with central detection system/microcontroller/processor/locally and or remotely.

Two parallel, isolated/separate generator power monitoring for power source/supply system(s); supply/source power voltage/amperage/frequency/KW/aux. contactor (MOU) sensor(s) for power failure shall trigger/relay/signal transfer switch/tie breaker to switch to the/other separate power source(s), the power monitoring sensor(s)/system(s), as depicted on FIGS. 6,7,8 & 9; may communicate signal(s) by wire/wirelessly by radio/light/and/or any combination of wire (coax/coax R.F/RFoF/wirelessly by radio/light/OWC, for network communications/signal(s) with central detection system/microcontroller/processor(s)/locally and/or remotely.

Two parallel, isolated/separate power monitoring for compressed/liquefied gas fuelling/transfer supply system(s); supply power voltage/amp's/frequency/KW/aux. contactor (MOU) sensor(s) for power failure as depicted on FIGS. 6,7,8, & 9, shall trigger/relay/signal a transfer switch/tie-breaker to switch to the other separate power source(s), and fuelling/transfer/exchange system lock-out, with separate/other separate power source, the power monitoring sensor(s)/system(s) may communicate signal(s) by wire/wirelessly by radio/light/and/or any combination of wire (coax/coax R.F/RFoF/wirelessly by radio/light/OWC, for network communications/signal(s) with central detection system/microcontroller/processor/locally and or remotely.

Two parallel, isolated/separate power monitoring system(s)(MOU); supply power voltage (any/all phase(s)) power failure, as depicted on FIGS. 6,7,8, & 9, shall trigger/relay/signal a fuelling/transfer/exchange system lock-out, with separate power sources, the power monitoring sensor(s)/system(s) may communicate signal(s) by wire/wirelessly by radio/light/and/or any combination of wire (coax/coax R.F/RFoF/wirelessly by radio/light/OWC, for network communications/signal(s) with central detection system/microcontroller/processor/locally and or remotely.

Two parallel, isolated/separate, Fire/flame/heat/smoke detection system(s), with separate power source(s), detection, as depicted on FIG. 6-20/7-20/8-20/9-20, signal shall trigger/relay/signal a fuelling/transfer/exchange C.s./S.I.S. system lock-out, a fuelling/transfer line(s) release system(s) activation, plus a vehicle(s) system(s) release activation, the fire/flame/heat/smoke detection sensor(s)(MOU)/system(s) may communicate signal(s) by wire/wirelessly by radio/light/and/or any combination of wire (coax/coax R.F/RFoF/wirelessly by radio/light/OWC, for network communications/signal(s) with central detection system/microcontroller/processor/locally and or remotely.

Two parallel, isolated/separate, Explosion/sound/pressure/wave detection system(s), with separate power source(s), detection, as depicted on FIG. 6-23/7-23/8-23/9-23, signal shall trigger/relay/signal a fueling/transfer/exchange .S./S.I.S. system(s) lock-out, a fuelling/transfer line(s) release system(s), plus a vehicle(s) system(s) release activation, the explosion/sound/pressure/wave detection sensor(s)(MOU)/system(s) may communicate signal(s) by wire/wirelessly by radio/light/and/or any combination of wire (coax/coax R.F/RFoF/wirelessly by radio/light/OWC, for network communications/signal(s) with central detection system/microcontroller/processor/locally/remotely.

Parallel (2), isolated/separate, purge systems, with separate power sources. The purge system(s) will purge fuel/transfer gas transfer system lines when program (A.I.) is activated, utilizing (MOU) sensor(s) and by performing a system purge, the purge gas will inert the internal area of the transfer system, thus neutralizing any flammable gas within, the purge system(s) may communicate signal(s) by wire/wirelessly by radio/light/and/or any combination of wire (coax/coax R.F/RFoF/wirelessly by radio/light/OWC, for network communications/signal(s) with central detection system/microcontroller/processor/locally and or remotely.

Two parallel, isolated/separate, Explosion/sound/pressure/wave detection system(s), with separate power source(s), detection, as depicted on FIG. 6-23/7-23/8-23/9-23, signal shall trigger/relay/signal a fuelling/transfer/exchange C.S./S.I.S. system(s) lock-out, a fuelling/transfer line(s) release system(s), plus a vehicle(s) system(s) release activation, the explosion/sound/pressure/wave detection sensor(s)(MOU)/system(s) may communicate signal(s) by wire/wirelessly by radio/light/and/or any combination of wire (coax/coax R.F/RFoF/wirelessly by radio/light/OWC, for network communications/signal(s) with central detection system/microcontroller/processor/locally/remotely.

Two parallel, isolated/separate, oxygen detection system(s), sensor(s) may be (MOU)/electro-chemical cell/paramagnetic/analyzers(s), for oxygen transfer(s)/fueling system(s) as depicted in FIG. 6-12/7-12/8-12/9-12, O2 detection levels with-in transfer system may read out in percent %; such as 0% to 100% of O2; with separate power source(s) and may communicate signal(s) to C.S./S.I.S. by wire/wirelessly by radio/light/and/or any combination of wire (coax/coax R.F/RFoF/wirelessly by radio/light/OWC, for network communications/signal(s) with central detection system/microcontroller/processor/locally and or remotely.

Two parallel, isolated/separate, with separate power source(s), for automatically controlled/robotic/manual-assist/fuelling/transfer/oxygen/connection/coupling system(s), land based/on-board vehicle/vessel. The systems shall have one or more (MOU) sensor(s) to guide/control/remote-control/manipulate fuelling/fuelling/transfer(s)/Oxygen system(s)/connection(s)/coupling(s)/arm(s)/fuelling-rack(s)/hose-line(s)//adaptor(s)/tray(s)/hose(s)/extension(s)-of hose(s)/hose-reel(s)/coupler(s)/swivel(s)/knuckle(s)/fluid type ball-joint(s)/coupler(s)/pivot(s)/turret(s)/elevator(s)/lifting mechanism(s)/hoisting/lowering of tank(s)/system(s)//manifold(s)/supplier/receiver-connection(s)/coupler(s). This duel/redundant safety system application also covers any optional vapor return system(s) for duplication of connection(s)/coupling(s). As disclosed in U.S. Pat. No. 8,662,235, all of the sensor(s) can be (MOU) proximity sensor(s), and/or any other sensor(s)(such as rotary encoder(s)), and use any method of sensing proximity, and/or that a particular mechanical part is and/or is not in a particular position. The sensor(s) and/or robotic system(s) may include A.I./Machine-learning/CMAC for intelligent/ predictable/repetitive motion(s). The sensor(s)/(A.I.)/system(s) may communicate signal(s) by wire/wirelessly by radio/light/and/or any combination of wire (coax/coax R.F/RFoF/wirelessly by radio/light/OWC, for network communications/signal(s) with central detection system/microcontroller/processor/locally and or remotely.

Two parallel, isolated/separate, with separate power source(s), for video/camera(s)/monitoring system(s). The multiple camera/video system(s) will be robust, and enhance security/monitoring for all transfer(s)/fuelling/oxygen transfer event(s). The duel video/camera(s) system(s) shall be continuously recorded, and stored/data/video for future review. The video/camera(s) will have local/remote viewing/access. The remote access, can enable remote viewing/operation(s); with remote shut-down capabilities; in case of any abnormal event(s); for example: a local watch-person requires use of toilet, and a gas system leak occurs while away; the (back-up) watchful video eyes can visually see the leak, and shut-down operations remotely, (if other sensor(s) have not already caught the leak) and which all events/operation(s) will be identified/displayed/recorded; so that all involved parties (supplier/receiver) are aware of who/which party (third party-remotely) interrupted/stopped the transfer/fuelling/oxygen event. The added protection by having duel (2) independent video/recorded system(s) shall enhance security, protect lives, asset(s), and pass S.I.L.-3 compliance standards. The camera/video system(s) may communicate signal(s) by wire/wirelessly by radio/light/and/or any combination of wire (coax/coax R.F/RFoF/wirelessly by radio/light/OWC, for network communications/signal(s) with central detection system/microcontroller/processor/locally and or remotely.

Also system/tank specific; (OPTIONAL) vapor management Input(s)/Output(s) will trigger fuelling/transfer system lock-out input(s)/output(s) such as:

Two parallel, isolated/separate system (optional) return line(s) compressor(s) operation/non-operation and/or trip/failure, by ampere(s)/voltage/auxiliary contactor (MOU) for detection, with separate power source, on compressor side of electrical contactor will also enable/signal/trigger/relay a fuelling/transfer system lock-out, the switch(s)/sensor(s)/system(s) may communicate signal(s) by wire/wirelessly by radio/light/and/or any combination of wire (coax/coax R.F/RFoF/wirelessly by radio/light/OWC, for network communications/signal(s) with central detection system/microcontroller/processor/locally and or remotely.

Two parallel, isolated/separate system (optional) return line(s) pump(s) operation/non-operation and/or trip/failure, by ampere(s)/voltage/auxiliary contactor (MOU) for detection, with separate power source, on pump side of electrical contactor will also enable/signal/trigger/relay a fuelling/transfer system lock-out, the switch(s)/sensor(s)//system(s) may communicate signal(s) by wire/wirelessly by radio/light/and/or any combination of wire (coax/coax R.F/RFoF/wirelessly by radio/light/OWC, for network communications/signal(s) with central detection system/microcontroller/processor/locally and or remotely.

Parallel (2), isolated/separate (Optional) return line(s) positive connection sensor(s), with separate power source, such as on return transfer adaptor and/or on return Emergency Release Coupler ERC (MOU); non detection/withdrawal will enable/trigger/relay/signal a fuelling/transfer lock-out, the connection sensor(s)/system(s) may communicate signal(s) by wire/wirelessly by radio/light/and/or any combination of wire (coax/coax R.F/RFoF/wirelessly by radio/light/OWC, for network communications/signal(s) with central detection system/microcontroller/processor/locally and or remotely.

Two parallel, isolated/separate Transfer system (optional) return line(s) High pressure (MOU) sensor(s)/detection/signal, with separate power source, (at a predetermined set-point) will signal/trigger/relay a fuelling/transfer system lock-out, the pressure sensor(s)(MOU)/system(s) may communicate signal(s) by wire/wirelessly by radio/light/and/or any combination of wire (coax/coax R.F/RFoF/wirelessly by radio/light/OWC, for network communications/signal(s) with central detection system/microcontroller/processor/locally and or remotely.

Two parallel, isolated/separate Transfer system (optional) return line(s) Low pressure (MOU) sensor(s)/detection/signal, with separate power source, (at a predetermined set-point) will signal/trigger/relay a fuelling/transfer system lock-out, the pressure sensor(s)(MOU)/system(s) may communicate signal(s) by wire/wirelessly by radio/light/and/or any combination of wire (coax/coax R.F/RFoF/wirelessly by radio/light/OWC, for network communications/signal(s) with central detection system/microcontroller/processor/locally and or remotely.

Two parallel, isolated/separate Transfer system (optional) return line(s) High differential pressure (dp)/dirty filter/strainer, with separate power source, sensor(s)(MOU)/signal (at a predetermined set-point) will signal/trigger/relay a fuelling/transfer system lock-out, the pressure (dP) switch(s)/sensor(s)/system(s) may communicate signal(s) by wire/wirelessly by radio/light/and/or any combination of wire (coax/coax R.F/RFoF/wirelessly by radio/light/OWC, for network communications/signal(s) with central detection system/microcontroller/processor/locally and or remotely.

Two parallel, isolated/separate Transfer system (optional) return line(s) High-High differential pressure (dp)/dirty filter/strainer, with separate power source, sensor(s)(MOU)/signal (at a predetermined set-point) will signal/trigger/relay a fuelling/transfer system lock-out, the pressure (dP) switch(s)/sensor(s)/system(s) may communicate signal(s) by wire/wirelessly by radio/light/and/or any combination of wire (coax/coax R.F/RFoF/wirelessly by radio/light/OWC, for network communications/signal(s) with central detection system/microcontroller/processor/locally and or remotely.

Two parallel, isolated/separate Transfer system (optional) return line(s) compressor(s) operation/non-operation and/or trip/failure, by ampere(s)/voltage/auxiliary contactor (MOU) for detection, with separate power source, on compressor side of electrical contactor will also signal/trigger/relay a fuelling/transfer system lock-out, the switch(s)/sensor(s)/system(s) may communicate signal(s) by wire/wirelessly by radio/light/and/or any combination of wire (coax/coax R.F/RFoF/wirelessly by radio/light/OWC, for network communications/signal(s) with central detection system/microcontroller/processor/locally and or remotely.

Two parallel, isolated/separate return line(s)(optional) pump(s) operation/non-operation and/or trip/failure, by ampere(s)/voltage/auxiliary contactor (MOU) for detection, with separate power source, on pump side of electrical contactor will also signal/trigger/relay a fuelling/transfer system lock-out, the switch(s)/sensor(s)/system(s) may communicate signal(s) by wire/wirelessly by radio/light/and/or any combination of wire (coax/coax R.F/RFoF/wirelessly by radio/light/OWC, for network communications/signal(s) with central detection system/microcontroller/processor/locally and or remotely.

Two parallel, isolated/separate Transfer system (optional) return line(s) High Oxygen % content sensor(s), the oxygen monitoring sensor(s)(MOU)/system(s), with separate power sources, will enable/trigger/relay/signal a fuelling/transfer system lock-out, may communicate signal(s) by wire/wirelessly by radio/light/and/or any combination of wire (coax/coax R.F/RFoF/wirelessly by radio/light/OWC, for network communications/signal(s) with central detection system/microcontroller/processor/locally and or remotely.

Two parallel, isolated/separate Transfer system (optional) return line(s) High-High Oxygen % content sensor(s), the oxygen monitoring sensor(s)(MOU)/system(s), with separate power sources, will enable/trigger/signal/relay a fuelling/transfer (sa0 system lock-out, may communicate signal(s) by wire/wirelessly by radio/light/and/or any combination of wire (coax/coax R.F/RFoF/wirelessly by radio/light/OWC, for network communications/signal(s) with central detection system/microcontroller/processor/locally and or remotely.

Two parallel, isolated/separate power monitoring transfer (optional) return system(s); supply power voltage (any/all phase(s)) power failure shall enable/trigger/relay/signal a fuelling/transfer/exchange system lock-out, with separate power sources, the power monitoring sensor(s)(MOU)/system(s) may communicate signal(s) by wire/wirelessly by radio/light/and/or any combination of wire (coax/coax R.F/RFoF/wirelessly by radio/light/OWC, for network communications/signal(s) with central detection system/microcontroller/processor/locally and or remotely.

Two parallel, isolated/separate, Fire/flame/heat/smoke detection system(s), with separate power source, as depicted in FIG. 6-20/7-20/8-20/9-20, detection signal (MOU) shall enable/trigger/relay/signal a fuelling/transfer/exchange C.S./S.I.S. system lock-out, a fuelling/transfer (including optional return) line(s) release system(s) activation, plus a vehicle(s) system(s) release activation, the fire/flame/heat/smoke detection sensor(s)//system(s) may communicate signal(s) by wire/wirelessly by radio/light/and/or any combination of wire (coax/coax R.F/RFoF/wirelessly by radio/light/OWC, for network communications/signal(s) with central detection system/microcontroller/processor/locally and or remotely.

Two parallel, isolated/separate, Explosion/sound/pressure/wave detection system(s), with separate power source, as depicted in FIG. 6-23/7-23/8-23/9-23, detection signal (MOU) shall enable/trigger/relay/signal a fuelling/transfer/exchange C.S./S.I.S. system(s) lock-out, a fuelling/transfer (including optional return) line(s) release system(s), plus a vehicle(s) system(s) release activation, the explosion/sound/pressure/wave detection sensor(s)/system(s) may communicate signal(s) by wire/wirelessly by radio/light/and/or any combination of wire (coax/coax R.F/RFoF/wirelessly by radio/light/OWC, for network communications/signal(s) with central detection system/microcontroller/processor/locally and or remotely.

Two parallel, isolated/separate, vacuum monitoring/leak detection system(s), with separate power source, detection(s)(MOU) signal will allow monitoring of vacuum jacketed tank(s) and piping systems. They shall monitor and alarm if an abnormal reading occurs. The system shall enable/relay/trigger a fuelling/transfer system(s) lock-out; thus shutting down transfer; enabling operations to investigate source of vacuum problem. The system may communicate signal(s) by wire/wirelessly by radio/light/and/or any combination of wire (coax/coax R.F/RFoF/wirelessly by radio/light/OWC, for network communications/signal(s) with central detection system/microcontroller/processor/locally and or remotely.

Two parallel, isolated/separate vibration monitoring system(s). Vibration monitoring is an indication of a pump/compressor problem. Be it mechanical imbalance/vapor phasing/slugging with-in system. A High/High-High vibration reading (MOU) shall signal/trigger/enable a process/fuelling/transfer shut-down. To allow operations to monitor/improve/correct situation, and re-set/re-start with same/different equipment, as necessary. The vibration system(s) may communicate signal(s) by wire/wirelessly by radio/light/and/or any combination of wire (coax/coax R.F/RFoF/wirelessly by radio/light/OWC, for network communications/signal(s) with central detection system/microcontroller/processor/locally and or remotely.

All the above sensor(s)(MOU)/system(s)/triggers/relays/signal(s)/actuators/sensor(s) which may be intelligent system(s)/sensor(s)/actuator(s) will be individually displayed on the Human interface, with status of each Identifiable point, for operator information/action(s) enabling corrective action, (in Auto/semi-auto/Manual mode), and re-setting, to resume operations when safe conditions are achieved. A optional Yellow, Red, or xenon light system/or yellow, Red, Xenon/white light can be utilized on H.I.M. to identify system status,/Yellow=Caution/Warning, process trouble/problem exist and requires attention, an array of color lights in transfer zone can alert all of system status; re-set is possible after problem corrected/RED=E-STOP/SHUTDOWN; and/or Red, and/or Xenon/White lights may also be configured for visual alerting; also different audible sounding alarms, such as pulsing, siren, horn(s)/speaker arrays are included in this invention. A SYSTEM UPSET/safety system stop/shut-down is automatically shutting down pumps/compressors/closing isolating valves/diverting fuelling/transfer(s) and placing system(s) on stand-by; until further corrective action is taken.

Other fuelling/transfer/exchange, redundant Parallel (2), safety system lock-outs I/O shall include: E-stop manual device(s) such as buttons/pull chord(s), Supplier Tank High-High level, Receiver Tank High-High Level, supplier tank Low-Low level, receiver tank low-low, supplier tank High-High pressure, tank receiver tank High-High pressure, High-High transfer (xfer) line pressure, High-High vapor line pressure, low-low vapor line pressure, High-high Filter/strainer D/P supply line, High-High vapor line filter/strainer D/P, High-High Flow rate, E.R.C. coupling sensor alarm, coupler/adaptor connection sensor (optional), High-High Motion/movement, Fire/flame/heat/smoke sensor input(s), arc/arcing, spark(s), static, lightening sensor(s), weather (high-high winds), explosion/sound/pressure wave sensor(s)/system, may all trigger an Emergency Shut-down/Stop. A safety system E-Stop/shut-down will activate/de-activate pump(s)/compressor(s) shut down(s), close all fuelling isolation valves (maintain closure/safe state), activate fuelling/transfer line release system(s), activate/de-activate vehicle/vessel lock-out system(s)-release vehicle/vessel for operator control, and in case of fire/flame/heat/smoke, activate fire/flame/heat/smoke system alarms, relays/links/communication(s). Plus other cases include explosion/sound/pressure wave sensor(s)/system activated. These alarms, triggers, relays, will also activate the purge and inerting system to activate.

Processor(s)/Processing:

Duel (2) processor(s), Duel (2) Programmable logic controller(s), duel (2) Cascading control system(s)/Relay logic Circuit(s), are all with-in the scope of this invention. Also included is Artificial Intelligence (AI)/Machine learning/programs, routines/subroutines. Smart sensor(s), Smart Actuator(s), Quantum processor(s), Quantum sensor(s), quantum Actuator(s), Photodiode(s)/Array(s), Smart Photodiode(s)/array(s), Quantum Diode(s)/arrays. Includes Machine learning/deep learning; A.N.I. artificial Narrow Intelligence, also includes any/all Artificial General Intelligence (A.G.I).

To be S.I.L.-3 compliant all input(s)/processor(s)/sensor(s)/system(s) must be independent of all others (control system) twinning/mirroring of control system signals is not acceptable, although the PLC's/processor(s)/Relay logic system/circuit(s) may communicate and/or share output(s), and also trigger, relay, the other into action; as a true redundant safety system; System review/cyber-security/review/issue(s) may warrant keeping S.I.S/C.S. processor(s)/system(s) completely isolated. Any/all types of Human Interface (H.I.) is with-in the scope of this invention, these interface(s) allow an operator(s) to monitor all input/outputs and to manipulate device(s)/reset for proper system control. The operator may start/stop motors, compressors, pumps, operate valves, actuators, exchange systems as needed for his/her transfer/exchange operation(s). The interface will display required system information such as temperature(s), pressure(s), level(s), flow(s), oxygen content %, L.E.L. % (s), valve(s) positions, pump(s)/compressor(s)/hydraulics status for operations to enhance/assist operations in situational awareness. An interface may be a computer screen(s), a personal digital assistant, or even a heads-up visor display screen on operator, for real-time system info. Voice/gesture activated command/recognition system(s) may also be incorporated into controls, therefore an operator may be capable of making audible voice/gesturing commands as a situation is occurring, instead of needing to access a H.I.M. or E-Stop button, by use of head-set with ear-buds/head set and/or micro-phone-(array) for communications. Also, included is remote viewing/operations; this "Back-Up" can be useful for redundant monitoring/operational management.

OPTIONAL: Process Status Indication (OPTIONAL) YELLOW=Caution/Warning—Yellow=System SHUTDOWN with optional Yellow LED(s)

(OPTIONAL) Red=Caution/Warning and/or WHITE (Xenon)=E-STOP/SHUTDOWN (OPTIONAL) For Warning/Estop-shutdown/Different audibles for each (Constant/pulsing/Horn-siren)

YELLOW light/strobe/Flash/LED(s) or button/Banner on Human Interface=Point/system is NOT Good/Not ready to operate/fuel/transfer/exchange. An Abnormal condition exist which requires corrective action and/or a reset to enable permissive to continue operation/fuelling/transfer/exchange(s).

RED LIGHT/STROBE/LED(s)/FLASH(Xenon) or button/Banner on Human Interface(s)=EMERGENCY STOP/SHUTDOWN ALL Pump/Compressor OPERATIONS to CEASE, and all devices/valves to SAFE position (ALL valve(s) ISOLATED to SAFE Condition/Position). Emergency release may be activated if following points (If High-High motion is activated, the fuelling/transfer line automatic disconnect and the vehicle lock-out release will be activated, thus giving vehicle/vessel operator full control of vehicle operations/movement. If a Fire/Flame/Heat/Smoke activated and/or Explosion/Sound/Pressure Wave sensor(s) activated, the vehicle lock-out system will be de-activated, plus line release lock-out de-activated, thus allowing operator control/operation of vehicle at operators discretion along with fueling/transfer line automatic disconnect, and relays/communications for fire alarm/Fire suppression, fire pumps, links to other fire protection back-up.

One example: audible/visual alarms indicate a fire, and it is located at the on-shore facility, the operator can now control his vehicle/vessel since automatic/emergency fuelling/transfer (cease/stop/isolated) and the fuel line release system is (de)/activated and the vehicle lock-out is (de)/activated, thus releasing the vehicle to operators' control to remove the vehicle, away, distancing itself from further spreading fire danger (on-shore to onboard), and the fire alarms/suppression/communications system will have been relayed/activated, and further responding fire teams will be shortly arriving, from automatic information communication link(s).

An exception to note, with the use of non-self propelled mechanized barges, the situation is such that a tug shall also be equipped with Proper duel/parallel control(s) system(s) and duel/parallel power source(s)/battery/UPS/bank(s) for S.I.L.-3 redundant compliance to/for both, tug and/or barge.

Compressed/liquefied gas redundant safety control system(s)/PLC/Processor(s)/computer control safety system(s) and shall be continuously powered on, and functioning in stand-by/connected/mode; when-ever fuel/compressed/liquefied gas is present onboard the barge, with-out power source(s) (two sources for S.I.L-3) the safety system(s) will cease to function, which undermines all safe gas/liquefied gas handling practice(s)/safety goals. Un-attached/un-powered mechanized barges with compressed/liquefied gas onboard shall be reviewed/regulated/for with out multiple electrical power feed(s); plus shall require two (2) separate/individual source feeds for robust redundant protection(s). Properly sized Generator(s) with proper fuel quantity(s) and/or isolation transformer(s) may supply conditioned power to safety system(s). An un-manned liquefied gas/compressed gas mechanized barge shall "ONLY" be moored where a mandatory operational control room with approved communication link(s)/connected to mechanized fueling barge with duel power feed(s) and qualified staff at approved mooring locations (that of which has approved power and Fuelling/transfer PLC/Processor(s) and communications links). The control system(s) shall operate continuously, but the vehicle release system shall be reviewed; to detect if tug/barge are separated by I/O communication(s). Also, weather detached and/or attached and/or on stand-by, otherwise a modification taking into consideration an unmanned vehicle/vessel with quantities of compressed/liquefied gas is moored with-out safety system(s)/human supervision. The barge vehicle, with gas/compressed gas on-board, shall be supervised at all times fuel/compressed/liquefied gas is present, and a communication link(s) between the tug and barge/control room is necessary for monitoring, and/or safety system(s) activations. Multiple different negative situation(s) may occur if compressed/liquefied gas fuelling/transfer barge is moored/towed/stowed at uncontrolled/unmanned/unpowered tug/berth/slip/dock with compressed/liquefied gas on-board.

Emergency Stop/Shutdown=Red Stop/Shutdown Device/Display

An Emergency STOP and or SHUT-DOWN system can be activated by manual "RED"-E-STOP Button/Button(s)/device(s). This system may also be activated at the Human Interface, locally/remotely; or by manually Appling necessary pressure to the option color "RED" motion pull-chord/tether/cable. To avoid unnecessary activation it would be advantageous to install recessed RED buttons, therefore some-one who accidently brushes up against the button will not activate it, but it is still very easily accessible to de-press. Another option for the E-stop button would include internally solid intrinsically safe illuminated button, such as red LED(s), for night-time identification, and possibly flashing red during E-stop activation.

Caution/Warning/Trouble Stop/Closure=Yellow (Color Optional) Caution/Warning/Trouble Button & Device A control system stop, which may be a high or low tank level (receiver or supplier), High or low tank pressure, early motion detection, oxygen % in-line, transfer pump or compressor failure, E.R.C. not proper connection/line up, (optional) coupler/adaptor connection sensor, high filter/strainer D/P, (optional) mooring system signal, low level seismic sensor, gas leak detection system low level detection, High flow rate, abnormal system pressure, abnormal system temperature, system power loss, and any other abnormal system conditions may trigger a CAUTION/WARNING/TROUBLE system stop; which will stop transfer pumps/compressors, Close all Isolation valves to prevent exchanging/fuelling/transfers flow, sound alarm(s), Illuminate Yellow (optional color) warning light, strobe, Flashing light, Banner on Human Interface to alert all involved that this is a WARNING/CAUTION/TROUBLE system stop, so that the system/problem that caused the WARNING/CAUTION/TROUBLE stop, can be immediately identified, and if situation can be corrected/repaired, and if corrected, reset the trouble point and resume normal operations.

Gas Transfer System Instruments:

The instrumentation on a gas fuelling/transfer(s) system shall be duel-(2)/redundant, through, and robust. The transfer system is generally comprised of the following major components; followed by an instrument listing:

A supplier tank(s), a receiver tank(s), a pump(s), a compressor(s), transfer line(s), manifold(s), interface connections/zone. Instrumentation list: All sensor(s)(MOU), may be "Smart" sensor(s): Pressure Sensor(s) with transmitter(s) (xmtr) for tank pressure(s) any/all tanks, pressure sensor(s), for transfer line(s)(xfer), for auxiliary inerting system(s), all pressure sensor(s) may be compound/absolute/standard reading(s), Pounds per Square Inch (PSI)/Inches of HG vacuum/metric, temperature sensor(s) w/xmtr(s) can detect temperature (temp) or temperature differential, which may be (MOU) optical, such as infrared/fiber optic/thermocouple(s)(T.C.'s)/Resistance Temp. devices (RTD'S) may be used to indicate process temp./at any/all tanks, flow line(s), drain/spill pan, or double (jacketed/insulated) Hose-line for leak detection. Flow meter(s) w/xmtr, which may be Bi-Directional, and (MOU) internal sensing, plus vortex shedding/differential pressure type to measure flow, which can be internal or external to flow line, and Coriolis flow method may use Linear Variable differential transformer, or optical, or ultrasonic to measure flexure for flow computer/calculation, also all may include density detection (MOU) for S.G. flow controller calculation, must utilize two (2) independent flow meters for SIL-3 approval. Level sensor(s)(MOU) w/xmtr to measure level/alarm for multi-point sensing/individual sensor(s) at each predetermined level/or both to provide robust redundant level(s) such as optical, magnetic, ultrasonic, radar/guided wire radar, or simply float switches, each sensor will be stand alone and/or redundant; such as High/High-High level and Low/Low-Low for duel level alarm(s)/process warning/caution/Shut-down-Stop, also load cells may be used to measure quantity in any tank, plus strain gauges may also be utilized to detect a tank level, for S.I.L.-3 safety system. A duel (2) oxygen sensor(s) for each tank and in the flow line(s) to alert operations of oxygen percentage(s) present, multiple set points will trigger alarm/warning/E-stop-Shut-down. All of the above instruments are capable of providing process control/process alarms/Emergency Stop/Shut-down(s) inputs to either/both PLC's/processor(s)/Cascading Control system/Relay Logic System, but must have independent/separate instrument(s) for each measurement (redundant) one communicating with the Control System PLC and one for the SIL-3 safety E-STOP-Shutdown S.I.L.-3 Processor system; the two (Duel Processors) may communicate with each other; but programs and operations must be able to stand-alone and function individually. This individual, distinct, processing/processor is robust, and also is an added layer for cyber-security protection, in the event of a cyber breach/attack, each; CS/SIS system has an independent safety computer/processor(s), as system back-up.

Automatic/Semi-Automatic/Manual Fuelling/Transfer Connections:

The vehicle/land based fuelling/transfer connections are for liquefied gas/compressed gas/oxygen supply/receiving systems. The system(s) parallel (2) duel computerized control systems for safe gas/liquefied gas connections for fuelling/transfers. The connection(s) may utilize state of the art MOU sensor(s) to automatically seek optical/magnetic recognition target(s), adjust by means of articulation, pivot, travel, extension, clamp, rotation, twist, grab, fasten, and/or lock connection. The sensor(s) shall guide automatic/semi-auto/manual operation(s) and detect weather a mechanical part is/is not in a particular position, also the sensor(s) can measure distance, speed, interference, interference of light (visible/non-visible), existence/non existence, optical/magnetic recognition mark(s). The system may function automatically, machine learning A.I./S.I. can utilize cerebellar/CMAC technology/high speed photodiode/camera(s)/array for learned/pattern recognition/predictive recognition to optimize transfer/fueling connector movements/repetitive movements/repetitive connections. The system may also function in semi-auto mode, utilizing some human adjustments/manual mode by human(s) with local hand-held/joystick/controller operation. Automatic feed-back signal(s) will inform/alert operations of position(s) at all times, and assist with movements/control(s) of connection(s). The system/sensor(s), may also detect a negative situation, such as torque/strain/disengagement; which shall trigger/relay/signal a fuelling/transfer system shut down/fuelling/transfer line(s) system release. They may also guide connections home for safe house-keeping. There shall be audible/visual alerts (specific to transfer system) when operations begin, for human notification/awareness of automatic machinery in operation. The duel (2) processor/control system, with separate/isolated power source(s), will provide safe robust operation(s) connection(s) for S.I.L-3 compliance.

Vehicle/Vessel Motion:

To detect omni-directional vehicular/vessel movement/distances (motion in any vector), two (2) separate and isolated motion system(s)/sensor(s) will be necessary for S.I.L.-3 compliance. Multiple sensor(s) may be utilized to perform different functions, standing alone (intelligent sensor(s)) and/or in a cascading control system (PLC and/or Relay Logic) to perform a fuelling system/exchange lock-out and or a vehicle lock-out, and or vehicle lock-out release, and or an automatic fuelling/transfer line disconnect. The use of one or more sensor(s) in combination with one or more micro switches, combine to automatically mitigate excessive movements/motion, initiate the fueling/transfer/exchange lock-out and close the isolation valve(s) (and/or re-direct/recycle/surge-Knock-out drum with 2/3/and or 4-way valve(s)) to prevent/disable fuel flow/transfers, Optional 2, 3, 4 way and/or multi-port valves may be utilized in effect to recycle/loop back/redirect liquefied gas materials so that surge/adiabatic shock is avoided. These 2-way, 3-way, 4-way, or multi-port valves can isolate, as well as divert/by-pass/re-direct, fuelling/transfer flow; while maintaining an isolation to fuelling/transfer. The sensor(s)(MOU) can be optical and/or ultrasonic and/or Accelerometer(s)/ piezo-electric accelerometer(s)/and/or tri-axial accelerometer(s) coupled to processor to compute motion/standing alone and/or combined with Gyro(s)(MOU) and/or magnetometer and/or an Inertial Motion Units (IMU)/optical/ ultrasonic measurement devices, Sensor(s) such as accelerometer(s)/tri-axial accelerometer(s)/piezo-electric accelerometer(s), optical and or ultrasonic sensor(s) and or IMU(s)(any/all IMU(s) with RLG/FOG/HRG/CRG/PV/ TFG/VSG/CVG/WGR/MEMS gyro/quantum gyro/Inertial measurement unit(s)/standing alone and/or combined to detect excessive movement (above or greater than predetermined stop (motion limit(s)) can be sensor(s) such as laser/sonar/radar measurement sensor(s) or may be laser/ (Ring laser Gyro, RLG/Fiber optic FOG, gyroscope/Cylindrical Resonator gyroscope CRG, Piezoelectric gyroscope PG, Tuning fork gyroscope, TFG, hemispherical resonator gyroscope, HRG/WGR and/or wine glass resonator gyroscope, vibrating structure VSG gyroscope, Coriolis vibratory gyroscope CVG/all standing alone and/or combined with other optical, ultrasonic, magnetic sensor(s)/gyroscopes/accelerometer(s)) or can simply be accelerometer(s)/ tri-axial accelerometer(s)/IMU's coupled to processing units to compute motion. Use of one or more of these sensor(s) or possibly multiple sensor(s) combined and/or others such as a mechanical tether/cable/chord/(all may be single/duel) attached by predetermined lengths, from vehicle/vessel (vehicle to vehicle) to a releasing mechanism, this mechanical measurement system will trigger a micro-switch/switch to indicate a predetermined level of movement/motion/pull, but a combination of Tether/cable/chord system(s) along with accelerometer(s)/(MOU) and or optical, magnetic, sonar, and ultrasonic measurement(s)/IMU's may provide the safest, rapid detection of movement/distances/motion/ pull to activate either fueling system lock-out (emergency stop) and or emergency shutdown. Use of one or more of these sensor(s) or possibly multiple sensor(s), creates the safest condition to initiate mitigation of fuelling/transfers, by maintaining other systems (vehicle lock-out) in a lockout state, and activating one or more audible or visual alarms. The fuel flow system can be reactivated by an operator at the Human interface. Different vehicles/vessels may require different parameters to initiate such a motion lock-out. For example, highly excessive motion/movements can relay, trigger or enable an emergency STOP, and under certain conditions, activate an over-ride system to disable the vehicle lock-out systems, but keeping the fuelling/ transfer system in a locked out (safe state with isolation valve(s) closed and liberating the vehicle(s) until proper control/conditions are achieved and or exist. Such a condition can activate or deactivate any vehicle/vessel or automatic fueling line release system that exists, or initiated by vehicle or other lock-out. Multiple variations can be used, with multiple steps and sequences to maintain the safe state, With isolation valve(s) in a closed position (Positive position feedback indicators on all Isolation valve(s)), and if predetermined conditions exist, vehicle movement may be allowed by automatic activation/de-activation of the fuel/ transfer line(s), and/or vehicle lock-out release system (de-) activated.

Tank Exchanging System(s):

Exchangeable Tank(s) may utilize multiple sizes, forms, and specifications. Utilizing exchangeable tanks will allow for more controlled filling conditions/location(s); such as an isolated/controlled/authorized location. Exchanging/transporting/handling of exchangeable tanks will require safe practices utilizing state of the art sensor(s), processor(s), and actuator(s). Safe tank exchanges may utilize complex mechanized machinery or simply manual change out. Safety systems to detect tank(s), valve(s)/position(s), pressure(s), weight(s), location, tank identification, tank contents, volume(s), number of fills, serial number(s), utilizing R.F.I.D., optical, magnetic, ultrasonic sensor(s) is with-in the scope of this invention. Some air/space-craft may utilize standardized shaped tanks, to "Form Fit" onto/into aircraft, the tanks/ vessel(s) may be capable of handling compressed/liquefied gas fuel(s). Other spacecraft/rockets may exchange tanks/ vessel(s) that may be below cockpit/capsule/pod, thus elevating/lifting/raising capsule, and exchanging tank(s)/ vessel(s), either by swapping location of capsule/exchanging tank below; for example, a system could use a capsule turret, which simply (lifts), rotates (180/360)/travels the capsule, to a predetermined rotary/horizontal position, to hold/place upon an exchanged full set of tank(s).

Rail Road: Heavy/Long Haul, Plus Light Switcher/Commuter Rail

All railroad locomotives/light transit rail will benefit greatly from the use of compressed/liquefied gas fuels/Hy-Brid battery electric systems. Long haul(s) will decrease emissions substantially, and commuter rail will decrease inter-city traffic/emissions. They may also reduce emissions by reduced engine sizes, utilizing battery electric/range extender model(s). The battery/bank(s) (2) two or more for SIL-3 Compliance, can be pre-charged and/or may be charged by on-board power supply such as Hy-Brid fuel cell/internal combustion engine, coupled to generator, for source power to the traction/electric vehicle/locomotive/ commuter rail drives, and may be utilized independently and/or simultaneously. The generator, may directly drive electric motors/it may supply generated power to batteries, which then supply drive motors (which ever is more fuel efficient. The power supply management system shall include battery(s) monitoring system with temperature control(s)/voltage regulation/monitoring/amperage/current/circuit breaker(s)/available battery power, plus with automatic transfer switching, plus cross tie(s) as per design/wiring for continuous operation(s), when one battery may be out of service; this enables operations (which may be remotely operated) to safely continue service on remaining battery(s). Also shall include onboard video/camera(s) with recording/ monitoring from base, duel (2) redundant systems for S.I.L.-3 compliance. The monitoring/data communications, may communicate signal(s) by wire/wirelessly by radio/ light/and/or any combination of wire (coax/coax R.F/RFoF/ wirelessly by radio/light/OWC, for network communication(s)/signal(s) with central detection system/microcontroller/processor/locally and/or remotely. The compressed/ liquefied gas fuel storage may be on-board/exchangeable tanks. If tanks are on-board, safety systems for fuelling events shall include: vehicle lock-out (to prevent transmission/ignition/parking) systems from accidental engagement during fueling/tank exchanging; automatic fuel/transfer line release system; plus safety motion detector(s)(MOU), of (accelerometer(s)/tri-axial accelerometer(s)/Inertial motion unit(s)/optical/magnetic/ultrasonic sensor(s)/plus mechanical device(s), all may stand alone/be combined for motion detection while fuelling event is occurring. Fire/smoke/ explosion/gas detection system(s) shall also be included system(s), plus vehicle lock-out release shall be included, in case of necessary vehicle movement, required by fire/explosion hazard(s). If tank is exchangeable, then the connection (both rail car tank/connection(s)); monitoring (MOU) detectors will require over-ride/by-pass for temporary fuel cell/I.C.E. operation until full exchanged tank is safely connected. Oxygen detection, both In-line/tank oxygen detector(s)/detection system will alert operation(s) if any oxygen is present in transfer line(s)/tank(s). Long term disconnection from compressed/liquefied gas exchangeable tank(s), may require an alternative plan; such as duel fuel internal combustion engine, to operate from on-board fuel tanks, or a switcher/pusher/yard locomotive/tug to assist movements during/while awaiting filling of exchangeable tank(s). On-board gas detection/fire/smoke/heat detection system shall be redundant, utilizing separate battery power source for SIL-3 compliance.

Inerting System:

Inerting the compressed/liquefied gas system is of great importance, for if not done properly one may create a very dangerous condition with-in the transfer system. Generally, tanks are kept at consistently zero/low oxygen percentage, it is during an improper transfer that will introduce oxygen into a tank. The transfer lines shall be constantly monitored for an elevated oxygen content (this also can indicate a transfer system leak), but different techniques may display different conditions for example, evacuation (vacuum) method may cause certain parts/components to slightly leak that would not normally leak under pressure, therefore a precision incremental vacuum (InHg-(micrometer(s))) transmitter/display would be an excellent indicator of system leaks/containment. Another method of inerting is utilizing nitrogen (liquid/vapor), N2, will also help indicate a system leak during idle time, by close pressure monitoring of the Isolated system. N2 is an excellent method for oxygen displacement and system pre-cooling/system cool-down at pre-transfer preparation. Although, excessive N2 may be transferred into receiving tank with-out proper system gas purge procedure. Nitrogen has the benefit of cryogenic temperature in liquid state, thus inerting and cooling system simultaneously.

ARC Detection:

Any arc, lightening, spark, static electric, or arcing of any kind in the transfer zone shall initiate a system Emergency STOP—SHUTDOWN. This condition is not acceptable in the transfer zone. Any optical system capable of detection; even low energy arcing, will trigger/relay a signal that arcing/lightening is present and trigger an E-Stop-Shutdown event, initiate system purge, and idle transfer system until situation is either corrected, or weather improves.

Ground Detection:

Static electric arcing also a valid danger for compressed gas/liquefied gas fuelling/transfer(s), proper grounding system(s), with indications and/or interlocks will afford additional layer of safety, by indication of non-grounding. A ground monitoring system that is interlocked with shut-down system, to verify proper ground(s) are functioning, is with-in this invention to ensure safety, system(s) may communicate signal(s) by wire/wirelessly by radio/light/and/or any combination of wire (coax/coax R.F/RFoF/wirelessly by radio/light/OWC, for network communications/signal(s) with central detection system/microcontroller/processor/locally or remote.

Vibration Detection System(s):

Any/all Vibrations in equipment is a sign of age/misalignment/flow imbalance. Vibration detection is crucial to assist in preventive/predictive maintenance/repairs. Utilizing state of the art optical/magnetic/ultrasonic (MOU) vibration detection devices will indicate/trigger/relay a signal, such as High/High-High vibration alarm/reading to indicate a situation. Corrective action(s) shall then be in order, such as repair/replacement. All vibration monitoring system may communicate signal(s) by wire/wirelessly by radio/light/and/or any combination of wire (coax/coax R.F/RFoF/wirelessly by radio/light/OWC, for network communications/signal(s) with central detection system/microcontroller/processor/locally and or remotely.

Magnetic Levitation/"Air" Bearings:

Modern Rotating equipment utilizes magnetic field for levitating shafts/(air-bearings), this enables near zero friction during rotation, and no lubrication(s) is required. Any/all rotating transfer/production equipment may utilize mag-lev technology for improved process/transfer(s)/fuelling systems.

Lubrication System(s):

Lubrication system(s) are essential (if non-mag-lev) for friction reduction in rotating equipment. Monitoring lubrication system shall consist of temperature, Pressure, level, and flow monitoring. Abnormal conditions such as High/High-High shall alarm and trigger/relay a signal for a system shut-down. The lubrication system may communicate signal(s) by wire/wirelessly by radio/light/and/or any combination of wire (coax/coax R.F/RFoF/wirelessly by radio/light/OWC, for network communications/signal(s) with central detection system/microcontroller/processor/locally and or remotely.

Seismic Detection/Events:

A seismic event can happen anywhere and at any time. Some regions of the globe are located near "Fault" lines/zones, and are therefore more prone to have a Seismic event. Some of these zones should avoid installation of a fuelling/transfer system for compressed/liquefied gas. An in-depth Seismic study should be required prior to final investment decision for stake-holder knowledge. All Natural Gas Chemical family fuel and/or any other compressed/liquefied gas fuelling/transfer system location(s) shall be fitted with a Seismic detecting system, and also in communication with dedicated Safety Instrumentation System and/or the process control system and/or cascading control system (PLC and or Relay Logic). The seismic measuring system shall include an arrangement to include a self-test/calibration feature to ensure proper, reliable operation. A redundant Seismic sensor(s)/system would be required under S.I.L.-3 protocols. Multiple sensor(s)/array of sensor(s) capable of measuring Seismic (omni-directional) activity strategically located around the facility, passively functioning, measuring and recording in real-time any/all Seismic activity and responding/relaying/communicating any/all Seismic event(s) that exceeds a predetermined set-point/level/threshold. Sensor(s) such as accelerometer(s)/tri-axial accelerometer(s)/piezo-electric accelerometer(s), optical and or ultrasonic sensor(s) and or IMU(s)(any/all IMU(s) RLG/FOG/HRG/CRG/PV/TFG/VSG/CVG/WGR/MEMS gyro/quantum gyro/Inertial measurement unit(s)/standing alone and/or combined to detect earth geophysical motion(s)/movement(s)/vibration(s), in any/all vector(s) coupled to processor(s) to compute motion, movement, and/or magnetic sensor(s)/electrodynamic sensor(s) to detect geophysical/earth/motion/vibrations/quake (omni-directional) monitoring. Other sensor(s) may also be ultrasonic and/or optical utilized to detect any earth motion(s), vibration(s), movement(s). All of the seismic sensor(s) may be used standing alone and or combined to provide a robust seismic measurement system, and may communicate signal(s) by wire/wirelessly by radio/light/and/or any combination of wire (coax/coax R.F/RFoF/ wirelessly by radio/light/OWC, for network communication(s)/signal(s) with central detection system/microcontroller/processor/locally and/or remote.

Meteorology:

Weather events may cause significant challenges to compressed/liquefied gas transfers/fuelling events. Many, if not all, systems are prone to weather since few are sheltered due to natural dissipation of gas. Therefore, weather be it hurricanes, typhoons, tropical depressions, tsunami's and/or cyclonic events, cause lightening, heavy rains, and high winds. Weather can also change, sometimes rather quickly, therefore a proper meteorology system will provide current conditions. This system may also be in communication with the S.I.S. to provide protection to all parties/personnel involved. This protection shall include automatic shut-down and or stop and or caution/warning/trouble alarm indicating future/current adverse weather conditions exist and to cease operations, and disconnecting and inerting until conditions improve, and may communicate signal(s) by wire/wirelessly by radio/light/and/or any combination of wire (coax/coax R.F/RFoF/wirelessly by radio/light/OWC, for network communication(s)/signal(s) with central detection system/microcontroller/processor/locally and/or remote.

Gas Detection System:

Natural Gas chemical family, propane, butane, ethane, Hydrogen, ammonia (anhydrous) and or any mixture(s) including derivatives (such as Hythane), or ethane rich for transport/later separation, may be detected utilizing optical, electro-chemical, magnetic, mass/spectrometer analyzer(s), optical sensor(s), Ramen Spectroscopy, analyzer(s), catalytic bead, and may be point (cell) sensor(s)/or optical point/open path sensor(s), all may be passive or induced flow for remote locations of detectors. Hydrocarbon/fuel gases have graphic signature/print, each gas/liquefied gas is identifiable by its "signature". Proper selection and hydrocarbon specific detection, and type and or location will enhance gas detection system(s) performance. Redundant (2) parallel systems with separate power supplied systems (SIS and CS) different type detectors will provide best over-all protection. All systems, warning(s), High alarm(s), High-high ALARM/TRIP will report to processor(s) for action, be it stopping and isolating fuelling/transfer(s) system/and/or releasing fuelling line(s) and/or releasing vehicle lock-out(s), also to locate source/complete system shut-down and vehicle release for hazardous safety; until proper atmospheric conditions are achieved/exist, and may communicate signal(s) by wire/wirelessly by radio/light/and/or any combination of wire (coax/coax R.F/RFoF/wirelessly by radio/light/OWC, for network communication(s)/signal(s) with central detection system/microcontroller/processor/locally and/or remote.

System Power;

The Safety Instrumented System (SIS) and the Control System (CS) shall be powered by Uninterruptible Power Supply system (UPS), the U.P.S. system(s) shall be fed from separate, reliable, Parallel power feeds. These power feeds may be from Grid power supply/be a combination of Grid and On-Site Power Generator, or if at sea, duel generators (both functioning prior, during, post transfer/fuelling event) with automatic cross tie(s)/transfer switching to provide reliable power for operations. The generators may be duel fuel, of which one of the fuels may be natural gas, propane, butane, ethane, hydrogen, ammonia, of which the supplier/receiver would have an abundant supply of. Duel/Parallel Isolation transformers with automatic transfer switches, shall produce clean even power distribution to the entire system. The inverter will balance and condition the incoming power to provide clean, even, PLC and instrumentation power, the U.P.S. battery system shall be capable of constantly maintaining full charge, and have sufficient power to provide uninterrupted power to SIS and CS system(s) and Human Interfaces during power outage to control all valve(s) and safely shut down and operate the inert and or purge systems safely. The system shall have instruments capable to monitor system voltage/frequency/amperage/KW for feeds, as well as UPS power system, and may communicate signal(s) by wire/wirelessly by radio/light/and/or any combination of wire (coax/coax R.F/RFoF/wirelessly by radio/light/OWC, for network communication(s)/signal(s) with central detection system/microcontroller/processor/locally and/or remote.

Variable Drives:

VD's are useful to control process(s)/speed/flow(s), and/or to conserve energy. Variable drives can be variable frequency drives or they may be triac variable drives. VD's can be operated manually/automatically. They can operate/modulate multiple different types of equipment. VD's controller(s) may communicate signal(s) by wire/wirelessly by radio/light/and/or any combination of wire (coax/coax R.F/RFoF/wirelessly by radio/light/OWC, for network communications/signal(s) with central detection system/microcontroller/processor/locally and or remotely.

Communications:

Local Network:

Communication between Instruments/transmitters/Intelligent Sensor(s)/Intelligent Actuator(s)/and the PLC and/or Processor(s) may be wireless by Radio or light; including hard wired systems, Fiber Optic, Fiber Optic "Cable", or Co-Axial transmissions. This also includes PLC to PLC communications/networks/interfacing/buss duct/Distributed Control Systems/Process Control Systems/Safety Instrumentation Systems/Emergency Shut-down systems/Emergency STOP system/Internet/Ethernet connections. To provide high quality information and data transmission for High Level Safety System(s) communications, may communicate signal(s) by wire/wirelessly by radio/light/and/or any combination of wire (coax/coax R.F/RFoF/wirelessly by radio/light/OWC, for network communications/signal(s) with central detection system/microcontroller/processor/locally or remote.

Networks:

Communication between network systems may be by radio/light, or hard wire. This includes all communications between fuelling/transfer vehicles and fueling transfer system(s). Communications may be optical, such as by fiber optic cables, or by OWC. It may also be radio via satellite and or local broadcast waves. Additionally, separate frequencies may be utilized for stable signal(s)/redundant safety. All communications between vehicle and fuel/transfer supplier shall be robust and redundant, with loss of communication signal sent to system, and possible shut down. A communication signal voting system, such as a two of three signals valid, system can be utilized to validate communication signals, and prevent unnecessary fueling/transfer communication error shut-downs.

Also, remote monitoring/reporting capabilities of fuelling/transfers of compressed/liquefied gas, via networked computers will allow live video streams, plus data monitoring via radio/light communications. All communications networks will also include option for remote control; operations may therefore be local or remote, and communicate/interact via voice commands to local fuelling/transfer operations.

Emergency Stop/Shutdown

The SIS Level SIL-3 processor will be a dedicated PLC/Processor, standing alone, but may also communicate with process control processor/processing (Relay logic cascading control system) via bus line/co-axial/fiber optic/F.O. cabling/hard wire/or wireless by radio or light. This optional communication will allow SIL-2 (process controls) to act independently and inform SIL-3 processor of status of SIL-2 controls, and vise versa. The SIS system Level SIL-3 will handle System EMERGENCY STOP/SHUT-DOWN for the following system events/Inputs; HIGH-HIGH Tank levels (both Supply and Receiving Tanks), LOW-LOW Level(s) both (supply and receiving tanks); HIGH-HIGH tank pressure(s) both (supply and receiving tanks); HIGH OXYGEN % percentage in transfer line, during fuelling/transfer; HIGH % L.E.L. percentage (lower explosive limit) Input, any High Percentage % leak detection/device(s) also; .low temp. in insulation or spill pan, point detection, open path, or other (optical, magnetic) leak detection; HIGH-HIGH Flow rate (over predetermined flow rate) with-in transfer line during fuelling/transfer (may be optical, ultrasonic, or magnetic flow meter). MOTION above a predetermined HIGH-HIGH Motion, standing alone or in combination-any sensor(s) to detect movement/motion detection (by any means such as optical, magnetic, sonar, radar, or ultrasonic/tether, chord, cable, to switch/microswitch, and/or laser/radar and/or multiple type/style/tri-axial accelerometer(s), accelerometer(s)/ Inertial Motion Unit(s),/RLG/FOG/HRG/CRG/PV/TFG/ VSG/CVG/WGR/mems gyro/quantum gyro, standing alone or coupled to processor(s) to compute motion, such as optical, magnetic, or ultrasonic to detect vehicle/vessel movement/motion. FIRE detection system, which may include the use of one or more sensor(s)(infrared and/or ultraviolet)(with select lens) alone or in combination, with one or more micro-switches can combine to automatically close the isolation valve(s) to prevent/disable fuelling/transfer and activate audible, visual, communication alerts/links such as fire alarms, pumps, and communication links, fire suppression equipment. Such sensor(s) as optical or magnetic can detect infrared, ultraviolet, heat, or a rate of rise in temperature, and/or smoke. Such devices can activate fire alarms and the like. Any fire/flame scanner or laser sensor(s), fusible/friable link(s) are with-in the scope of the present invention. Optical sensor(s) such as infrared and ultraviolet (with proper lens wavelength focus) individually and/or combined can sense fire and or heat and/or flicker frequency. This includes any means to detect fire hazards, Complex (HIGH Level reset) resets are typically required for system post event. The sensor(s) described may also be used in conjunction with standard fire detection systems, as a cascade (cascading control system. Any flame, fire, heat, smoke sensor(s)/systems may activate/deactivate automatic vehicle/vessel lock-out/release to liberate the vehicle/vessel for operator control. EXPLOSION DETECTION, a system of sensor(s) and/or receivers can detect loud and sudden noises/sound waves/pressure waves such as those created by a rapid expansion of molecules in a confined (possibly unconfined with O2) space/environment; or explosion(s). Any sensor(s) activation usually also activates the system to close isolation valve(s) and stop/mitigate fuelling/transfer flow; plus de-activate or activate any vehicle or automatic fueling line release that may exist, or release system(s) that exist, or release one initiated with a lock out. This explosion detection system may also activate/deactivate vehicle lock-out, to release vehicle/vessel for operator control/to relocate vehicle for safety purposes.

ISOLATION VALVES for Fueling/Transfer System(s):

Proper isolation valve design, lay-out, and installation is paramount to a safe fuelling/transfer system. There are many different styles, combinations, and applications for different types of Isolation valves. Many isolation valves are control valves, some are manual, some are control valves with manual override, some are self-regulating. There are many different control valve operators, such as air operated, spring operated, electric operated, temperature operated, hydraulic operated, and pressure operated, to name a few. These operators can be configured in many different ways, such as; air to open, air to close, fail to open, fail to closed, spring pressure to open, spring pressure to close, reversing contactors/relays to open/close; different hydraulic/pressure(s), multiple pressure regulators,(spring/weights) set points for self/pilot/internal D/P regulation//relief/lifting, to name a few.

There are also different valve port isolation and flow arrangements; for many different applications, such as 2-way, 3-way, and 4-way, and multi-port valves. These are utilized in system specific lay-outs; such as a recycle system, looping, diverting, and by-passing applications along with two, three, four, or multi-ports utilized for isolating/recirculating flow. A liquefied/compressed/gas fuelling/transfer system can benefit from certain valve design lay-outs. Such as utilization of a recycle/diverting/by-pass/multi-port/Isolation valve(s) in the supplier/receiver/vapor line outside the "interface/between" line. In one concept, avoiding line pressure surge by diverting the gas/Liquefied gas to one of several optional routes, while isolation to supplier/receiver is obtained. The diverted/by-passed/re-cycled/looped flow may be to a recycle line, a surge or knock-out drum, a gas combustion unit, or if there is an onboard evaporator, the flow may be diverted to evaporators' feed line for vehicle consumption. PRV=Relief/Reducing/Regulating: multiple names; different applications. Pressure relief valves (PRV's) and/or Pressure regulating valves (PRV's), may also be categorized as ISOLATION Valve(s), Pressure Relief valves can be operated by pressure, temperature, or both. For example, millions of homes in North America have hot water heaters (electric or gas), but they all have a Temperature/pressure relief isolation valve, keeping the water in the tank, and only "relieving" when another system malfunction has occurred, such as high water pressure/high water temperature/both; It is at this time that the "Relief Valve" activates and isolation ceases, and water is "relieved" onto floor/drain to save the water heater tank from possible rupture. The P.R.V. will passively protect the water tank/ house/business for long periods of time, only activating when excess temperature/pressure/both exist. Another type of P.R.V. is the pressure regulating valve, which is also an isolation valve that has many different applications. It can be controlled by system pressure using a "Pilot Valve" or "Internal Pressure Differential", or a P.L.C. program. These pressure regulating valves also act as isolation valves, as they are also one direction for flow. For example, if you have two (2) Isolating valves closed with a cryogenic liquid locked between them; the system shall require some form of "Pressure Relief/Regulation" due to naturally occurring thermal expansion between the (2) isolation valves. A Pressure Regulating Valve, with a pilot regulator/internal differential pressure (D.P.) regulating isolation valve can sense a higher than normal internal pressure (in this example the cryogenic material between (2) isolation valves), activate itself, thus breaking the isolation it normally provided and reduce the pressure created by naturally occurring thermal expansion, this Pressure regulating valve will continue to operate until pressure created by thermal expansion no longer exceeds its operating/activating pressure set point/ until system is back to normal operating conditions and the cryogenic media stops pressure build-up/other/all media is removed from the system.

Some valves can have the same initials, such as P.R.V. perform similar isolation duties, but have different activating mechanisms (springs/weights versus differential pressure/ pilot valve regulation) and different names (Pressure Relief Valve vs. Pressure Reducing Valve) plus various material/ internal composition(s).

Valve arrangements are also designed specifically for Safety Instrumented Systems. The above listed valves, in multiple valve design arrangements can achieve a SIL-3 isolation approval. These can be with twin (2) in-line 2-way valves; a 3-port valve in-line with a 2 port valve; a 4 port valve in-line with a 2 port valve; any multi-port in-line with a 2 way valve; (2)-twin 3 port valves in-line, a 3 port in-line with a 4 port valve, a 3 port valve in-line with a multi-port valve MPV; twin (2) in-line 4 port valves; and any multi-port inline with a 4 port valve; or multi-port valve in-line with a multi-port valve. There are many different Isolating/diverting valve/valving combination/arrangements to achieve desired safety result, but hydro-lock is possible, and depending on valve(s) arrangement, a "relief/regulating" (one or more) of multiple arrangements will be necessary. All of the listed Safety Instrumented System valves/2-way/3-way/4-way/multi-port valve(s)/reversing valves should have Independent Positive Position Feedback Positioners/P.P.F.B. The P.P.F.B., is an independent/separate signal to/from a PLC/ CS/processor(s)' valve(s)' output supplied signal, which relays back the indicated valve position. This SIS and CS system(s) also compare valve output signal(s) to the P.P.F.B. signal(s) to verify a matching value. This redundant verification of the signals, provides positive redundant valve position location/or not, thus reduces manageable risk to a greater acceptable level, thus increasing operational NGPATBA/O fuelling/transfer(s) safety by orders of magnitude. The positioner, sensor(s) may be of magnetic, optical, ultrasonic sensor(s), communicating back to S.I.S. and/ or C.S.

As one can understand, there are many multiple Isolation valve combinations for a NGPATBA/O fuelling/transfer/gas system of supplier side/receiver side. A line diagram will demonstrate a few arrangements, to show multiple connecting(s) of Isolation valve(s) plus orientations/designs, this diagram displays few of the hundred plus (100+) different combinations, although it is informative, this list DOES NOT convey/relay ALL Isolation valve(s)/combinations; therefore any/all isolation valve(s)/combinations, many NOT drawn nor depicted; which may be utilized to produce safe NGPATBA/O gas/liquefied gas transfers//fueling/valve (ing)/isolation(s), is included in this patent/application. These valving combinations are for supplier and receiver; and valving arrangements can be reversed (doubling combinations), plus it is to be understood these combinations are again doubled when a Vapor management system=supplier and receiver system(s) (tank specific) system arrangement(s)/system is utilized.

For example: . . . Some combinations; but, All can be reversed; And doubled for Vapor Management System(s).

2-way inline with 2-way with P.R.V (press. Relief) - - - 2-way inline with 2-way with P.R.V. (press. Reducing)

2-way inline with 2-way with Isolation Bleed valve - - - 2way inline with 2way with Iso.Bleed val.+Press. Red.

2-way inline with 3-way with/with-out P.R.V. (relief) - - - 2-way inline with 3-way with Isolation Bleed Valve 2-way in-line with 3-way With/with-out PRV (reducing) also may may-not have Isolation Bleed Valve 2-way inline with 4-way with PRV (relief) - - - 2-way in-line with 4-way with PRV (reducing)

2-way in-line with 4-way with/with-out PRV (reducing) also may/many not have Isolation Bleed Valve 2-way in-line with Multi-port valve with PRV (relief) - - - 2-way in-line with multiport with PRV (reducing)

2-way in-line with MPV with Isolation Bleed valve:—2-way in-line with MPV with Isolation Bleed+PRV (Red.)

3-way in-line with 2-way with PRV (relief) - - - 3-way in-line with 2-way with PRV (reducing)

3-way in-line with 2-way with Isolation Bleed valve— 3way in-line with 2-way with Iso. Bleed w/PRV (reducing)

3 way in-line with 3 way with PRV (relief) - - - 3 way in-line with 3-way with PRV (reducing)

3 way in-line with 3 way with Isolation Bleed Valve—3 way in-line with 3-way with Iso. Bleed w/PRV (reducing)

3-way inline with 4 way with PRV (relief) - - - 3 way in-line with 4 way with PRV (reducing)

3-way in-line with 4-way with Isolation Bleed Valve— 3-way in-line with 4 way with Iso.Bld.w/PRV (reducing)

3-way in-line with MPV with PRV (relief) - - - 3-way in-line with MPV with PRV (reducing)

3-way in-line with MPV with Isolation Bleed Valve - - - 3-way in-line with MPV with Iso.Bleed val.w/PRV (reducing)

4 way in-line with 4-way with PRV (relief) - - - 4-way in-line with 4-way with PRV (reducing)

4 way in-line with 4 way with Isolation Bleed Valve— 4-way in-line with 4-way with Iso.Bld.val w/PRV (reducing)

4 way in-line with MPV with PRV (relief) - - - 4 way in-line with MPV with PRV (reducing)

4 way in-line with MPV with Isolation Bleed Valve - - - 4 way in-line with MPV with Iso.Bld Val. w/PRV (reducing)

MPV in-line with MPV with PRV (relief) - - - MPV in-line with MPV with PRV (reducing)

MPV in-line with MPV with Isolation Bleed Valve - - - MPV in-line with MPV with Iso. Bleed Val. w/PRV (reducing)

As per depicted in FIG. 6-A, this example contains two (2) automated control valve(s) which are fail to closed position with positive position feedback, two (2) way valves, with a normally closed pressure relief valve #403 in-between. Valve #401(A) flow is from a supplier system/tank, a 2-way control valve; valve #402(B) flow is to receiver tank, also a 2-way control valve; and valve #403 is a pressure relief valve located between #401(A) and #402(B). During normal gas/liquefied gas fuelling/transfer operations, gas/liquefied gas flow from supplier tank passes thru open valve #401(A), and flows thru open #402(B) and continues flow path into receiver tank. If a system stop is initiated, it may close one; or both; designers choice (due to understanding that system stop may only be temporary) also if closing both upon system stop, one realized that hydro-lock between isolation valves will occur, and cryogenic products will gain heat and expand; causing Pressure relief valve #403 to open until pressure is decreased/normal pressure/flow is achieved/ until product is vacated from between valves #401 and #402. If an emergency stop is activated, both valves #401 and valve #402 will be closed/isolated for positive flow/transfer: "Stop/Mitigation". Redundant in-line flow control valves #401 and #402 will provide a S.I.L.-3 positive shut-off, valves control signals will be provided from independent sources, and verified by P.P.F.B. positioners (also independently sourced). If thermal expansion is occurring due to hydro-lock between the isolation valves #401(A) and #402

(B) the pressure relief valve #403 will activate, and relieve pressure until problem is corrected or all cryogenic material is expanded and pressure drops below Pressure relief valve #403 settings.

As per depicted in FIG. 6-B, this example contains two (2) automated control valve(s) which are fail to closed position with positive position feedback, two (2) way valves, with a normally closed pressure reducing/relief/regulating valve #413 in-between. Valve #411(A) flow is from a supplier system/tank, a 2-way control valve; valve #412(B) flow is to receiver tank, also a 2-way control valve; and valve #413 is a pressure regulating/reducing/relief valve located between #411(A) and #412(B). During normal gas/liquefied gas fuelling/transfer operations, gas/liquefied gas flow from supplier tank passes thru open valve #411(A), and flows thru open #412(B) and continues flow path into receiver tank. If a system stop is initiated, it may close one; or both; designers choice (due to understanding that system stop may only be temporary) also if closing both upon system stop, one realized that hydro-lock between isolation valves will occur, and cryogenic products will gain heat and expand; causing Pressure regulating/relief/reducing valve #413 to open until pressure is decreased/normal pressure/flow is achieved/until product is vacated from between valves #411 and #412. If an emergency stop is activated, both valves #411 and valve #412 will be closed/isolated for positive flow/transfer: "STOP//Mitigation". Redundant in-line flow control valves #411 and #412 will provide a S.I.L.-3 positive flow shut-off, valves control signals will be provided from independent sources, and verified by P.P.F.B. positioners (also independently sourced). If thermal expansion is occurring due to hydro-lock between the isolation valves #411(A) and #412(B) the pressure regulating/relief/reducing valve #413 will activate, and relieve pressure until problem is corrected or all cryogenic material is expanded and pressure drops below Pressure regulating/reducing/relief valve #413 settings.

As per depicted in FIG. 6-C, this example contains three (3) automated control valve(s); with positive position feedback, three (2) way control valves. Valve #421 and valve #422 are fail to close; Valve #423 is fail to open. Valve #421(A) flow is from a supplier system/tank, a 2-way control valve; valve #422(B) flow is to the receiver tank, also a (2) way control valve; and valve #423 is a (2)-way control valve for pressure regulating/bleed valve located between valves #421(A) and #422(B). During normal gas/liquefied gas fuelling/transfer operations, gas/liquefied gas flow from supplier tank passes thru open valve #421(A), and flows thru open #422(B) and continues flow path into receiver tank. If a system stop is initiated, it may close one; or both; designers choice (due to understanding that system stop may only be temporary) also if closing both upon system stop, one realized that hydro-lock between isolation valves will occur, and cryogenic products will gain heat and expand; causing Pressure regulating/bleed valve #423 to open until pressure is decreased/normal pressure/flow is achieved/until product is vacated from between valves #421(A) and #422(B). If an emergency stop is activated, both valves #421(A) and valve #422(B) will be closed/isolated for positive flow/transfer: "STOP//Mitigation". Redundant in-line flow control valves #421(A) and #422(B) will provide a S.I.L.-3 positive flow shut-off, valves control signals will be provided from independent sources, and verified by P.P.F.B. positioners (also independently sourced). If thermal expansion is occurring due to hydro-lock between the isolation valves #421(A) and #422(B) the pressure regulating/bleed valve #423 will activate, and relieve pressure until problem is corrected or all cryogenic material is expanded and pressure drops below Pressure regulating/bleed valve #423 settings. Use of valve #423 will require pressure sensor/transmitter(s) signal for pressure control operation.

As per depicted in FIG. 6-D, this example contains (3) automated control valve(s); with positive position feedback, three (2) way control valves. Valve #431(A) and valve #432(B) are fail to close; Valve #433 is fail to open, and valve #434 is pressure regulating/reducing valve in-line after valve #433. Valve #431(A) flow is from a supplier system/tank, a 2-way control valve; valve #432(B) flow is to the receiver tank, also a (2) way control valve; and valve #433 is a (2)-way control valve for pressure regulating/bleed valve located between valves #431(A) and #432(B), plus a pilot regulated pressure reducing/regulated valve #434. During normal gas/liquefied gas fuelling/transfer operations, gas/liquefied gas flow from supplier tank passes thru open valve #431(A), and flows thru open #432(B) and continues flow path into receiver tank. If a system stop is initiated, it may close one; or both; designers choice (due to understanding that system stop may only be temporary) also if closing both upon system stop, one realized that hydro-lock between isolation valves will occur, and cryogenic products will gain heat and expand; causing Pressure regulating/bleed valve #433 and pressure regulating valve #434 to open until pressure is decreased/normal pressure/flow is achieved/until product is vacated from between valves #431(A) and #432(B). If an emergency stop is activated, both valves #431(A) and valve #432(B) will be closed/isolated for positive flow/transfer: "STOP//Mitigation". Redundant in-line flow control valves #431(A) and #432(B) will provide a S.I.L.-3 positive flow shut-off, valves control signals will be provided from independent sources, and verified by P.P.F.B. positioners (also independently sourced). If thermal expansion is occurring due to hydro-lock between the isolation valves #431(A) and #432(B) the pressure regulating/bleed valve #433 and #434 will activate, and relieve pressure until problem is corrected or all cryogenic material is expanded and pressure drops below Pressure regulating/bleed valve #433/#434 settings. Use of valve #433 will require pressure sensor/transmitter(s) signal for pressure control operation.

As per depicted in FIG. 6-E, this example contains (2) automated control valve(s); with positive position feedback, one (2) way control valve and one (3) way control valve. Valve #441(A) and valve #442(B) are fail to close (in-line). Valve #442(B) is fail to open to recycle line. Valve #441(A) flow is from a supplier system/tank, a 2-way control valve; valve #442(B) flow is to the receiver tank or to recycle line, is a (3) way control valve. During normal gas/liquefied gas fuelling/transfer operations, gas/liquefied gas flow from supplier tank passes thru open valve #441(A), and flows thru open #442(B) and continues flow path into receiver tank. If a system stop is initiated, it may close valve #441(A); and/divert/recycle valve #442(B), relieving blocked-in pressure; designer's choice (due to understanding that system stop may only be temporary) also if isolating both upon system stop, one realized that hydro-lock between isolation valves will occur, and cryogenic products will gain heat and expand; causing Pressure build-up between valves #441(A) and #442(B). If an emergency stop is activated, both valves #441(A) and valve #442(B) will be closed/isolated for positive flow/transfer: "STOP//Mitigation/Recycle". Redundant in-line flow control valves #441(A) and #442(B) will provide a S.I.L.-3 positive flow/transfer shut-off, valves control signals will be provided from independent sources, and verified by P.P.F.B. positioners (also independently sourced). If thermal expansion is occurring due to hydro-lock between the isolation valves #441(A) and #442(B) the pressure divert/recycle valve #442 will activate, and relieve pressure until problem is corrected, or all cryogenic material is expanded and pressure drops below recycle line pressure.

As per depicted in FIG. 6-F, this example contains (2) automated control valve(s); with positive position feedback, Two (2) way control valves and one (3) way control valve. Valve #445(A) and valve #446(B) are fail to close (in-line); Valve #447 is fail to open to recycle line. Valve #445(A) flow is from a supplier system/tank, a 2-way control valve; valve #446(B) flow is to the receiver tank or to recycle line, is a (2) way control valve. During normal gas/liquefied gas fuelling/transfer operations, gas/liquefied gas flow from supplier tank passes thru open valve #445(A), and flows thru open #446(B), and #447 and continues flow path into receiver tank. If a system stop is initiated, it may close valve #445(A) and 446(B); and/divert/recycle valve #447, relieving blocked-in pressure; designer's choice (due to understanding that system stop may only be temporary) also if isolating both upon system stop, one realized that hydro-lock between isolation valves will occur, and cryogenic products will gain heat and expand; causing Pressure build-up between valves #445(A) and #446(B). If an emergency stop is activated, both valves #445(A) and valve #446(B) will be closed/isolated for positive flow/transfer: "STOP//Mitigation/Recycle". Redundant in-line flow control valves #445(A) and #446(B) will provide a S.I.L.-3 positive flow/transfer shut-off, valves control signals will be provided from independent sources, and verified by P.P.F.B. positioners (also independently sourced). If thermal expansion is occurring due to hydro-lock between the isolation valves #445(A) and #446(B) the pressure divert/recycle valve #447 will activate, and relieve pressure until problem is corrected, or all cryogenic material is expanded and pressure drops below recycle line pressure.

As per depicted in FIG. 7-A, this example contains (2) automated control valve(s); with positive position feedback, one (2) way control valve and one (3) way control valve. Valve #451(A) and valve #452(B) are fail to close (in-line); Valve #451(A) is fail to open to recycle line. Valve #453 is pressure relief valve between valves #451 and #452. Valve #451(A) flow is from a supplier system/tank, is a 3-way control valve, or to recycle line; valve #452(B) flow is to the receiver tank, is a (2) way control valve. During normal gas/liquefied gas fuelling/transfer operations, gas/liquefied gas flow from supplier tank passes thru open valve #451(A), and flows thru open #452(B) and continues flow path into receiver tank. If a system stop is initiated, it may close valve #452(B); and recycle valve #451(A), recycling in-line product/pressure; designers choice (due to understanding that system stop may only be temporary) also if isolating both vales close upon system stop, one realizes that hydro-lock between isolation valves will occur, and cryogenic products will gain heat and expand; causing Pressure build-up between valves #451(A) and #452(B). If an emergency stop is activated, both valves #451(A) and valve #452(B) will be closed/isolated for positive flow/transfer: "STOP/Mitigation/Recycle". Redundant in-line flow control valves #451 (A) and #452(B) will provide a S.I.L.-3 positive flow/transfer shut-off, valves control signals will be provided from independent sources, and verified by P.P.F.B. positioners (also independently sourced). If thermal expansion is occurring due to hydro-lock between the isolation valves #451(A) and #452(B) the pressure relief valve #453 will activate, and relieve pressure until problem is corrected, or all cryogenic material is expanded and pressure drops below relief valve pressure set-point.

As per depicted in FIG. 7-B, this example contains (2) automated control valve(s); with positive position feedback, one (2) way control valve and one (3) way control valve. Valve #461(A) and valve #462(B) are fail to close (in-line); Valve #461(A) is fail to open to recycle line. Valve #461(A) flow is from a supplier system/tank, is a 3-way control valve, or to recycle line; valve #462(B) flow is to the receiver tank, is a (2) way control valve. During normal gas/liquefied gas fuelling/transfer operations, gas/liquefied gas flow from supplier tank passes thru open valve #461(A), and flows thru open #462(B) and continues flow path into receiver tank. If a system stop is initiated, it may close valve #462(B); and recycle valve #461(A), recycling in-line product/pressure; designer's choice (due to understanding that system stop may only be temporary) also if isolating both upon system stop, one realizes that hydro-lock between isolation valves will occur, and cryogenic products will gain heat and expand; causing Pressure build-up between valves #461(A) and #462(B). If an emergency stop is activated, both valves #461(A) and valve #462(B) will be closed/isolated for positive flow/transfer: "STOP/Mitigation/Recycle". Redundant in-line flow control valves #461(A) and #462(B) will provide a S.I.L.-3 positive flow/transfer shut-off, valves control signals will be provided from independent sources, and verified by P.P.F.B. positioners (also independently sourced). If thermal expansion is occurring due to hydro-lock between the isolation valves #461(A) and #462(B) the pressure relief may be provide thru valve #461, but will require additional pressure sensor(s)/transmitter(s) to activate, and relieve pressure until problem is corrected, or all cryogenic material is expanded and pressure drops below relief valve pressure set-point.

As per depicted in FIG. 7-C, this example contains (2) automated control valve(s); with positive position feedback, one (2) way control valve and one (3) way control valve. Valve #471(A) and valve #472(B) are fail to close (in-line); Valve #471(A) is fail to open to recycle line. Valve #473 is pressure regulating/relief valve between valves #471 and #472. Valve #471(A) flow is from a supplier system/tank, is a 3-way control valve, or to recycle line; valve #472(B) flow is to the receiver tank, is a (2) way control valve. During normal gas/liquefied gas fuelling/transfer operations, gas/liquefied gas flow from supplier tank passes thru open valve #471(A), and flows thru open #472(B) and continues flow path into receiver tank. If a system stop is initiated, it may close valve #472(B); and recycle valve #471(A), recycling in-line product/pressure; designers choice (due to understanding that system stop may only be temporary) also if isolating both valves close upon system stop, one realizes that hydro-lock between isolation valves will occur, and cryogenic products will gain heat and expand; causing Pressure build-up between valves #471(A) and #472(B). If an emergency stop is activated, both valves #471(A) and valve #472(B) will be closed/isolated for positive flow/transfer: "STOP/Mitigation/Recycle". Redundant in-line flow control valves #471(A) and #472(B) will provide a S.I.L.-3 positive flow/transfer shut-off, valves control signals will be provided from independent sources, and verified by P.P.F.B. positioners (also independently sourced). If thermal expansion is occurring due to hydro-lock between the isolation valves #471(A) and #472(B) the pressure regulating/relief valve #473 will activate, and relieve pressure until problem is corrected, or all cryogenic material is expanded and pressure drops below regulating/relief valve pressure set-point.

As per depicted in FIG. 7-D, this example contains (3) automated control valve(s); with positive position feedback, two (2) way control valves and one (1) three way control valve. Valve #481(A) and valve #482(B) are fail to close/recycle; Valve #483 is fail to open, and valve #484 is pressure regulating/reducing valve in-line after valve #483. Valve #481(A) flow is from a supplier system/tank, a 3-way control valve; valve #482(B) flow is to the receiver tank, a (2) way control valve; and valve #483 is a (2)-way control valve for pressure regulating/bleed valve located between valves #431(A) and #432(B). During normal gas/liquefied gas fuelling/transfer operations, gas/liquefied gas flow from supplier tank passes thru open valve #481(A), and flows thru open #482(B) and continues flow path into receiver tank. If a system stop is initiated, it may close one; or both; designers choice (due to understanding that system stop may only be temporary) also if closing both upon system stop, one realized that hydro-lock between isolation valves will occur, and cryogenic products will gain heat and expand; causing Pressure regulating/bleed valve #483 and pressure regulating valve #484 to open until pressure is decreased/normal pressure/flow is achieved/until product is vacated from between valves #481(A) and #482(B). If an emergency stop is activated, both valves #481(A) and valve #482(B) will be recycle/closed/isolated for positive flow/transfer: "STOP/Mitigation". Redundant in-line flow control valves #481(A) and #482(B) will provide a S.I.L.-3 positive flow shut-off, valves control signals will be provided from independent sources, and verified by P.P.F.B. positioners (also independently sourced). If thermal expansion is occurring due to hydro-lock between the isolation valves #481(A) and #482(B) the pressure regulating/bleed valve #483 and #484 will activate, and relieve pressure until problem is corrected or all cryogenic material is expanded and pressure drops below Pressure regulating/bleed valve #483 settings. Use of valve #483 will require pressure sensor/transmitter(s) signal for pressure control operation.

As per depicted in FIG. 7-E, this example contains three (3) automated control valve(s); with positive position feedback, two (2) way control valves and one (1) thr-e way valve. Valve #491(A) and valve #492(B) are fail to close/recycle; Bleed Valve #493 is fail to open. Valve #491(A) flow is from a supplier system/tank, a 3-way control valve; valve #492(B) flow is to the receiver tank, a (2) way control valve; and valve #493 is a (2)-way control valve for pressure regulating/bleed valve located between valves #491(A) and #492(B). During normal gas/liquefied gas fuelling/transfer operations, gas/liquefied gas flow from supplier tank passes thru open valve #491(A), and flows thru open #492(B) and continues flow path into receiver tank. If a system stop is initiated, it may close one; or both; designers choice (due to understanding that system stop may only be temporary) also if closing both upon system stop, one realized that hydro-lock between isolation valves will occur, and cryogenic products will gain heat and expand; causing Pressure regulating/bleed valve #493 to open until pressure is decreased/normal pressure/flow is achieved/until product is vacated from between valves #491(A) and #492(B). If an emergency stop is activated, both valves #491(A) and valve #492(B) will be closed/isolated for positive flow/transfer: "STOP//Mitigation". Redundant in-line flow control valves #491(A) and #492(B) will provide a S.I.L.-3 positive flow shut-off, valves control signals will be provided from independent sources, and verified by P.P.F.B. positioners (also independently sourced). If thermal expansion is occurring due to hydro-lock between the isolation valves #491(A) and #492(B) the pressure regulating/bleed valve #493 will activate, and relieve pressure until problem is corrected or all cryogenic material is expanded and pressure drops below Pressure regulating/bleed valve #493 settings. Use of valve #493 will require pressure sensor/transmitter(s) signal for pressure control operation.

As per depicted in FIG. 7-F, this example contains (2) automated control valve(s); with positive position feedback, two (3) way control valves. Valve #501(A) and valve #502(B) are fail to close (in-line); Valve #501(A) is fail to open to recycle line. Valve #502 fail open to recycle line. Valve #501(A) flow is from a supplier system/tank thru to receiver tank, is a 3-way control valve, or to recycle line; valve #502(B) flow is to the receiver tank, is a (3) way control valve, which also fails to recycle line. During normal gas/liquefied gas fuelling/transfer operations, gas/liquefied gas flow from supplier tank passes thru open valve #501(A), and flows thru open #502(B) and continues flow path into receiver tank. If a system stop is initiated, it may close in-line flow valve #502(B); and recycle valve #501(A), recycling in-line product/pressure; designer's choice (due to understanding that system stop may only be temporary) also if isolating both upon system stop, one realizes that hydro-lock between isolation valves will be relieved by 3-way valve #502(B) into recycle line. If an emergency stop is activated, both valves #501(A) and valve #502(B) will be closed/recycled/isolated for positive flow/transfer: "STOP/Mitigation/Recycle". Redundant in-line flow control valves #501(A) and #502(B) will provide a S.I.L.-3 positive flow/transfer system shut-off, valves control signals will be provided from independent sources, and verified by P.P.F.B. positioners (also independently sourced).

As depicted in FIG. 7-G, this example contains (2) automated control valve(s); with positive position feedback, one (1) two (2) way control valve #505 and a Multi-port (4) way (or more)#506 control valve. Valves are fail to close to inline flow/multi-port will fail to recycle/flare/GCU line(s). Valve #505 flow is from supplier tank(s) thru valve #506 to receiver side or recycle/GCU line. During normal gas/liquefied gas fuelling/transfer operations, gas/liquefied gas flow from supplier tank passes thru valve open #505"A" and flows thru valve #506"B" and continues flow path into receiver tank. If a system stop is initiated, it may close in-line flow valve #505(A); and recycle valve #506(B), recycling the in-line product or send to GCU; designer's choice due to local regulations & understanding that stop may only be temporary) also if isolating both valves upon system stop, one realizes that hydro-lock between isolation valves may be relieved to recycle/GCU line by valve #506. If an emergency stop is activated, both valves #505"A" and 506"B" will be closed/recycled/isolated for positive low/transfer"STOP/mitigation/Recycle/GCU". Redundant inline flow control valves #505(A) and #506(B) will provide a S.I.L-3 positive flow/transfer shut-off to supply and receiving tanks, valve control signals will be provided from independent sources, and verified by P.P.F.B. positioners (also independently sourced.).

As per depicted in FIG. 7-H, this example contains (2) automated control valve(s); with positive position feedback, one (3) way control valve, and one (1) 4-way/(Multi-port valve) control valve. Valve #511(A) and valve #512(B) are fail to close (in-line); Valve #511(A) is fail to open to recycle line. Valve #512 fail open to recycle line. Valve #511(A) flow is from a supplier system/tank thru to receiver tank, or to recycle line, is a 3-way control valve; valve #512(B) flow is to the receiver tank, or flow to recycle line; is a (4) way control valve, which also fails to recycle line. During normal gas/liquefied gas fuelling/transfer operations, gas/liquefied gas flow from supplier tank passes thru open valve #511(A), and flows thru open #512(B) and continues flow path into receiver tank. If a system stop is initiated, it may close in-line flow valve #512(B); and open to recycle/flare line. Valve #511(A) will recycle in-line product/pressure; designe'rs choice, pressure will be relieved by 3-way valve #512(B) into recycle line. If an emergency stop is activated, both valves #511(A) and valve #512(B) will be closed/recycled/isolated for positive flow/transfer: "STOP/Mitigation/Recycle". Redundant in-line flow control valves #511(A) and #512(B) will provide a S.I.L.-3 positive flow/transfer shut-off to receiving tank; valves control signals will be provided from independent sources, and verified by P.P.F.B. positioners (also independently sourced).

As per depicted in FIG. 8-A, this example has both sides (fuelling/transfer system and a vehicle/barge being fuelled/transferred/filled. This example has two (2) automatic control valves on the vehicle and two (2) automatic control valves on the fuelling/transfer system. All (4) of the valves have positive position feed back positioners, for safety. On the fuelling/transfer system one (1) control valve #520(A) is a two way normally isolated N.C. isolation valve and the other valve is a three (3) way #521(B) isolation/Normally diverting valve. On the receiver vehicle/barge side has one three (3) way isolation/Normally diverting valve #522(A), and one two (2) way N.C. isolation valve #523(B). The gas/liquefied gas fuelling/transfer fuel path is from supply tank thru Valve #520(A), then thru valve #521(B), continuing thru both fuelling/transfer system and vehicles' fuelling/transfer line quick release system connections with internal valves and sensors/generally thru flexible hoses, then flows thru Valve #522(A), continuing thru Valve #523(B) and into receiver vehicle/barge fuel tank, safely monitored and stored for future consumption. If a system stop is initiated, the following sequence shall occur; Audible/visual alarms activate; Pump(s)/Compressor(s) will stop; Isolation Valve #520(A) Closes, Valve #521(B) Isolates valve port to vehicle and divert port is opened to recycle line for relief between #520(A) and #521(B) and Isolation valve #523(B) Closes, and Valve #522(A) Isolates valve port from supplier to vehicle, and diverter port is opened to recycle line for relief between valve #523(B) and valve #522(A). A process stop may be an abnormal temperature, pressure, level, flow, motion, gas detection (leak) or communications failure, which upon correction, system may be reset, valves line-up and system(s)(pump(s)/compressor(s) re-started. In the case of an emergency, such as vehicle/seismic High-High motion event, above a second predetermined motion limit set-point, the same Stop/Mitigation/safety Isolations (valves) actions listed for FIG. 8-A will occur, plus the automatic fuelling/transfer line release will be activated/de-activated and any all vehicle lock-outs will be released to liberate the vehicle, thus allowing operator control and/or ability to maneuver vehicle to safety. This safety feature allows for vehicle(s) to gain control in the event of High-High motion/movements of the fueling//transfer system (which may be onboard a vehicle or land based) and or vehicle/barge control in the event of rough seas. FIG. 8-A; Stop/mitigation/safety Isolation valves will also be Isolated if a fire and/or explosion sensor(s) is activated (any/all abnormal acoustic/pressure/sound waves, plus fire/flame/heat/arc/spark//optical fire detection/sensing) will also relay fire alarms/communication links/fire suppression systems; along with fuelling/transfer line automatic release system, plus release of any/all vehicle lock-out systems, this allows for vehicle operator control and/or ability to maneuver vehicle to safety (in event of fire/explosion to move away from other fuelling/transfer vehicle or away from fuelling source/fuelling/transfer system/tank(s) These redundant safety system(s) with intelligent sensor(s) along with A.I. processes will enhance safety by orders of magnitude. These safety features will save lives and assets by quick, safe reactions to negative inputs, in the event it is called to action.

FIG. 8-B; Fuelling/Transfer supply line system(s) are the same as FIG. 8-A, but, FIG. 8-B also includes the optional** Vapor return Line. Many gas/liquefied gas tank systems require vapor management; of which there are three (3) effective forms of vapor management (vapor return line to supply tank/tank re-liquefaction system/tank internally recirculated spray pressure reducing system(s)); this drawing FIG. 8-B, depicts a vapor return line which is one type for gas/liquefied gas vapor management; (return of displaced vapor from filling/receiving tank back to the supply tank). The valve arrangement may be same or similar to that of gas/liquefied gas fuelling/transfer supply line, and also has duplicated safety features/Isolations/mitigations; any/all features listed in FIG. 8-A are also included in/on Vapor Return Line of FIG. 8-B.

In FIG. 8-B; As per depicted in FIG. 8-B, this example has both sides (fuelling/transfer system and a vehicle/barge being fuelled/transferred/filled. This example has two (2) automatic control valves on the vehicle and two (2) automatic control valves on the fuelling/transfer system. All (4) of the valves have positive position feed back positioners, for safety. On the fuelling/transfer system one (1) control valve #520(A) is a two way N.C. isolation valve and the other valve is a three (3) way #521(B) isolation/Normally diverting valve. On the receiver vehicle/barge side has one three (3) way isolation/Normally diverting valve #522(A), and one two (2) way N.C. isolation valve #523(B). The gas/liquefied gas fuelling/transfer fuel path is from supply tank thru Valve #520(A), then thru valve #521(B), continuing thru both fuelling/transfer system and vehicles' fuelling/transfer line quick release system connections with internal valves and sensors/generally thru flexible hoses, then flows thru Valve #522(A), continuing thru Valve #523(B) and into receiver vehicle/barge fuel tank, safely monitored and stored for future consumption. If a system stop is initiated, the following sequence shall occur; Audible/visual alarms activate; Pump(s)/Compressor(s) will stop; Isolation Valve #520(A) Closes, Valve #521(B) Isolates valve port to vehicle and divert port is opened to recycle line for relief between #520(A) and #521(B) and Isolation valve #523(B) Closes, and Valve #522(A) Isolates valve port from supplier to vehicle, and diverter port is opened to recycle line for relief between valve #523(B) and valve #522(A). A process stop may be an abnormal temperature, pressure, level, flow, motion, gas detection (leak) or communications failure, which upon correction, system may be reset, valves line-up and system(s)(pump(s)/compressor(s) re-started. In the case of an emergency, such as vehicle/seismic High-High motion event, above a second predetermined motion limit set-point, the same Stop/Mitigation/safety Isolations (valves) actions listed for FIG. 8-A will occur, plus the automatic fuelling/transfer line release will be activated/de-activated and any all vehicle lock-outs will be released to liberate the vehicle, thus allowing operator control and/or ability to maneuver vehicle to safety. This safety feature allows for vehicle(s) to gain control in the event of High-High motion/movements of the fueling//transfer system (which may be onboard a vehicle or land based) and or vehicle/barge control in the event of rough seas. FIG. 8-B; Stop/mitigation/safety Isolation valves will also be Isolated if a fire and/or explosion sensor(s) is activated (any/all abnormal acoustic/pressure/sound waves, plus fire/flame/heat/arc/spark//optical fire detection/sensing) will also relay fire alarms/communication links/fire suppression systems; along with fuelling/transfer line automatic release system, plus release of any/all vehicle lock-out systems, this allows for vehicle operator control and/or ability to maneuver vehicle to safety (in event of fire/explosion to move away from other fuelling/transfer vehicle or away from fuelling source/fuelling/transfer system/tank(s). These redundant safety system(s) with intelligent sensor(s) along with A.I. processes will enhance safety by orders of magnitude. These safety features will save lives and assets by quick, safe reactions to negative inputs, in the event it is called to action.

As per depicted in FIG. 8-B, this example has both sides (fuelling/transfer system and a vehicle/barge being fuelled/transferred/filled. This example has two (2) automatic control valves on the vehicle and three (3) automatic control valves on the vapor line of the fuelling/transfer system. All (4) of the two way control valves have positive position feed back positioners, for safety. On the vapor line of the fuelling/transfer system one (1) control valve #524(A) is a two way N.C. isolation valve and the other valve is also two way (2) control #526(B) isolation/Normally closed valve, and the third is a two (2) way automatic pilot pressure reliving valve, thus if high pressure exist between valves #524 and valve #526, it will be relieved by valve #525. On the receiver vehicle/barge side has one two (2) way isolation/Normally closed valve #527(A), and one two (2) way N.C. isolation valve #528(B). The gas/liquefied gas vapor return line fuel path is from receivers' tank thru Valve #528(A), then thru valve #527(B), continuing thru both fuelling/transfer system and vehicles' fuelling/transfer line quick release system connections with internal valves and sensors/generally thru flexible hoses, then flows thru Valve #526(B), continuing thru Valve #524(A) and into receiver/tank/vehicle/barge fuel tank, safely monitored and stored, for future process/consumption. If a system stop is initiated, the following sequence shall occur; Audible/visual alarms activate; Pump(s)/Compressor(s) will stop; Isolation Valve #524(A) Closes, Valve #526(B) closes/Isolates valve port to vehicle, between #524(A) and #526(B) is held steady by P.R.V. #525. Isolation valve #527(B) Closes, and Valve #528(A) Isolates/closes valve port from supplier to vehicle, pressure relief between valve #527(B) and valve #528(A) will keep steady pressure. A process stop may be an abnormal temperature, pressure, level, flow, motion, or communications failure, which upon correction, system may be reset, valves line-up and system(s)(pump(s)/compressor(s) re-started. In the case of an emergency, such as vehicle/seismic High-High motion event, above a second predetermined motion limit set-point, the same Stop/Mitigation/safety Isolations (valves) actions listed for FIG. 8-B will occur, plus the automatic fuelling/transfer line release will be activated/de-activated and any all vehicle lock-outs will be released to liberate the vehicle, thus allowing operator control and/or ability to maneuver vehicle to safety. This safety feature allows for vehicle(s) to gain control in the event of High-High motion/movements of the fueling/transfer system (which may be onboard a vehicle or land based) and or vehicle/barge control in the event of rough seas. FIG. 8-B; Stop/mitigation/safety Isolation valves will also be Isolated if a fire and/or explosion sensor(s) is activated (any/all abnormal acoustic/pressure/sound waves, plus fire/flame/heat//arc/spark/optical fire detection/sensing) will also relay fire alarms/communication links/fire suppression systems; along with fuelling/transfer line automatic release system, plus release of any/all vehicle lock-out systems, this allows for vehicle operator control and/or ability to maneuver vehicle to safety (in event of fire/explosion to move away from other fuelling/transfer vehicle or away from fuelling source/fuelling//transfer system/tank(s). These redundant safety system(s) with intelligent sensor(s) along with A.I. processes will enhance safety by orders of magnitude. These safety features will save lives and assets by quick, safe reactions to negative inputs, in the event it is called to action.

FIGS. 1 thru 5 (including A,B,C) of each depicts many different inputs/outputs, power supplies, UPS systems, communication(s) systems. Many device(s)/system(s) overlap, and some device(s)/systems are displayed/omitted for clarity, and others are system specific/optional (ie. **Vapor return line; certain tanks)

In FIG. 1-A; the fuelling/transfer supply side Controls Processing (CP) System and Safety Instrumented System (S.I.S.) are depicted/with major system(s)/devices; power and some instrumentation was intentionally omitted for drawing clarity, but is depicted/listed in the I/O and covered in written details, such as power, valve(s)/placements, temperature/pressure/level/flow xmtr's locations, necessary for system functions. The main feature is that of two (2) redundant processors, backed by redundant power feeds/supplies, utilizing redundant safety controller(s)/fire/explosion monitoring/redundant Isolation valve(s)/redundant communication(s)(both methods/systems-voting 2 of 3 necessary for maintaining established comm); which may utilize communication by wire/radio/light/all utilizing different methods/frequencies simultaneously for robust redundancy. The redundancy featured will achieve Safety Instrumented Level #3 (SIL3), which shall result in premium safety ratings by underwriters, governments, regulators, investors, host communities.

In FIG. 1-B; the fuelling/transfer receiving side Controls Processing (CP) System and Safety Instrumented System (S.I.S.) are depicted/with major system(s)/devices; power and some instrumentation was intentionally omitted for drawing clarity, but is depicted/listed in the I/O and covered in written details, such as power, valve(s)/placements, temperature/pressure/level/flow xmtr's locations, necessary for system functions. The main feature is that of two (2) redundant processors, backed by redundant power feeds/supplies, utilizing redundant safety controller(s)/fire/explosion monitoring/redundant Isolation valve(s)/redundant communication(s)(both methods/systems-voting 2 of 3 necessary for maintaining established comm); which may utilize communication by wire/radio/light/all utilizing different methods/frequencies simultaneously for robust redundancy. The redundancy featured will achieve Safety Instrumented Level #3 (SIL3), which shall result in premium safety ratings by underwriters, governments, regulators, investors, host communities.

FIGS. 2-A, B,C, and FIGS. 5-A,B,C contain flow path for I/O of the Process Control System. Although virtually identical to S.I.S., some process control setpoints may be slightly lower than that of the S.I.S; this will allow the Process Control System to be triggered/activate/act prior to the S.I.S. system, and if Process Control System does not act (for what ever reason) the S.I.S. system will be redundantly available to act/activate for back up to the Process Control System.

FIGS. 3-A,B,C, and FIGS. 4A,B,C, contain flow path for I.O of the Safety Instrumented System. This system is designed for robust, redundant back up to the Process Control System (P.C.) as stated, some S.I.S. setpoints may be set slightly higher than P.C. system, so that S.I.S. may react when first setpoint limits are exceeded. This system will Idly monitor the entire gas/liquefied gas fuelling/transfer system, and reliably act when required. Safe fuelling/transfers of gas/liquefied gas's is vital for success of cleans fuels. Humans and assets will be preserved, with utilization of redundant back up safety systems.

Also, in any/all examples, the depiction indicates a "Re-cycle" line; this can be interpreted in multiple ways; for this invention all interpretations are as follows; it may be a true re-cycle line (which re-cycles the product; to head of plant or to a re-liquefaction unit; or back to tank); also in this invention, it may also include being sent to a gas combustion unit (GCU), or thermal oxidizer (T.O.), or knock out (K.O.) drum, or flare; which ever is allowed/regulated by local code/standards/practices.

Proper valve design, specification, material(s), class, operator/operation(s), and location(s) will achieve High Level Safety Instrumented System(s), which will provide safe reliable operations with operational Control/savings and preferential Insurance ratings.

As one can realize, there are many multiple various arrangements of valves (of multiple designs/operation(s)) for both supplier and or receiver side and or gas/liquefied gas and or vapor line(s) of vast multiple configurations, especially considering the multi-port valves/isolation(s), possible combinations, all valve(s)/port(s)/design(s)/lay-out(s)/combination(s)/configurations are to be considered included in this patent, a small limited number of various design examples are provided, hundreds of combinations exist, modifying a system by simple valve re-arrangement, shall not be construed/interpreted as a different/improved design, for all designs, types, transfer systems, materials have been included with-in this patent application.

A robust designed control system, combined with properly specified and installed Isolation valve(s) will achieve a SIL-3 (Safety Integral Level) level, which will increase safety by orders of magnitude. The Natural Gas chemical family, NGPATBA/O and all compressed gas/liquefied fuels, will achieve greater risk management levels, and increased operational safety utilizing "Redundant Isolation" valve design(s) for fueling/transfers.

This invention includes utilization of Multiple Redundant Isolation valve(s)/layout(s), plus a SIS controls system(s) and CS system with operational design and SIL-3 configuration. Such that the valves are designed, specified, function, and controlled independently, with proper dedicated inputs/outputs/and include valve positioners for positive position feedback, an independent signal to verify the position of each valve independently. These safety valves will ensure safe, proper transfer/fuelling isolation when controlled activation is required. These valves may communicate via hard wire, Fiber optic, Fiber optic cable, wireless by radio or light, or co-axial cable, or any combination of wired/wirelessly by radio/loght. Safest system can utilize multiple forms of communication, for redundant signal transfer.

Tanks—(Pressurized/Atmospheric):

Vapor management systems (return of vapor to supplier) are fuelling/transfer (tank) system specific; Type (C) tanks may utilize internally recirculating spray "bar/ball/header" for vapor (pressure) management; meaning not all systems require vapor management, (return of vapor to supplier) but since other "atmospheric" type tank(s)/systems are present and "in-Use", one must include vapor management into the SIS/CS system design. The fuelling/transfer system that utilizes vapor management shall also require double isolation and/or isolation relief/regulating valve design on the vapor line to be SIL-3 approved. The double isolation and/or relief/regulation isolation valve design is functionally similar to the compressed gas/liquefied gas supply, although, certain vehicle/vessel storage containment systems require vapor pressure displacement, and many designs call for vapor to be returned to the supplier, via a vapor management system,/"other" type storage containment, internally manage vapor/pressure. The SIS/CS systems of this invention provides for proper safe control of the optional vapor management system(s), a redundant safety system for utilization, depending on their system specific application requirements.

Pressurized Type"C" tanks, may contain an internally recirculating method to mix/homogenize tank contents, keeping separation of NGPATBA products. This internally recirculation, shall be divided into parallel (2) systems with separate pumps, spray bars/balls/headers; plus separate independent power feed/sources, so as to ensure redundant mixing capabilities, so if one recirculation system has problems, the other is capable of recirculating. This redundant safety feature will ensure fuel separation is prevented.

Vacuum Tank(s) Jacketing/Piping Insulation Monitoring System:

Vacuum tank(s) jacketing/piping insulation is the most efficient insulation system for cryogenics. Monitoring the vacuum level, by compound (negative/absolute) pressure transmitter(s), will indicate if any leakage is occurring. If vacuum can not be maintained, in segment jacketing/tank(s) jacketing, then situation requires resolution. A vacuum pump/system can be utilized to (re)/evacuate jacket(s). All vacuum systems may communicate signal(s) by wire/wirelessly by radio/light/and/or any combination of wire (coax/coax R.F/RFoF/wirelessly by radio/light/OWC, for network communications/signal(s) with central detection system/microcontroller/processor/locally and or remotely.

System Access—Sign on:

System operations will be limited to those qualified/certified to fuel/transfer/exchange these hazardous liquefied/compressed gases. System Operator(s) will log-in at a Human Interface prior to fuelling/transfer event and complete mandatory pre and post fuelling/transfer event checklists/forms/transfer of custody reports. Each operators' reports and actions will be logged and recorded. An optional/A.I. high level sign-on will help prevent unauthorized individuals from accessing system, such as optical/ultrasonic scanning of Iris,//fingerprint/facial recognition system will be more robust security system, although one can also use magnetic/R.F./I.D. card scanning. Security is also paramount, un-authorized individuals shall be barred from entering transfer zone, gate access shall also be controlled with proper clearance by identified qualified personnel only. Scanning/security clearance at entrance should be provided.

Quality Control

INLINE FOR FUELLING/TRANSFER: Multiple different methods may be utilized for in-line gas identification. Utilizing gas identification is important for multiple reasons; the engine that will consume the fuel may require certain specification/mixture of gas/liquefied gas. Plus the flow measurement systems will require the proper density factor to calculate proper flow/quantity. The gas identification systems may include a spectrometer, a mass spectrometer, analyzer, tunable diode laser absorption, Ramen Spectrometry, or fiber optic input via a slip stream or in-line/submersed probe/detection device, plus system/samples may utilize optical/ultrasonic/electro-chemical methods for gas identification. Another such gas/liquefied gas detection system utilizes ultrasonic/optical technology to achieve a density level for the in-line product, this density reading is required for the mass flow calculation, to ensure accurate mass flow/quantity of transfer of gas/liquefied gas. Quality control instrumentation for the fuelling/transfer systems of gas/liquefied gas is of great importance to identify the product, and measure the product.

GAS PROCESSING/SEPERATION: Quality control shall be outlined, and proper methods followed to produce quality product. In this case Liquefied Natural Gases have a variety of different compositions/components. Therefore, in the process of taking pipeline/associated gas, and compressing, scrubbing, refrigerating, and condensing, several QC steps are required. First off, the gas supply requires analyzation to determine it's composition, from there a scrubbing (stripping) method can be determined. Most gas is separated in pressure swing adsorption/separation tower(s), which some may contain a molecular sieve material (which some may carry over), and some systems may not separate as well as others. Also an ammine process is utilized to strip sulphur, by-products, and Carbon dioxide. Proper dehydration may utilize refrigerant/desiccant drying system(s), with alternating desiccant towers, one drying and one being dried out by heat, this heat source is necessary for saving time, but it decays the desiccant material, which can then be carried over into the system. If dehydration system is inadequate, hydrates will form with-in system/transfer/fuelling systems. These hydrates can build-up on metal surfaces and cause incomplete poppet/spring loaded valve(s) closure, a challenging situation, due to fact that hydrates may continue to build-up at leaking point and make situation worse/uncontrollable. Also, if "Heavies" (heavier hydrocarbons) are not completely stripped out, they will accumulate in the storage tank(s), and may be transferred/fuelled into receivers' tank. While in the storage tank(s) (either tank) they may "Settle-out"/stratify/separate (Heavies to the bottom & Lights to the top). A system with-out an internally recirculating spray ball, which performs two (2) functions, it mixes product/Homogenizes, and it also maintains/lowers vapor head space temperature, thus lowers tank pressure; If no internally recirculating pump exist, the separation of components of liquefied gases continues to stratify and build with-in the tank (this may be long term). A guided wire radar level measurement will detect product phase/density differential, of which their may be multiple (solid/gel/liquid/vapor). Their may also be some paraffin wax and or gel build-up from the bottom. Some suppliers are noticing this effect (caused by design/QC issues) and are raising their pumps off the bottom to correct for, but are losing head pressure by raising pump, therefore lowering net pumping out put. A rotary encoder with xmtr will inform operations of exact elevation of pump with-in the tank. Since tanks are storing at a cryogenic temperature, when emptied, there is no noticeable problem, as the heavies and wax/gel dissipates when warmed and evacuated. Bottom flanges on this type of vessel (cryogenic materials) is considered dangerous, therefore all flanges/instruments/and pumps are from topside, therefore pumps are lowered into tanks for product withdrawal. There are several possible solutions: Improve gas supplier specifications; improve head of plant/separations/QC efforts, to better separate heavies out. Periodically lower positive displacement pump into tank bottom (boot) and pump out to separate tank/or to head of plant for re-separation (guided wire radar level instrument will assist in timetable to "Pump-out" with P.D. pump). Install internally recirculating spray ball system to consistently better homogenize products inside tank. For Type "C" tanks, one may specify to have different length "Dip tubes" installed and use vapor headspace push method (compressed gas pressure on top of liquid) to withdraw/remove level of product from tank. A proper mesh/sized bottom strainer will keep larger broken desiccant pieces in the tank boot. Broken desiccant pieces may travel through-out the system, and plug filter(s)/strainer(s). The system shall include pressure differential xmtr(s) with High D/P, High-High D/P alarms/ shut-downs, on filter(s)/Strainer(s) which will indicate when a dirty filter/strainer exists. Duel filter(s)/Strainer system are best for maintaining filter(s) with-out process interruptions. Some may utilize removable/replaceable core desiccant filters, which aid in de-hydration, they can vary in size and length. They are maintenance friendly and provide good pump(s)/compressor(s) protection. Proper Gas separation processes at the head of a plant will yield higher quality liquefied gas product.

All safety systems, log-in/sign-on/off, sensor(s), relays, triggers, micro-switches, actuator(s) movements, motion sensor(s) over-rides, lock-outs, resets, E-stop/shut-down(s), starts and stops, alarms, reset(s), and any/all events shall be continuously recorded, plus all logic data is identified (I.D.d); all recorded with current time and date stamps, and operator I.D./log-in; and will be available for print-out as needed. Data recording can be local and/or remote or both. Data viewing/interfacing/HMI(s) may be local/remote, and may communicate by wire/wireless/by radio and/or light. Data can be transmitted wirelessly to a remote location and can be transmitted over a network such as internet and/or intranet/private/leased communications/server(s)/network(s) as desired. The data system(s) may communicate signal(s) by wire/wirelessly by radio/light/and/or any combination of wire (coax/coax R.F/RFoF/wirelessly by radio/light/OWC, for network communications/signal(s) with central detection system/microcontroller/processor/locally and or remotely.

I claim:

1. A multiple redundant safety system for compressed or liquefied gas, or liquid fuel vehicle fuelling or transfers comprising:

first and second independent operational isolated control systems with first and second separate power sources having separate isolation transformers, wherein the second operational isolated control system is a safety instrumented system (SIS);

the first and second independent operational isolated control systems comprising:

first and second processors, first and second networks, first and second sensor sets, first and second actuator sets, first and second human interfaces, first and second peripherals, first and second independent operating systems; wherein, the first network, first sensor set, first actuator set, first human interface, first peripherals comprise the first control system with the first operating system executing on the first processor, and wherein, the second network, second sensor set, second actuator set, second human interface, second peripherals comprise the second control system with the second operating system executing on the second processor;

wherein, the second independent operational isolated control system is configured to have no communication with the first independent operational isolated control system, and the second independent operational control system is also configured to have no communication external to the second independent operational control system;

first and second redundant vehicle motion devices connected respectively to the first and second control systems, each vehicle motion device configured to detect motion of a vehicle, each redundant vehicle motion sensor utilizing at least one sensor chosen from the group consisting of mechanical tethers, switches, magnetic sensors, optical sensors, ultrasonic sensors, accelerometers, inertial motion units, gyros and gyroscopic effect instruments configured to detect vehicular motion during fuelling or fuel transfer events;

first and second gas detection sensors connected respectively to the first and second control systems, the first and second gas detection systems utilizing at least one sensor chosen from the group consisting of magnetic sensors, catalytic sensors, optical sensors and chemical sensors;

first and second fire or explosion sensors connected respectively to the first and second control systems;

wherein, at least one of the two independent operational isolated control systems shuts down fuel transfer or disables the vehicle upon detection of vehicle motion greater than a predetermined amount, or upon detection of gas concentration above a predetermined level or upon detection of fire or explosion.

2. The system of claim 1, wherein the first and second gas detection systems detect methane or natural gas.

3. The system of claim 1, wherein the accelerometers are 3-axis accelerometers.

4. The system of claim 1, wherein the vehicle is a ship or barge.

5. The system of claim 1, wherein the vehicle is a land vehicle.

6. The system of claim 1, wherein the second power source is configured to power the second independent isolated control system, and includes an uninterruptable power system (UPS).

7. The system of claim 1, wherein the fuel comprises compressed or liquefied natural gas, hydrogen, propane, ethane, butane, ammonia, syn-gas, or bio-gas.

8. A multiple redundant safety system for compressed or liquefied gas, or liquid fuel vehicle fuelling a vehicle comprising:

first and second independent operational isolated control systems with first and second separate power sources having separate isolation transformers, wherein the second operational isolated control system is a safety instrumented system (SIS);

the first and second independent operational isolated control systems comprising:

first and second processors, first and second networks, first and second sensor sets, first and second actuator sets, first and second human interfaces, first and second peripherals, first and second independent operating systems; wherein, the first network, first sensor set, first actuator set, first human interface, first peripherals comprise the first control system with the first operating system executing on the first processor, and wherein, the second network, second sensor set, second actuator set, second human interface, second peripherals comprise the second control system with the second operating system executing on the second processor;

wherein, the second independent operational isolated control system is configured to have no communication with the first independent operational isolated control system, and the second independent operational control system is also configured to have no communication external to the second independent operational control system;

first and second vehicle motion devices connected respectively to the first and second control systems, each vehicle motion device configured to detect excessive motion of the vehicle;

first and second gas detection sensors connected respectively to the first and second control systems;

first and second fire or explosion sensors connected respectively to the first and second control systems;

wherein, at least one of the two independent operational isolated control systems shuts down fuel transfer or disables the vehicle upon detection of vehicle motion greater than a predetermined amount, or upon detection of gas concentration above a predetermined level or upon detection of fire or explosion.

9. The system of claim 8 wherein, the first and second redundant vehicle motion devices are chosen from the group consisting of: mechanical tether or chord or cable, switch, magnetic, optical, ultrasonic, accelerometer, tri-axial accelerometer, inertial motion device and gyroscopic device.

10. The system of claim 8 wherein, the vehicle being fueled includes exchangeable fuel tanks.

11. The system of claim 8 wherein, the vehicle being fueled has a fixed or exchangeable oxidizer tank.

12. The system of claim 8, further comprising an emergency release coupling (ERC) attached to a fuel hose.

13. The system of claim 8 wherein, the first and second gas detection sensors utilize at least one sensor chosen from the group consisting of magnetic sensors, catalytic sensors, optical sensors and chemical sensors.

14. The system of claim 8 wherein, the fire or explosion detection sensors use ultraviolet or infrared light.

15. The system of claim 14 wherein, the fire or explosion detection sensors use ultraviolet and infrared light combined.

16. The system of claim 8 wherein, the first and second gas detection systems utilize at least one sensor chosen from the group consisting of magnetic sensors, catalytic sensors, optical sensors and chemical sensors.

* * * * *